US012400813B2

(12) United States Patent
Kondo et al.

(10) Patent No.: US 12,400,813 B2
(45) Date of Patent: Aug. 26, 2025

(54) ELECTRIC CIRCUIT BREAKER

(71) Applicant: PACIFIC ENGINEERING CORPORATION, Gifu (JP)

(72) Inventors: Yusuke Kondo, Gifu (JP); Akihiko Shimizu, Gifu (JP)

(73) Assignee: PACIFIC ENGINEERING CORPORATION, Gifu (JP)

( * ) Notice: Subject to any disclaimer, the term of this patent is extended or adjusted under 35 U.S.C. 154(b) by 0 days.

(21) Appl. No.: 18/563,373

(22) PCT Filed: Apr. 21, 2022

(86) PCT No.: PCT/JP2022/018346

§ 371 (c)(1),
(2) Date: Nov. 22, 2023

(87) PCT Pub. No.: WO2022/264686

PCT Pub. Date: Dec. 22, 2022

(65) Prior Publication Data

US 2024/0258055 A1 Aug. 1, 2024

(30) Foreign Application Priority Data

Jun. 17, 2021 (JP) ................................ 2021-100645

(51) Int. Cl.
*H01H 39/00* (2006.01)
*H01H 85/38* (2006.01)

(52) U.S. Cl.
CPC .......... *H01H 39/006* (2013.01); *H01H 85/38* (2013.01); *H01H 2231/026* (2013.01)

(58) Field of Classification Search
CPC ................ H01H 39/00; H01H 39/006; H01H 2039/008; H01H 85/38; H01H 2231/026; H01H 85/0241; H01H 37/76
See application file for complete search history.

(56) References Cited

U.S. PATENT DOCUMENTS

| | | | |
|---|---|---|---|
| 3,400,235 | A | 9/1968 | Howard |
| 3,866,318 | A | 2/1975 | Kozacka |
| 4,479,105 | A | 10/1984 | Banes |
| 4,608,548 | A | 8/1986 | Borzoni |

(Continued)

FOREIGN PATENT DOCUMENTS

| | | |
|---|---|---|
| CN | 112331539 | 2/2021 |
| JP | 45-028139 B1 | 9/1970 |

(Continued)

*Primary Examiner* — Jacob R Crum
(74) *Attorney, Agent, or Firm* — Wells St. John P.S.

(57) ABSTRACT

An electric circuit breaker that includes a housing, a cut portion that is disposed in the housing and constitutes a part of an electric circuit, a first power source that is disposed on a side of a first end portion of the housing, and a moving body that moves in the housing between the first end portion and a second end portion opposite to the first end portion, the electric circuit breaker including a fuse function portion that includes a fusion portion and an arc-extinguishing material, wherein the moving body is configured to cut a cut piece positioned between base pieces on both sides of the cut portion at a part of the moving body while moving from the first end portion toward the second end portion by the first power source.

5 Claims, 33 Drawing Sheets

(56) References Cited

U.S. PATENT DOCUMENTS

| | | | | |
|---|---|---|---|---|
| 5,808,253 | A | 9/1998 | Hatakeyama | |
| 6,281,782 | B1 | 8/2001 | Morimoto | |
| 6,418,005 | B1 | 7/2002 | Endo | |
| 10,483,070 | B1 | 11/2019 | Beckert | |
| 10,535,485 | B2 | 1/2020 | Ando | |
| 10,553,387 | B1 | 2/2020 | Angelini | |
| 2003/0076214 | A1 | 4/2003 | Ackermann | |
| 2007/0159291 | A1 | 7/2007 | Wilniewczyc | |
| 2008/0137253 | A1* | 6/2008 | George | H01H 39/006 29/428 |
| 2015/0137934 | A1* | 5/2015 | von zur Muehlen | H01H 85/43 337/273 |
| 2015/0348732 | A1 | 12/2015 | Douglass | |
| 2017/0309432 | A1 | 10/2017 | Leil | |
| 2018/0122606 | A1 | 5/2018 | Ando | |
| 2018/0277325 | A1* | 9/2018 | De Palma | H01H 85/0241 |
| 2019/0371561 | A1 | 12/2019 | Ehrhardt | |
| 2020/0035437 | A1* | 1/2020 | Gaudinat | H01H 39/00 |
| 2021/0057172 | A1 | 2/2021 | Fukuda | |
| 2021/0159035 | A1 | 5/2021 | Koprivsek | |
| 2021/0233729 | A1 | 7/2021 | Nakatani | |
| 2022/0148832 | A1* | 5/2022 | Kube | B60L 3/04 |
| 2022/0189723 | A1* | 6/2022 | Shi | H01H 39/006 |
| 2022/0199346 | A1 | 6/2022 | Yoneda | |
| 2022/0246377 | A1* | 8/2022 | Gerlaud | H01H 85/0241 |
| 2023/0066646 | A1 | 3/2023 | Nakatani | |
| 2023/0386777 | A1 | 11/2023 | Kondo | |
| 2024/0258055 | A1 | 8/2024 | Kondo | |

FOREIGN PATENT DOCUMENTS

| | | |
|---|---|---|
| JP | S 57-2105337 | 12/1982 |
| JP | 59-169029 | 9/1984 |
| JP | H07-57613 | 3/1995 |
| JP | H08279327 | 10/1996 |
| JP | 10-241546 | 9/1998 |
| JP | 2000215769 | 8/2000 |
| JP | 2000-251599 | 9/2000 |
| JP | 2011-060687 | 4/2001 |
| JP | 2001110293 | 4/2001 |
| JP | 2002-163974 | 6/2002 |
| JP | 2007-527602 | 9/2007 |
| JP | 3164185 | 11/2010 |
| JP | 2014-049272 | 3/2014 |
| JP | 2014534584 | 12/2014 |
| JP | 2015-065156 | 4/2015 |
| JP | 2017-010823 | 1/2017 |
| JP | 2017-117565 | 6/2017 |
| JP | 2017-517095 | 6/2017 |
| JP | 2017-531910 | 10/2017 |
| JP | 2020-506515 | 2/2020 |
| JP | 2021-051989 | 4/2021 |
| JP | 2021-061146 | 4/2021 |
| JP | 2021/517342 | 7/2021 |
| JP | 2021-170522 | 10/2021 |
| JP | 2022-095112 | 6/2022 |
| JP | 2023-000054 | 1/2023 |
| WO | WO 2013-054920 | 4/2013 |
| WO | WO 2016-199656 | 12/2016 |
| WO | WO 2017-110160 | 6/2017 |
| WO | WO 2019/181469 A1 | 9/2019 |
| WO | WO 2019/235082 A1 | 12/2019 |
| WO | WO 2020/189377 A1 | 9/2020 |
| WO | WO 2020/196294 A1 | 10/2020 |
| WO | WO 2020/204154 A1 | 10/2020 |
| WO | WO 2021/131535 A1 | 7/2021 |
| WO | WO 2021/220588 A1 | 11/2021 |
| WO | WO PCT/JP2021/044029 | 2/2022 |
| WO | WO PCT/JP2022/018346 | 6/2022 |
| WO | WO PCT/JP2022/031283 | 11/2022 |
| WO | WO PCT/JP2023/005346 | 5/2023 |
| WO | WO PCT/JP2023/016995 | 6/2023 |
| WO | WO PCT/JP2023/021075 | 8/2023 |
| WO | WO PCT/JP2023/025806 | 8/2023 |
| WO | WO PCT/JP2023/027483 | 9/2023 |
| WO | WO 2023/218715 A1 | 11/2023 |
| WO | WO 2024/042813 A1 | 2/2024 |
| WO | WO 2024/111167 A1 | 5/2024 |

* cited by examiner

ELECTRIC CIRCUIT BREAKER

CROSS REFERENCE TO RELATED APPLICATION

This is a 35 U.S.C. § 371 application of, and claims priority to, International Application No. PCT/JP2022/018346, filed on Apr. 21, 2022, which was published as WO2022/264686A1 on Dec. 22, 2022, and which claims priority to JP Patent Application No. 2021-100645, which was filed on Jun. 17, 2021, the teachings of which are incorporated herein by reference.

TECHNICAL FIELD

The present invention relates to an electric circuit breaker that can be mainly used for an electric circuit of an automobile or the like.

BACKGROUND ART

Conventionally, an electric circuit breaker has been used to protect an electric circuit mounted on an automobile or the like and various electric components connected to the electric circuit. Specifically, in a case where an abnormality occurs in the electric circuit, the electric circuit breaker disconnects a part of the electric circuit to physically break the electric circuit.

In addition, a voltage and a current applied to the electric circuit tend to increase due to recent improvement in performance of automobiles and the like, and it has been required to extinguish an arc generated immediately after the electric circuit is broken by the electric circuit breaker more effectively, quickly, and safely. Therefore, the electric circuit breaker according to Patent Literature 1 is an electric circuit breaker including a fuse, a housing, a cut portion that is disposed in the housing and constitutes a part of an electric circuit, a power source that is disposed on a first end portion side of the housing, and a moving body that moves in the housing between a first end portion and a second end portion opposite to the first end portion, in which the moving body is moved by the power source from the first end portion toward the second end portion, and a part of the moving body cuts the cut portion to break the electric circuit. A current (fault current) flowing through the electric circuit when the electric circuit is broken is induced in the fuse, and the arc generated by the induced current is effectively, quickly, and safely extinguished in the fuse.

Furthermore, the current to be broken in the electric circuit is assumed to be not only a relatively high current but also in a wide range up to a relatively low current. Therefore, in the electric circuit breaker of Patent Literature 1, in a case where the current (fault current) induced when the electric circuit is broken is relatively low, depending on the fusing characteristics of the fuse, the time until the fuse breaks the current may be long or the current may not be broken.

CITATION LIST

Patent Literature

Patent Literature 1: Japanese Patent Application No. 2020-208249

SUMMARY OF INVENTION

Technical Problems

Therefore, in view of the above problems, the present invention provides an electric circuit breaker that quickly breaks current in a wide current range up to a relatively low current as well as a relatively high current.

Solution to Problems

An electric circuit breaker of the present invention is an electric circuit breaker that includes a housing, a cut portion that is disposed in the housing and constitutes a part of an electric circuit, a first power source that is disposed on a first end portion side of the housing, and a moving body that moves in the housing between the first end portion and a second end portion opposite to the first end portion, the electric circuit breaker including a fuse function portion that includes a fusion portion and an arc-extinguishing material, wherein the moving body is configured to cut a cut piece positioned between base pieces on both sides of the cut portion at a part of the moving body while moving from the first end portion toward the second end portion by the first power source, in a case where a current to be broken is low, the fuse function portion and the cut portion are not connected, the moving body is moved toward the second end portion by the first power source to cut the cut piece positioned between the base pieces on both sides of the cut portion to break a state where the base pieces on both sides of the cut portion are energized, and in a case where the current to be broken is high, the fuse function portion and the cut portion are connected to each other, the moving body is moved toward the second end portion by the first power source to cut the cut piece positioned between the base pieces on both sides of the cut portion to break the state where the base pieces on both sides of the cut portion are energized.

The electric circuit breaker according to the present invention further includes paired electrodes individually connected to terminals on both sides of the fuse function portion, wherein in a case where a current to be broken is low, the moving body moves toward the second end portion to cut a cut piece positioned between base pieces on both sides of the cut portion so as to break a state where the base pieces on both sides of the cut portion are energized, and a regulating unit operated by a second power source regulates movement of the moving body so as not to connect a part of the cut portion and the electrode in order to make the cut portion and the fuse function portion unconnected, in a case where the current to be broken is high, the moving body moves toward the second end portion, and in a state where the base pieces on both sides of the cut portion are energized via the cut piece, a part of the cut portion and the electrode come into contact with each other to connect the cut portion and the fuse function portion, and thereafter, the state where the base pieces on both sides of the cut portion are energized via the cut piece is broken along with the movement of the moving body.

Furthermore, in the electric circuit breaker according to the present invention, the moving body includes the electrode, a state where base pieces on both sides of the cut portion are energized via the cut piece is a state where the base piece and the cut piece physically cut and separated from the base piece are energized by arc discharge, and the energized state is broken by an insulator being interposed between the base piece and the cut piece along with movement of the moving body.

Moreover, in the electric circuit breaker according to the present invention, the housing includes the electrode, a state where base pieces on both sides of the cut portion are energized via the cut piece is a state where the base piece and the cut piece physically cut and separated from the base piece are energized by a conductor included in the moving body, and in the energized state, the base piece of the cut portion and the electrode are connected via the conductor of the moving body, and the cut portion and the fuse function portion are connected.

The electric circuit breaker according to the present invention further includes a circuit connected to the cut portion via the fuse function portion, wherein in a case where a current to be broken is low, the circuit is broken by a breaker moved by a second power source to be in a state where the fuse function portion and the cut portion are not connected, and thereafter, the moving body is moved toward the second end portion by a first power source to cut a cut piece positioned between base pieces on both sides of the cut portion so as to break a state where the base pieces on both sides of the cut portion are energized, and in a case where the current to be broken is high, in a state where the circuit is not broken and the fuse function portion and the cut portion remain connected to each other, the moving body is moved toward the second end portion by the first power source to cut the cut piece positioned between the base pieces on both sides of the cut portion so as to break the state where the base pieces on both sides of the cut portion are energized.

In addition, in the electric circuit breaker according to the present invention, a fuse element of the fuse function portion constitutes a part of the circuit, the fuse element is surrounded by an arc-extinguishing material, and in a case where a current to be broken is low, the fuse element that is a part of the circuit is broken by a breaker moved by the second power source.

According to each of the above features, in a case where an overcurrent belonging to a relatively low current range flows through the electric circuit, the fuse function portion and the cut portion are not connected, and the moving body moves toward the second end portion by the first power source to cut the cut piece positioned between the base pieces on both sides of the cut portion, so that the state where the base pieces on both sides of the cut portion are energized is broken and the overcurrent is prevented from flowing through the electric circuit. Therefore, it is possible to solve the problem that, as in a conventional case, the current belonging to the relatively low current range cannot be broken because the fusion portion of the fuse function portion is not fused or the overcurrent flowing through the electric circuit cannot be broken immediately because it takes a relatively long time to break the current. On the other hand, in a case where an overcurrent belonging to a relatively high current range flows through the electric circuit, the fuse function portion and the cut portion are connected, the moving body moves toward the second end portion by the first power source to cut the cut piece positioned between the base pieces on both sides of the cut portion, so that the state where the base pieces on both sides of the cut portion are energized is broken and the overcurrent is safely prevented from flowing through the electric circuit. As described above, the electric circuit breaker of the present invention quickly breaks current in a wide current range up to a relatively low current as well as a relatively high current.

Advantageous Effects of Invention

As described above, the electric circuit breaker of the present invention quickly breaks current in a wide current range up to a relatively low current as well as a relatively high current.

REFERENCE SIGNS LIST

Figure 1A:
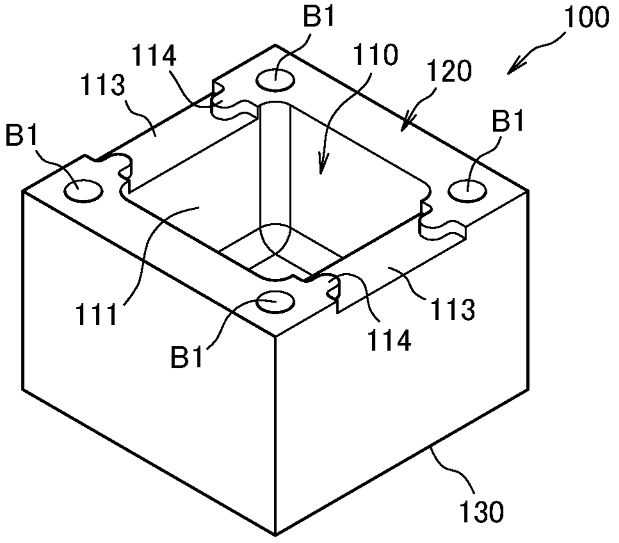
FIG. 1(*a*) is an overall perspective view of a lower housing constituting a housing of an electric circuit breaker according to a first embodiment of the present invention, FIG. 1(*b*) is a plan view of the lower housing, and FIG. 1(*c*) is a cross-sectional view taken along line A-A.

300 housing
320 first end portion
330 second end portion
400 cut portion
420 cut piece
430 base piece
500 moving body
600 electric circuit breaker
700 fuse function portion
730 arc-extinguishing material
740 fusion portion
P power source

DESCRIPTION OF EMBODIMENTS

Hereinafter, each embodiment of the present invention will be described with reference to the drawings. Note that, the shape, material, and the like of each member of an electric circuit breaker according to embodiments described below are merely examples, and are not limited thereto.

First Embodiment

Figure 1B:
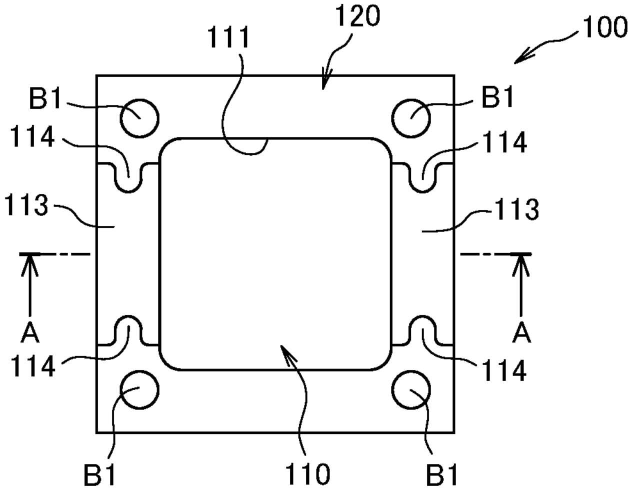
Figure 1C:
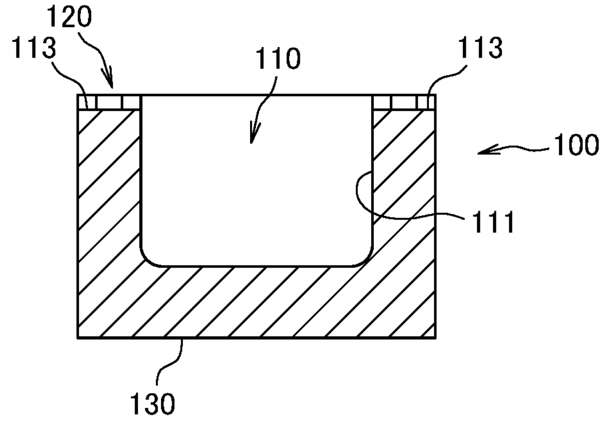

First, FIG. 1 illustrates a lower housing 100 constituting a housing 300 of an electric circuit breaker according to a first embodiment of the present invention. Note that FIG. 1(*a*) is an overall perspective view of the lower housing 100, FIG. 1(*b*) is a plan view of the lower housing 100, and FIG. 1(*c*) is a cross-sectional view taken along line A-A.

As illustrated in FIG. 1, the lower housing 100 is a substantially quadrangular prism formed of an insulator such as a synthetic resin, and includes a hollow lower housing portion 110 therein. The lower housing portion 110 extends from an upper surface 120 toward a lower surface 130 of the lower housing 100, and is configured to house a moving body 500 to be described later. In addition, an inner surface 111 of the lower housing portion 110 is a smooth surface so that the moving body 500 can slide therein in a vertical direction. Furthermore, placement portions 113 recessed based on the shape of a base piece 430 are provided in a part of the upper surface 120 so that the base piece 430 of a cut portion 400 to be described later can be placed. The placement portions 113 are arranged on both sides of the lower housing portion 110 so as to face each other, and support the cut portion 400 extending linearly on both sides. In addition, the placement portion 113 includes claws 114, and can be engaged with a part of the base piece 430 of the cut portion 400 placed to fix the cut portion 400 without any deviation. Moreover, coupling bores B1 are formed at four corners of the upper surface 120 of the lower housing 100, and these coupling bores B1 are arranged so as to vertically match coupling bores B2 of an upper housing 200 to be described later.

Figure 2A:
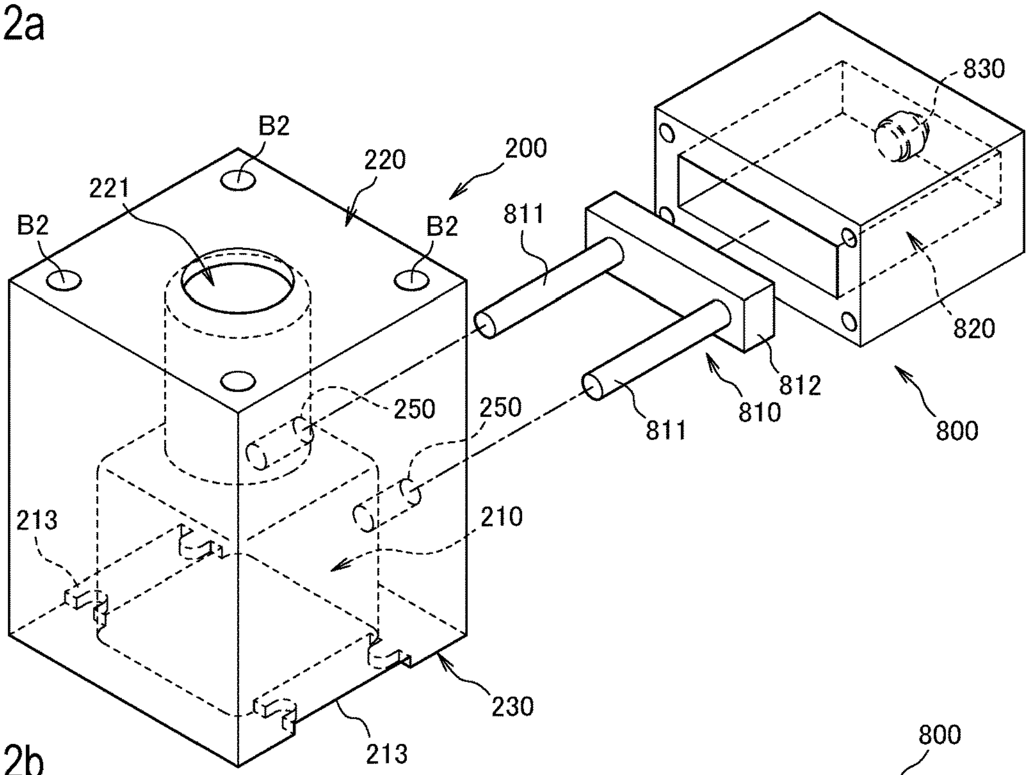
FIG. 2(*a*) is an overall perspective view of an upper housing constituting the housing of the electric circuit breaker according to the first embodiment of the present invention, FIG. 2(*b*) is a plan view of the upper housing, and FIG. 2(*c*) is a cross-sectional view of the upper housing taken along line B-B.
Figure 2B:
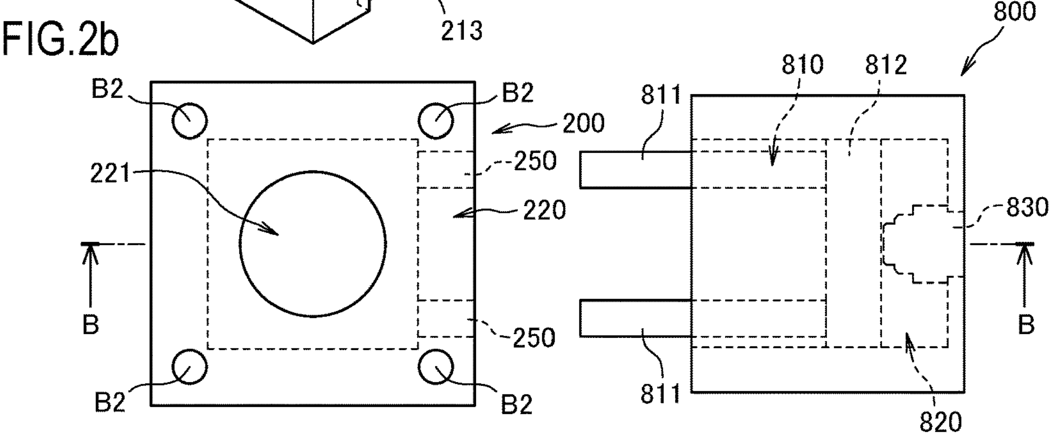
Figure 2C:
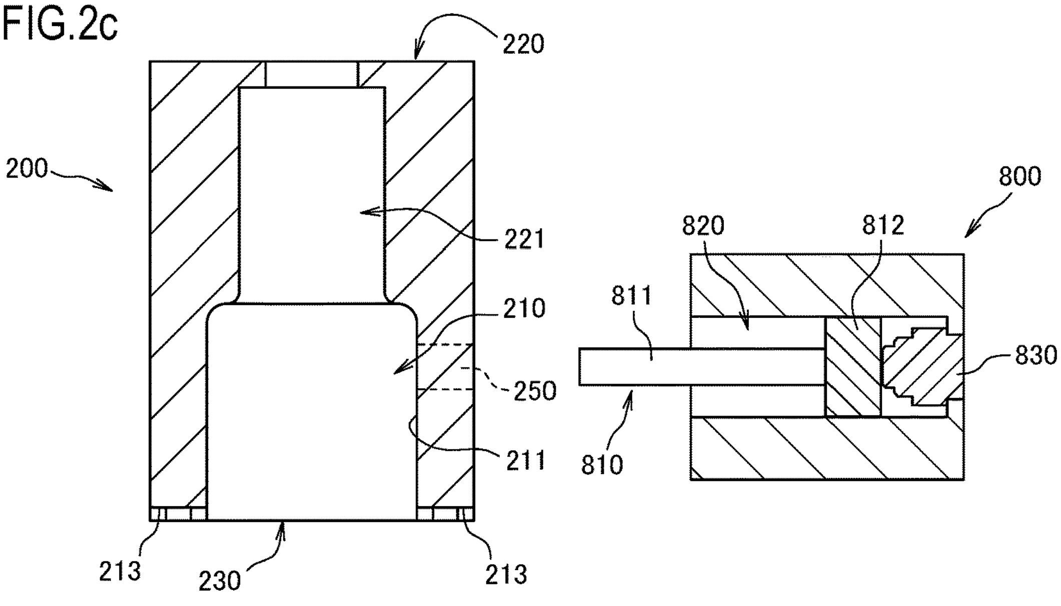

Next, FIG. 2 illustrates the upper housing 200 constituting the housing 300 according to the first embodiment of the present invention. FIG. 2(*a*) is an overall perspective view of the upper housing 200, FIG. 2(*b*) is a plan view of the upper housing 200, and FIG. 2(*c*) is a cross-sectional view of the upper housing 200 taken along line B-B.

As illustrated in FIG. 2, the upper housing 200 is a substantially quadrangular prism formed of an insulator such as a synthetic resin, and forms a pair with the lower housing 100 illustrated in FIG. 1 to constitute the housing 300. The upper housing includes an upper housing portion 210 therein, the upper housing portion 210 extends from a lower surface 230 toward an upper surface 220 of the upper housing 200, and is configured to house the moving body 500 to be described later. In addition, an inner surface 211 of the upper housing portion 210 is a smooth surface so that the moving body 500 can slide therein in the vertical direction. As described later, the upper housing portion 210 is arranged vertically with the lower housing portion 110 of the lower housing 100 to constitute a housing portion 310 extending linearly, and the moving body 500 can move vertically in the housing portion 310.

Furthermore, insertion portions 213 recessed based on the shape of the base piece 430 are provided in a part of the lower surface 230 so that the base piece 430 of the cut portion 400 to be described later can be inserted. The insertion portions 213 are arranged on both sides of the upper housing portion 210 so as to face each other, and are arranged at positions corresponding to the placement portions 113 of the lower housing 100. Therefore, the insertion portion 213 is fitted from above to the base piece 430 of the cut portion 400 placed on the placement portion 113 of the lower housing 100.

Moreover, a power source storage portion 221 in which a first power source P is housed is formed in a part of the side of the upper surface 220 of the upper housing 200. The power source storage portion 221 communicates with the upper end side of the upper housing portion 210. As described in detail later, power such as air pressure generated from the first power source P housed in the power source storage portion 221 is transmitted to the moving body 500 in the upper housing portion 210 to move the moving body 500. The lower housing 100 and the upper housing 200 are substantially quadrangular prisms formed of a synthetic resin, but are not limited thereto, and may have any shape formed of other materials as long as they have high insulating properties and strength enough to withstand use.

Furthermore, a regulating unit 800 formed of an insulator such as a synthetic resin is attached to the upper housing 200. The regulating unit 800 includes a housing portion 820 in which a regulating body 810 is slidably housed, and a second power source 830 for moving the regulating body 810. The regulating body 810 includes a terminal portion 812 and a rod-shaped distal end portion 811 extending in an elongated shape from the terminal portion 812. In addition, the upper housing 200 includes a through-hole 250 that allows the upper housing portion 210 in the upper housing and the housing portion 820 of the regulating unit 800 to communicate with each other, and the through-hole 250 is formed in a manner that the distal end portion 811 of the regulating body 810 of the regulating unit 800 can be inserted therethrough. As described in detail later, power such as air pressure generated from the second power source 830 housed in the housing portion 820 is transmitted to the regulating body 810 in the housing portion 820 to move the regulating body 810 toward the upper housing portion 210 of the upper housing 200. Then, the distal end portion 811 of the regulating body 810, which has moved, passes through the through-hole 250 and moves into the upper housing portion 210 of the upper housing 200. Note that the regulating unit 800 is attached to the upper housing 200, but is not limited thereto, and can be attached to any place as long as it is a part of the housing 300.

Figure 3A:
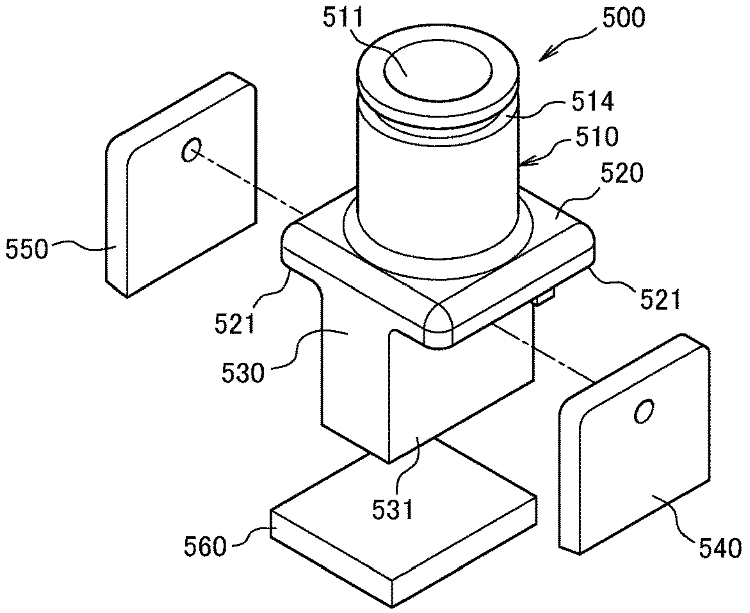
FIG. 3(*a*) is an exploded perspective view of a moving body of the electric circuit breaker according to the first embodiment of the present invention, FIG. 3(*b*) is a perspective view of the moving body, and FIG. 3(*c*) is a cross-sectional view taken along line C-C.
Figure 3B:
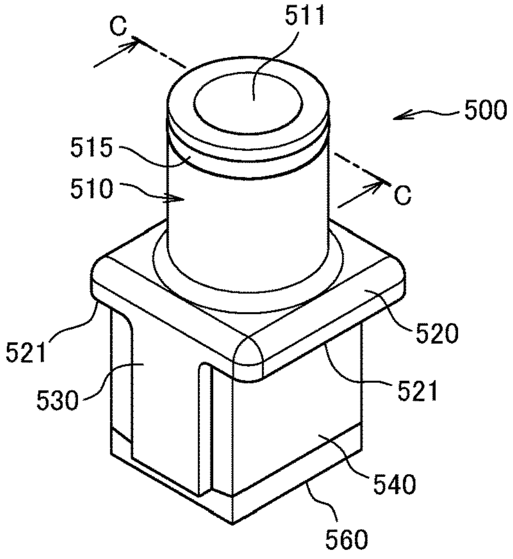
Figure 3C:
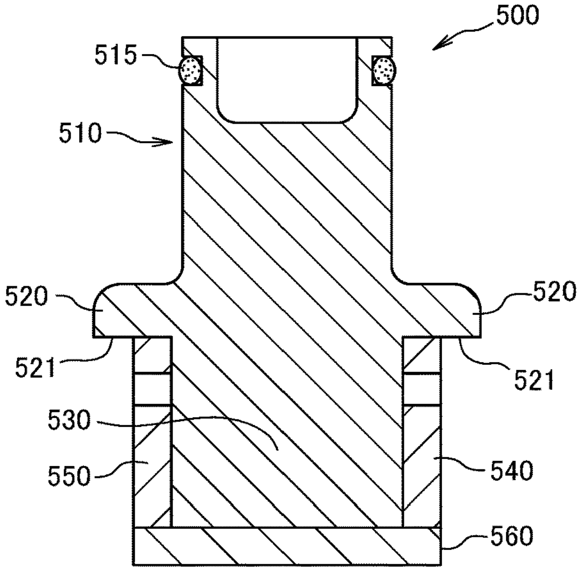

Next, the moving body 500 according to the first embodiment of the present invention is illustrated in FIG. 3. Note that FIG. 3(*a*) is an exploded perspective view of the moving body 500, FIG. 3(*b*) is a perspective view of the moving body 500, and FIG. 3(*c*) is a cross-sectional view taken along line C-C.

As illustrated in FIG. 3, the moving body 500 is formed of an insulator such as a synthetic resin, and includes a substantially cylindrical body 510 on the upper end side, a flat quadrangular sliding portion 520 in the center, and a projection 530 projecting downward on the lower end side. A recessed portion 511 is provided at the upper end of the body 510, and the recessed portion 511 is a portion facing the first power source P. The sliding portion 520 has a shape corresponding to the inner surface shape of the housing portion 310, and the sliding portion 520 slides on the inner surface of the housing portion 310, so that the moving body 500 can smoothly slide while maintaining a posture along the inner side of the housing portion 310. In addition, a part of the sliding portion 520 has a stepped shape, and includes an abutting portion 521 capable of abutting on a part of the regulating body 810 of the regulating unit 800. Note that a groove 514 is formed on the outer periphery of a part of the body 510, and an O-ring 515 (elastically deformable synthetic resin ring) is fitted into the groove 514. Therefore, as described later, the air pressure due to the explosion of the first power source P is prevented from leaking from the space formed by the recessed portion 511.

Furthermore, two plate-like electrodes 540 and 550 are fixed to both sides of the projection 530. The paired electrodes (540, 550) are connected to terminals of a fuse function portion to be described later, and are formed of a metal conductor such as copper so as to be electrically connected to a part of the cut portion 400. Since the electrode 540 and the electrode 550 are fixed to both sides with the projection 530 formed of an insulator interposed therebetween, the electrode 540 and the electrode 550 are not electrically connected to each other and are in an independent state. In addition, the moving body 500 includes a plate-like insulator 560 formed of a synthetic resin, ceramics, or the like on the distal end side of the electrode 540 and the electrode 550.

Note that the moving body 500 is formed of a synthetic resin, but is not limited thereto, and may have any shape formed of other materials as long as they have high insulating properties and strength enough to withstand use. Furthermore, the paired electrodes 540 and 550 are formed in a plate shape, but are not limited thereto, and may have any shape as long as they can be electrically connected to a part of the cut portion 400.

Figure 4A:
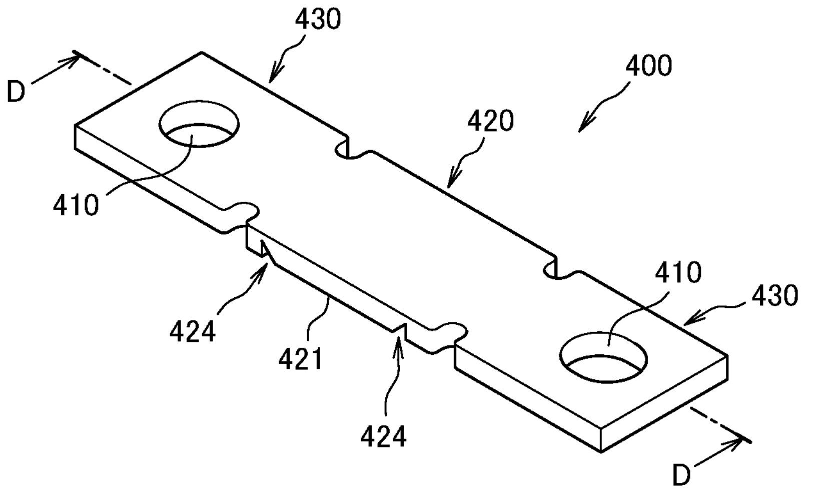
FIG. 4(*a*) is a perspective view of a cut portion of the electric circuit breaker according to the first embodiment of the present invention, and FIG. 4(*b*) is a cross-sectional view taken along line D-D.
Figure 4B:
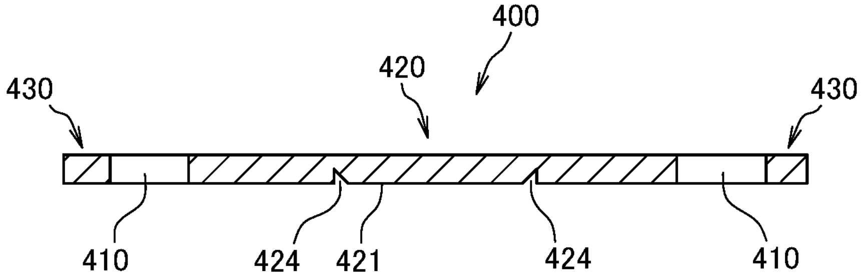

Next, FIG. 4 illustrates the cut portion 400 constituting a part of an electric circuit to be broken by an electric circuit breaker 600 according to the first embodiment of the present invention. Note that FIG. 4(*a*) is a perspective view of the cut portion 400, and FIG. 4(*b*) is a cross-sectional view taken along line D-D.

The cut portion 400 is entirely a metal conductor such as copper in order to be electrically connected to the electric circuit, and includes the base piece 430 for connecting to the electric circuit at both ends and a cut piece 420 positioned between the base pieces 430. A connection hole 410 used for connection with the electric circuit is formed at an end portion of the base piece 430. In addition, a linear cut 424 is formed in a back surface 421 of the boundary portion between the cut piece 420 and the base piece 430 so as to traverse in the width direction of the cut portion 400 in order to facilitate cutting of the cut piece 420 from the base piece 430. Note that the cut portion 400 is not limited to the shape illustrated in FIG. 4, and may have any shape as long as it includes the base piece 430 for electrically connecting to the electric circuit and the cut piece 420 positioned between the base pieces 430. In addition, although the cross-sectional area of a part of the cut piece 420 is minimized by the cut 424 to facilitate cutting, the shape and position of the cut 424 can be appropriately changed depending on the configuration of the moving body 500 to facilitate cutting by the moving body 500.

Figure 5:
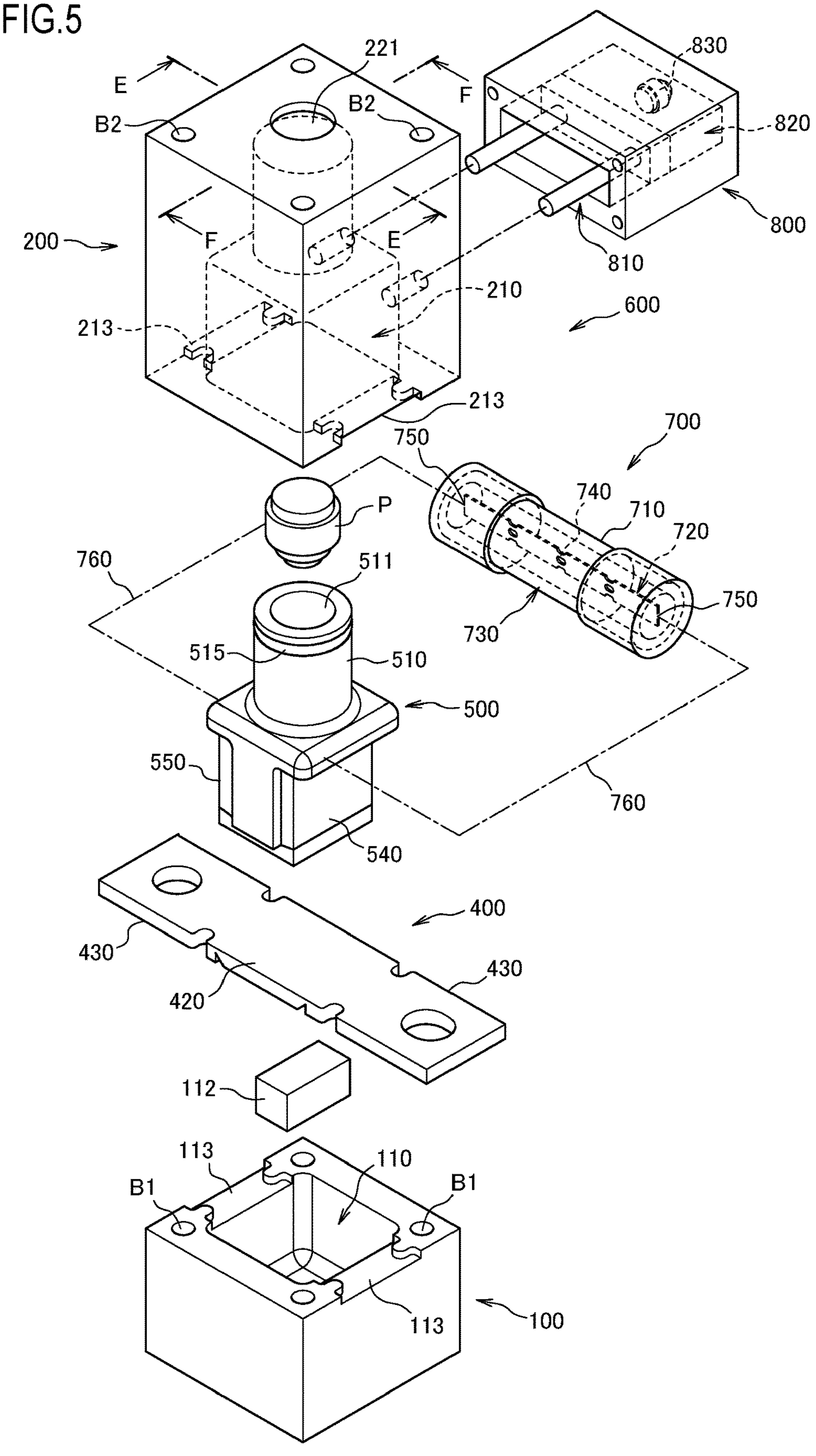
FIG. 5 is an exploded perspective view of the electric circuit breaker according to the first embodiment of the present invention.

Next, a method of assembling the electric circuit breaker 600 of the present invention will be described with reference to FIG. 5. Note that FIG. 5 is an exploded perspective view of the electric circuit breaker 600.

When the electric circuit breaker 600 is assembled, first, an abutment base 112 formed of an insulator is fixed to the bottom of the lower housing portion 110 of the lower housing 100. Next, the base piece 430 of the cut portion 400 is placed on the placement portion 113 of the lower housing 100, and the cut portion 400 is disposed in a manner that the cut piece 420 traverses the lower housing portion 110 of the lower housing 100.

Next, the upper housing 200 is fitted from above the lower housing 100 in a manner that the side of the body 510 of the moving body 500 is inserted into the upper housing portion 210 of the upper housing 200. Then, the insertion portion 213 of the upper housing 200 is fitted to the base piece 430 of the cut portion 400. By coupling and fixing the coupling bore B1 and the coupling bore B2 aligned vertically using a coupling tool or the like, the housing 300 including the lower housing 100 and the upper housing 200 is assembled in a state where the cut portion 400 and the moving body 500 are housed therein.

Furthermore, the first power source P is attached to the power source storage portion 221 of the upper housing 200, and a part of the first power source P is housed in the recessed portion 511 of the moving body 500. In addition, when it is detected that an abnormal current flows through the electric circuit, an abnormality signal is input from an external device to the first power source P. Then, for example, the gunpowder in the first power source P is exploded, and the moving body 500 is instantaneously pushed out and moved in the housing portion 310 by the air pressure due to the explosion. Note that the first power source P is not limited to a power source using gunpowder as long as it generates power for moving the moving body 500, and other known power sources may be used.

The regulating unit 800 is attached to the upper housing 200. A part of the regulating body 810 is configured to be movable into the upper housing portion 210 of the upper housing 200 by the second power source 830. In addition, when it is detected that an abnormal current flows through the electric circuit and an abnormality signal is input from an external device to the second power source 830, for example, the gunpowder in the second power source 830 is exploded, and the regulating body 810 is instantaneously pushed out and moved in the housing portion 820 by the air pressure due to the explosion. Note that the second power source 830 is not limited to a power source using gunpowder as long as it generates power for moving the regulating body 810, and other known power sources may be used.

The electric circuit breaker 600 also includes a fuse function portion 700. The fuse function portion 700 includes a fuse element 720 formed of a conductive metal such as copper or an alloy thereof in a hollow and insulating casing 710, and the periphery of the fuse element 720 inside the casing 710 is filled with an arc-extinguishing material 730. Terminals 750 on both sides of the fuse element 720 are electrically connected to the paired electrodes 540 and 550 by connection members 760 such as electric wires. In addition, the fuse element 720 includes a fusion portion 740 between the terminals 750, and the fusion portion 740 is a portion in which the width of the fuse element 720 is locally narrowed, and is configured to generate heat and fuse to break the current when the current to be broken by the electric circuit breaker flows.

The arc-extinguishing material 730 is a granular arc-extinguishing material made of silica sand or the like, or a gaseous arc-extinguishing material made of nitrogen gas or the like, and is configured to extinguish the arc generated between the terminals 750 after the fusion of the fusion portion 740. As the fuse function portion 700, an existing fuse that is conventionally known and in which an arc-extinguishing material and a fuse element are enclosed in a casing can be used, and a fuse having arc-extinguishing performance based on a current or a voltage to be broken by the electric circuit breaker can be appropriately adopted. Note that the fuse function portion 700 can be attached to any place in the housing 300. By attaching the fuse function portion 700 to the housing 300, the fuse function portion 700 is less likely to be affected by an impact due to the movement of the moving body 500 and is less likely to be damaged.

Next, an internal structure of the electric circuit breaker 600 according to the first embodiment of the present invention will be described with reference to FIGS. 6 and 7. Note that FIG. 6 is a cross-sectional view taken along line E-E and FIG. 7 is a cross-sectional view taken along line F-F in a state where the electric circuit breaker 600 illustrated in FIG. 5 is assembled.

Figure 6:
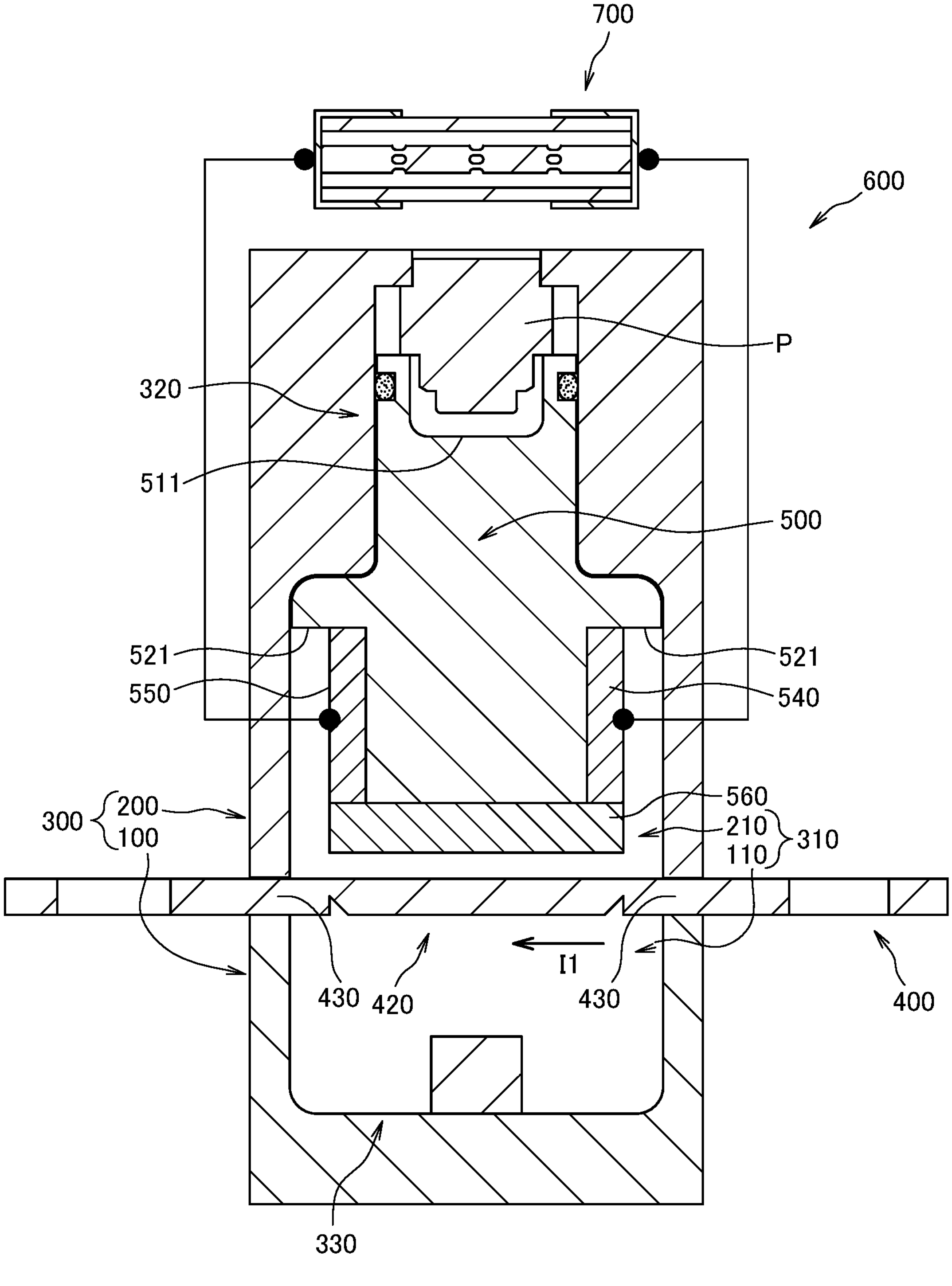
FIG. 6 is a cross-sectional view taken along line E-E in a state where the electric circuit breaker according to the first embodiment of the present invention is assembled.

As illustrated in FIG. 6, the moving body 500 is housed in the housing portion 310 including the lower housing portion 110 and the upper housing portion 210 that are linearly arranged. The housing portion 310 extends from a first end portion 320 of the housing 300 to a second end portion 330 opposite to the first end portion 320. Since the moving body 500 is disposed on the side of the first end portion 320 in which the first power source P is disposed, the side of the second end portion 330 of the housing portion 310 is hollow. Therefore, as described later, the moving body 500 can move toward the second end portion 330 while cutting the cut piece 420. In addition, since the recessed portion 511 on the upper end side of the moving body 500 is adjacent to the first power source P, the air pressure due to the explosion of the gunpowder in the first power source P is transmitted to the upper end side of the moving body 500 as described later.

Note that, as illustrated in FIG. 6, the assembled and completed electric circuit breaker 600 is attached in an electric circuit to be protected and used. Specifically, the base piece 430 of the cut portion 400 is connected to a part of the electric circuit, and the cut portion 400 constitutes a part of the electric circuit. The insulator 560 extends along the cut piece 420 and is disposed away from the cut piece 420. In a normal state (that is, when no abnormal current flows), since the base piece 430 and the cut piece 420 of the cut portion 400 are not cut and are physically and electrically connected, a current I1 flows through the electric circuit via the base piece 430 and the cut piece 420 of the cut portion 400. In addition, as illustrated in FIG. 7, the distal end portion 811 of the regulating body 810 of the regulating unit 800 is inserted into the through-hole 250 of the housing 300 but does not project to the housing portion 310. Therefore, in the normal state, a part of the regulating body 810 of the regulating unit 800 does not abut on the abutting portion 521 of the moving body 500, and the regulating unit 800 does not regulate the movement of the moving body 500.

Figure 7:
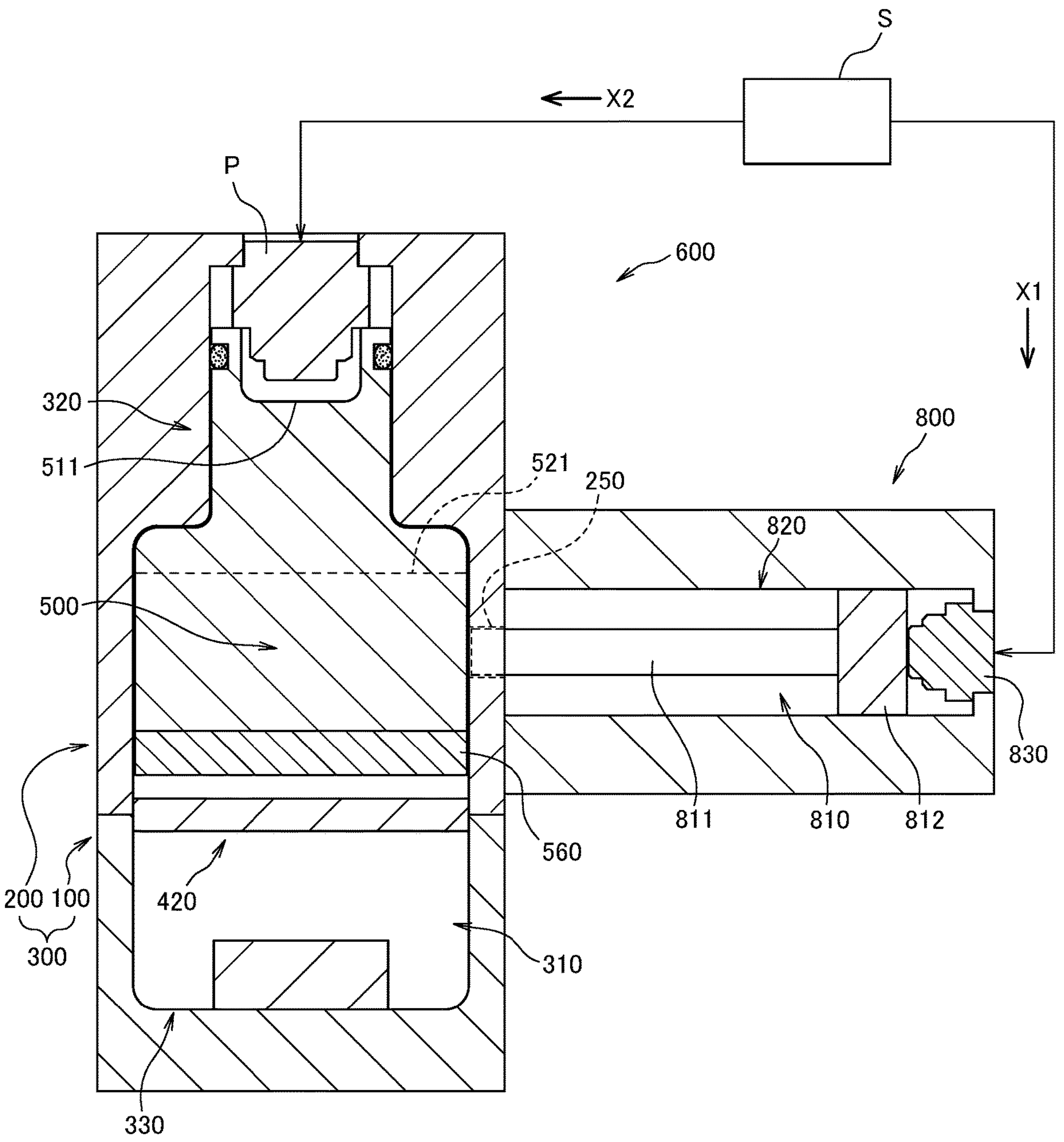
FIG. 7 is a cross-sectional view taken along line F-F in a state where the electric circuit breaker illustrated in FIG. 5 is assembled.

Furthermore, as illustrated in FIG. 7, a device S that detects an abnormal current in the electric circuit is connected to the electric circuit to be protected. When detecting an abnormal current in the electric circuit by a built-in current sensor, an external current sensor connected to the electric circuit, or the like, the device S determines whether or not the abnormal current belongs to a relatively low current range lower than a predetermined value (for example, 1000 to 2000 A [amps]). When determining that the abnormal current belongs to the relatively low current range lower than the predetermined value, the device S inputs an abnormality signal X1 to the second power source 830. Thereafter, after a predetermined time has elapsed, the device S inputs an abnormality signal X2 to the first power source P. Note that, as described later, the predetermined time is a time until the distal end portion 811 of the regulating body 810 projects into the housing portion 310 of the housing 300 by the second power source 830. On the other hand, when determining that the detected abnormal current does not belong to the relatively low current range lower than the predetermined value and belongs to a relatively high current range higher than the predetermined value, the device S inputs the abnormality signal X2 only to the first power source P without inputting the abnormality signal X1 to the second power source 830.

Moreover, the paired electrodes 540 and 550 are arranged on the lower end side of the moving body 500 so as to face the cut portion 400, and the insulator 560 away from the cut portion 400 is interposed between the paired electrodes and the cut portion 400. Therefore, since the paired electrodes 540 and 550 are not physically and electrically connected to the cut portion 400, the current flowing through the electric circuit does not flow in the fuse function portion 700 via the electrodes 540 and 550. As a result, it is possible to prevent the current in the electric circuit from constantly flowing through the fuse function portion 700, and it is possible to prevent heat generation and deterioration of the fuse function portion 700. As described later, the electric circuit breaker 600 can induce an arc generated when the electric circuit is broken in the fuse function portion 700 to effectively and quickly extinguish the arc. Therefore, an arc-extinguishing material for extinguishing the arc is not enclosed in the housing portion 310 (in particular, around the cut piece 420). Note that, basically, it is not necessary to enclose the arc-extinguishing material in the housing portion 310, but the arc-extinguishing material may be enclosed in the housing portion 310 depending on the specification.

Next, a state where the electric circuit breaker 600 breaks an electric circuit in a case where an overcurrent belonging to a relatively low current range lower than a predetermined value flows through the electric circuit will be described with reference to FIGS. 8 and 9. Note that FIG. 8 is a cross-sectional view illustrating a state where the moving body 500 has moved from the state illustrated in FIG. 6, and FIG. 9 is a cross-sectional view illustrating a state where the moving body 500 has moved from the state illustrated in FIG. 7.

First, assuming that, when detecting an abnormal current in the electric circuit, the device S determines that the abnormal current belongs to a relatively low current range lower than a predetermined value (for example, 1000 to 2000 A [amps]). Next, the device S inputs the abnormality signal X1 to the second power source 830. As a result, the gunpowder in the second power source 830 explodes, and the air pressure due to the explosion is transmitted to the terminal portion 812 of the regulating body 810. Then, the regulating body 810 is forcefully blown toward the housing portion 310 of the housing 300 by the air pressure and instantaneously moves toward the moving body 500 in the housing portion 820 of the regulating unit 800. As a result, as illustrated in FIG. 9, the distal end portion 811 of the regulating body 810 projects into the housing portion 310 of the housing 300.

Thereafter, the device S inputs the abnormality signal X2 to the first power source P. As a result, the gunpowder in the first power source P explodes, and the air pressure due to the explosion is transmitted to the recessed portion 511 on the upper end side of the moving body 500. The moving body 500 is forcefully blown from the first end portion 320 toward the second end portion 330 by the air pressure, and instantaneously moves toward the second end portion 330 in the housing portion 310.

Figure 8:
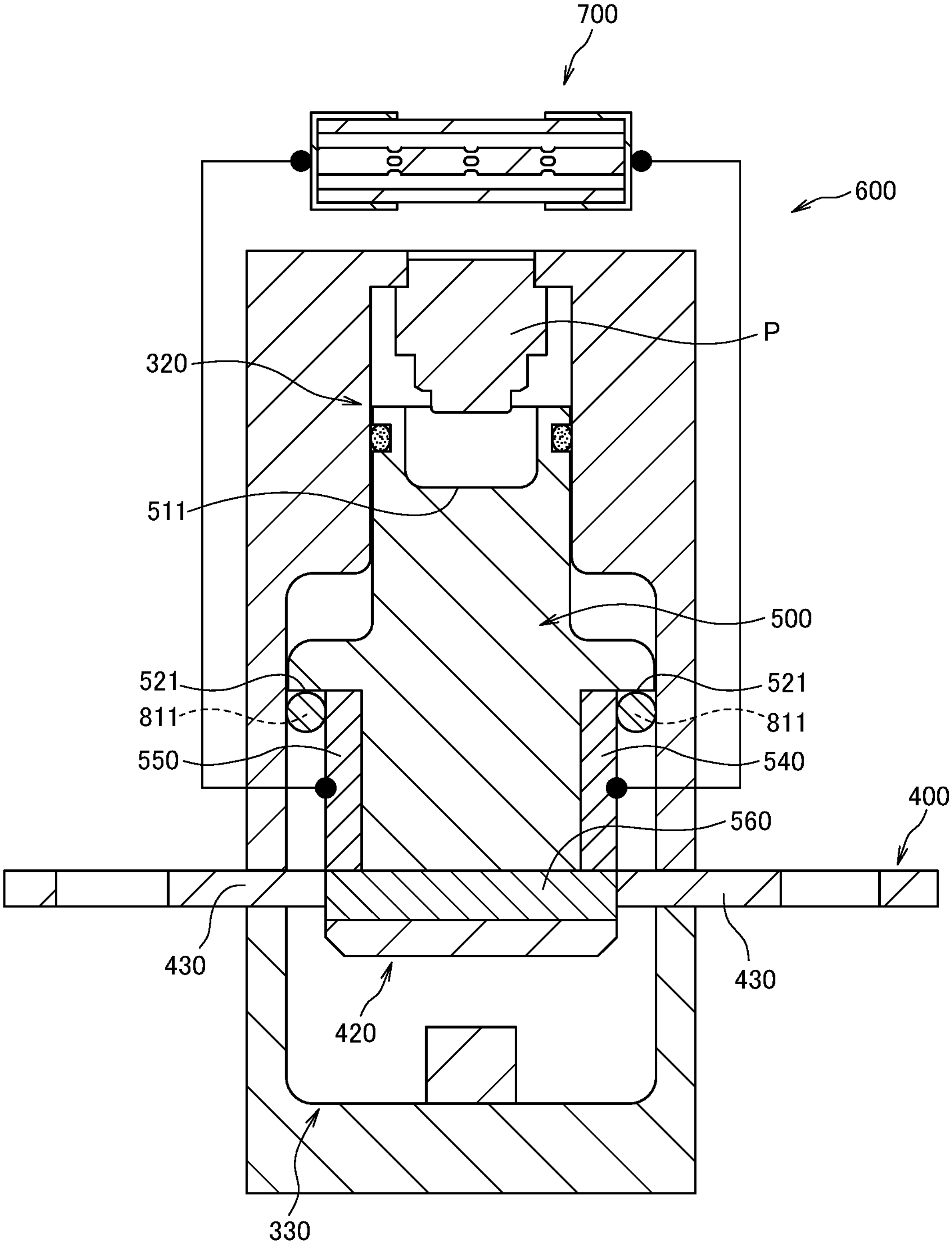
FIG. 8 is a cross-sectional view illustrating a state where the moving body has moved from the state illustrated in FIG. 6.
Figure 9:
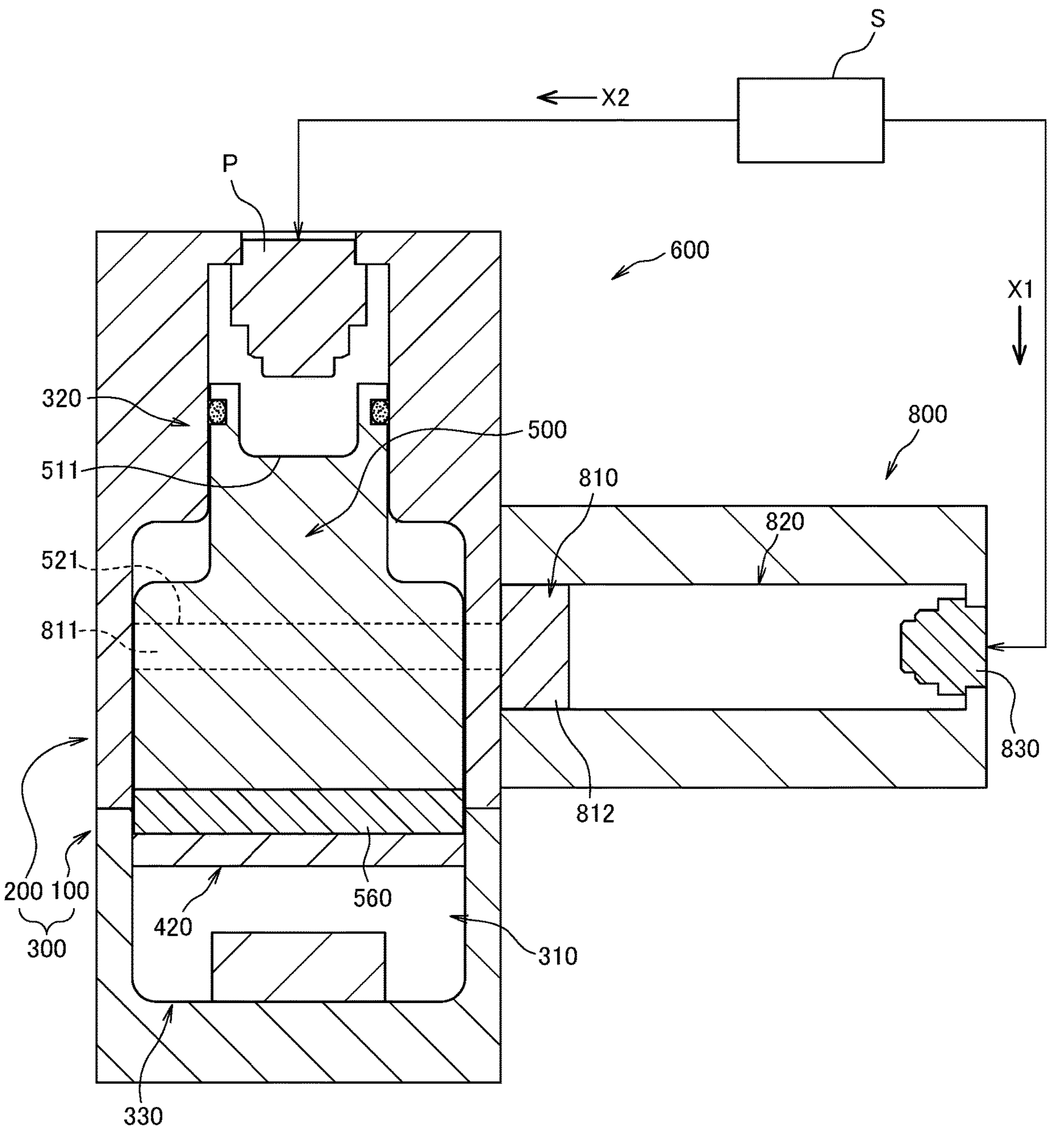
FIG. 9 is a cross-sectional view illustrating a state where the moving body has moved from the state illustrated in FIG. 7.

Then, as illustrated in FIGS. 8 and 9, the cut piece 420 is strongly pushed downward by the insulator 560 of the moving body 500, and the cut piece 420 is cut in the vicinity of the coupling portion between the cut piece 420 and the base piece 430 and physically separated from the base piece 430. Therefore, the state where the base pieces 430 on both sides are energized is immediately broken, and an overcurrent can be prevented from flowing through the electric circuit. Note that, since the abnormal current belongs to the relatively low current range lower than the predetermined value, the arc discharge is not generated by the insulator 560 interposed between the base pieces 430 even if the distance between the cut piece 420 and the base piece 430B that are separated is short.

In addition, as illustrated in FIG. 8, since the abutting portion 521 of the moving body 500 abuts on the distal end portion 811 of the regulating body 810 projecting into the housing portion 310, the moving body 500 cannot further move toward the second end portion 330. Therefore, the electrode 540 and the electrode 550 are not in contact with the base piece 430, and the current flowing through the base piece 430 does not flow through the electrode 540 and the electrode 550 in the fuse function portion 700. That is, the regulating unit 800 regulates the movement of the moving body 500 in a manner that a part of the cut portion 400 and the electrode do not come into contact with each other in order to make the cut portion 400 and the fuse function portion 700 unconnected. Note that the regulating unit 800 regulates the movement of the moving body 500 by causing the distal end portion 811 to abut on the abutting portion 521 of the moving body 500, but is not limited thereto, and the regulating unit 800 may have any configuration as long as the movement of the moving body 500 can be regulated.

Note that when the current belonging to the relatively low current range flows in the fuse function portion 700 through the electrode 540 and the electrode 550, the current belongs to the relatively low current range, and thus the fusion portion 740 of the fuse function portion 700 is not fused and the current cannot be broken, or it takes a relatively long time to break the current, and the overcurrent flowing through the electric circuit cannot be broken immediately.

Figure 10:
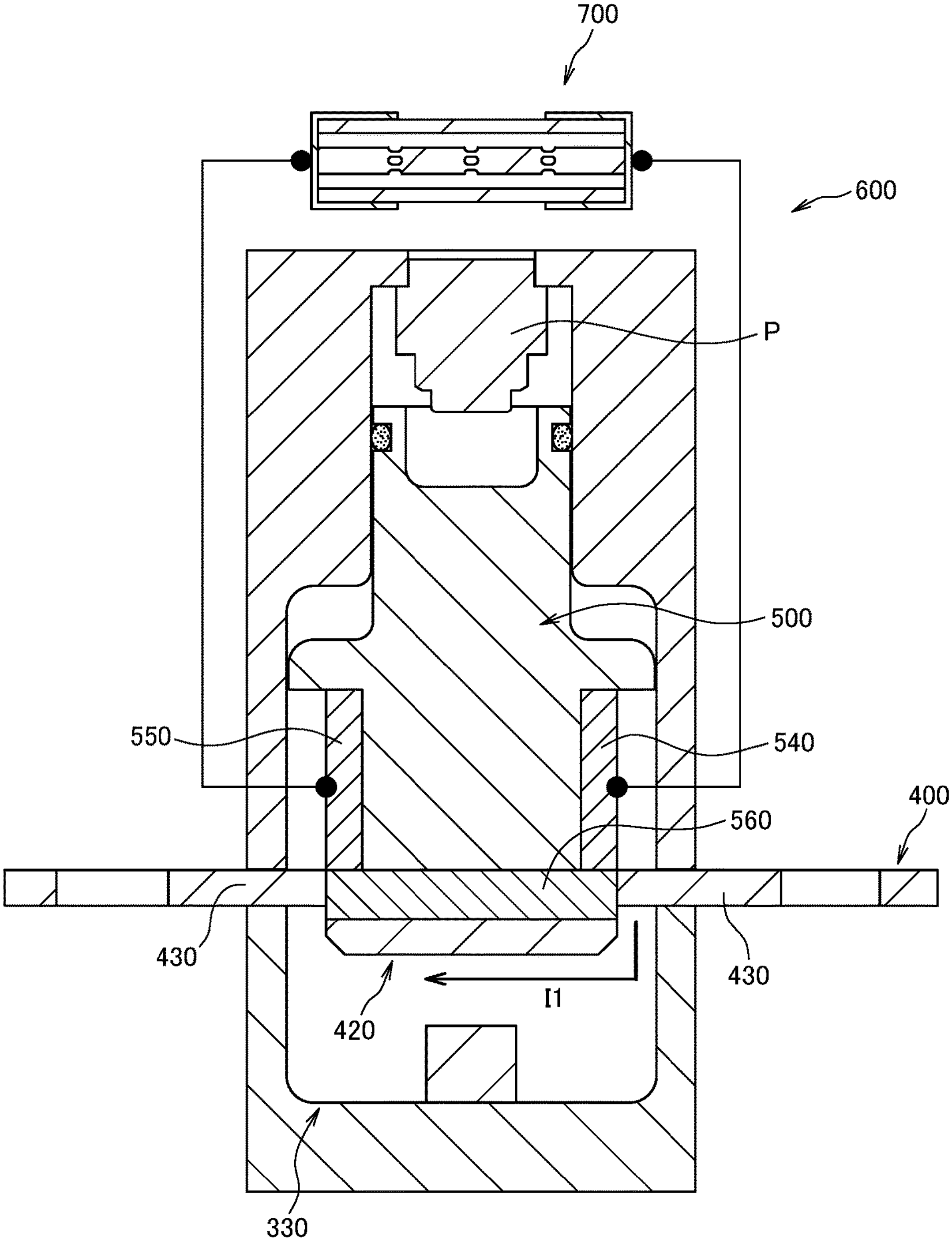
FIG. 10 is a cross-sectional view illustrating a state where the moving body has moved from the state illustrated in FIG. 6.
Figure 11:
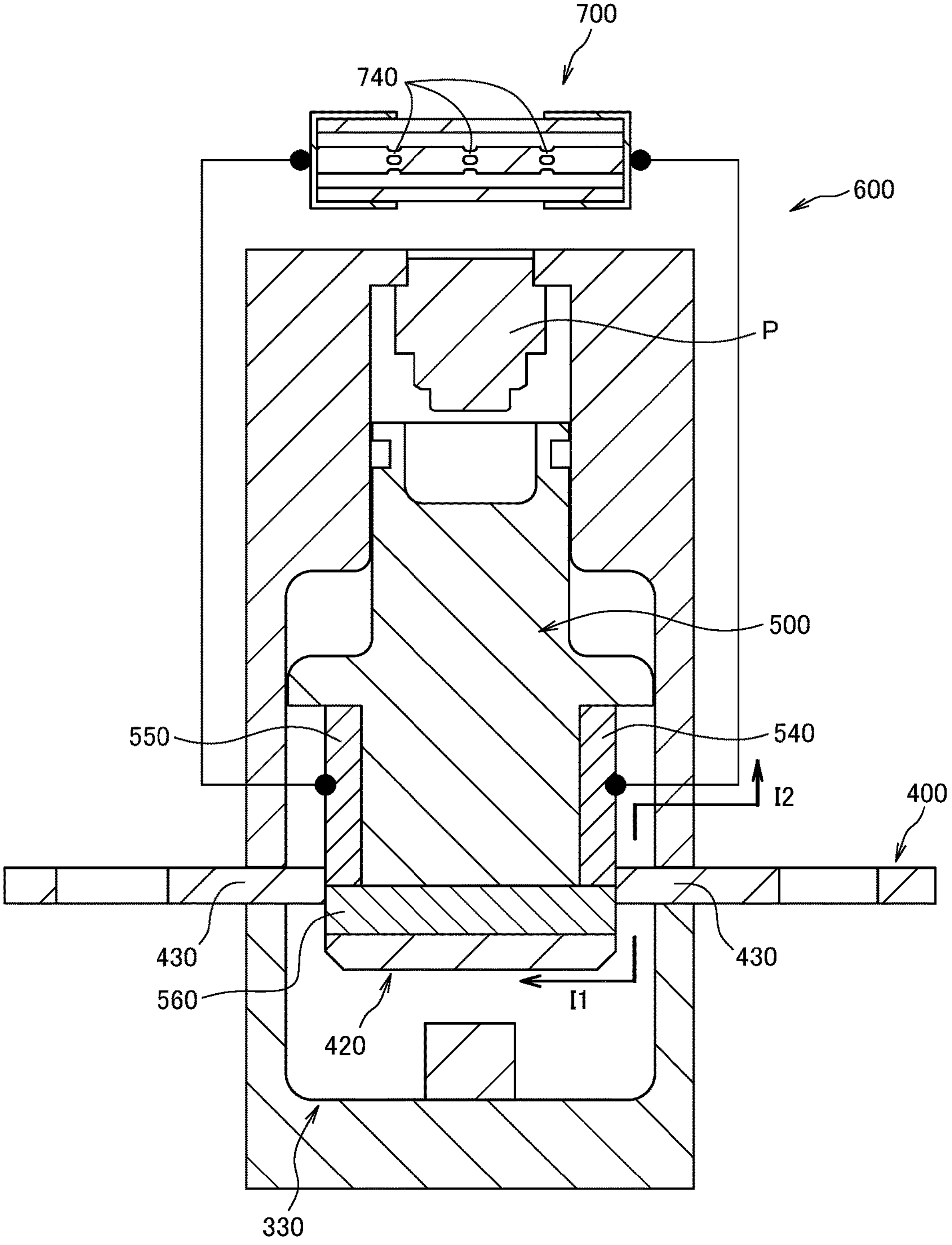
FIG. 11 is a cross-sectional view illustrating a state where the moving body has moved from the state illustrated in FIG. 6.
Figure 12:
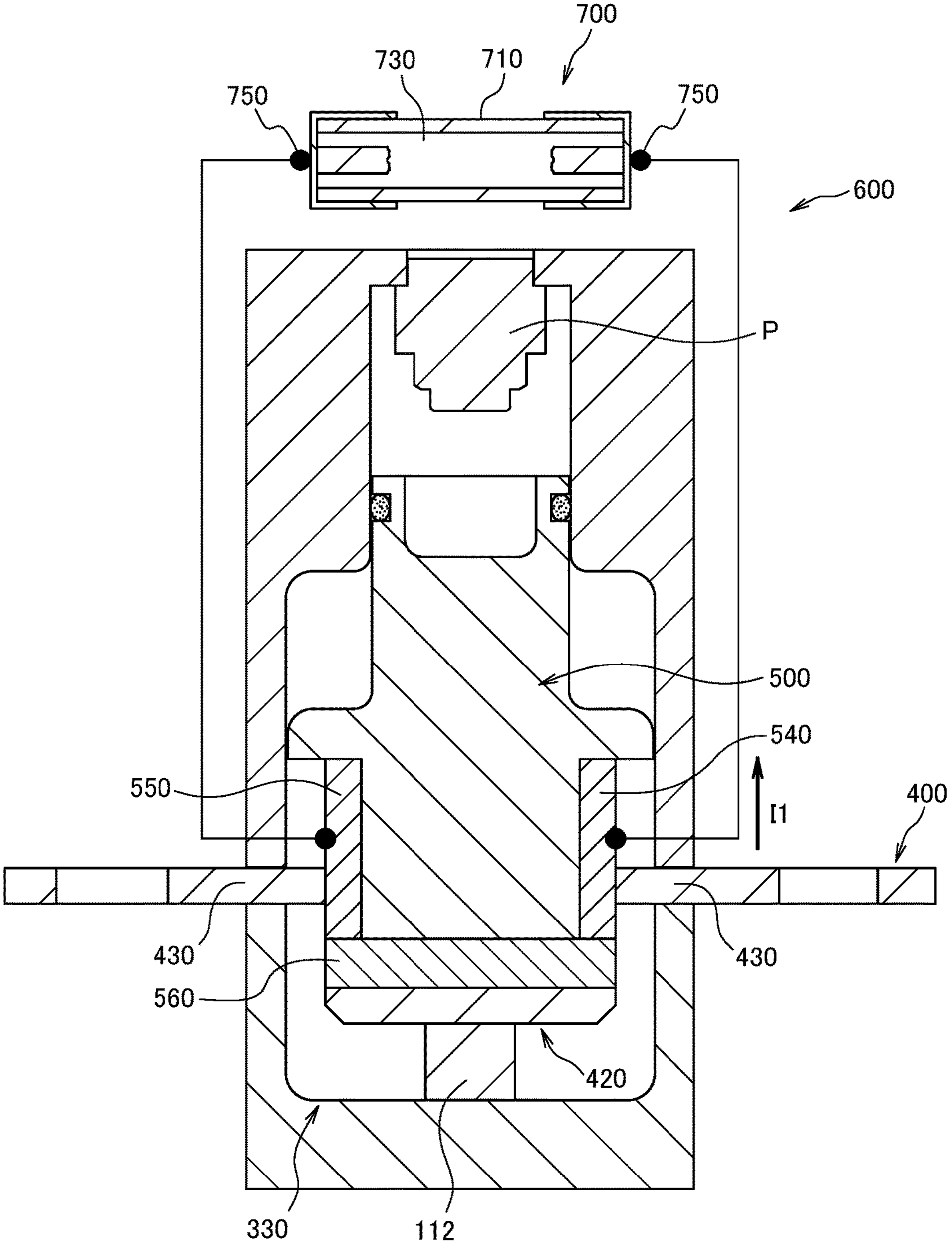
FIG. 12 is a cross-sectional view illustrating a state where the moving body has moved from the state illustrated in FIG. 6.
Figure 13A:
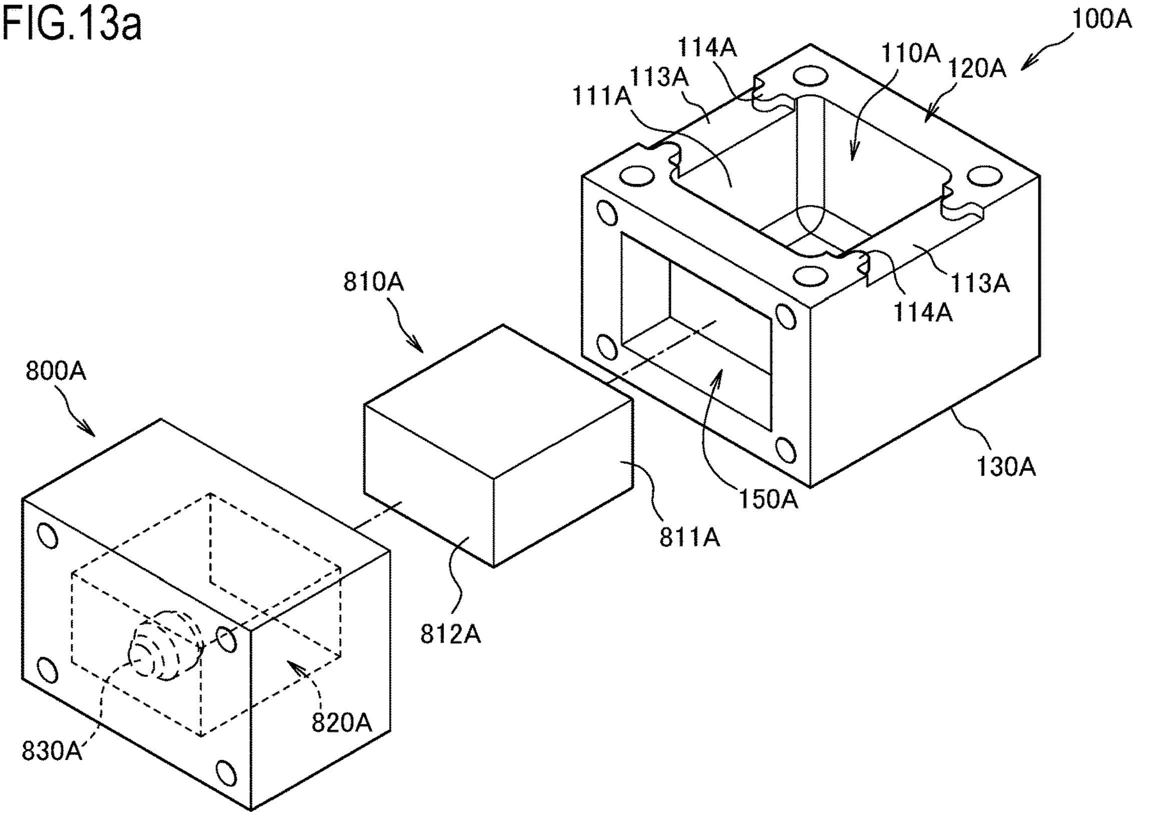
FIG. 13(*a*) is an overall perspective view of a lower housing of an electric circuit breaker according to a second embodiment of the present invention, FIG. 13(*b*) is a plan view of the lower housing, and FIG. 13(*c*) is a cross-sectional view taken along line G-G.
Figure 13B:
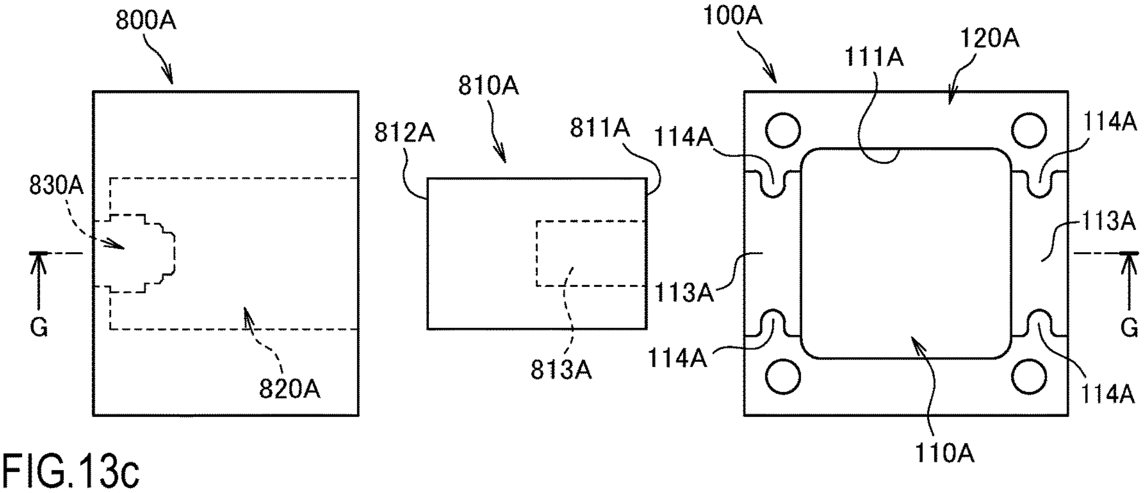
Figure 13C:
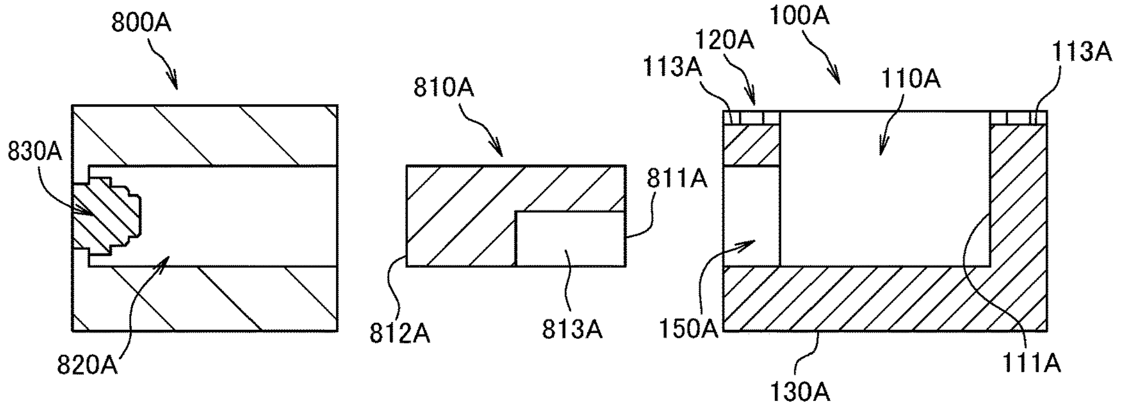

Next, a state where the electric circuit breaker 600 breaks an electric circuit in a case where an overcurrent belonging to a relatively high current range higher than a predetermined value flows through the electric circuit will be described with reference to FIGS. 10 to 12. Note that FIGS. 10 to 12 are cross-sectional views illustrating a state where the moving body 500 has moved from the state illustrated in FIG. 6.

First, assuming that, when detecting an abnormal current in the electric circuit, the device S determines that the abnormal current does not belong to a relatively low current range lower than a predetermined value but belongs to a relatively high current range higher than the predetermined value. Next, the device S inputs the abnormality signal X2 only to the first power source P without inputting the abnormality signal X1 to the second power source 830.

As a result, the gunpowder in the first power source P explodes, and the moving body 500 instantaneously moves toward the second end portion 330 in the housing portion 310. Then, as illustrated in FIG. 10, the moving body 500 moves toward the second end portion 330, the cut piece 420 is strongly pushed downward by the insulator 560 of the moving body 500, and the cut piece 420 is cut in the vicinity of the coupling portion between the cut piece 420 and the base piece 430 and physically separated from the base piece 430.

In this state, since the electrode 540 and the electrode 550 are not in contact with the base piece 430, the current I1 flowing through the base piece 430 does not flow through the electrode 540 and the electrode 550 in the fuse function portion 700. However, the cut piece 420 immediately after being cut and separated is close to the base piece 430, and the abnormal current belongs to the relatively high current range higher than the predetermined value. Therefore, in this state, the arc discharge is instantaneously generated between the cut piece 420 and the base piece 430, and the current I1 can flow between the base pieces 430 on both sides through the cut piece 420.

Next, as illustrated in FIG. 11, when the moving body 500 further moves toward the second end portion 330, the electrode 540 and the electrode 550 come into contact with the base piece 430 in a state where the base piece 430 and the cut piece 420 remain energized by the arc discharge between the cut piece 420 and the base piece 430. Then, the fuse function portion 700 is in a state of being energized with a part of the cut portion 400 via the electrode 540 and the electrode 550, and a part I2 of the current I1 flowing through the electric circuit flows in the fuse function portion 700. Note that, since the device S does not input the abnormality signal X1 to the second power source 830, the regulating unit 800 is not operated, and the distal end portion 811 of the regulating body 810 does not project into the housing portion 310 of the housing 300. Therefore, the movement of the moving body 500 is not regulated by the regulating unit 800.

Next, as illustrated in FIG. 12, when the moving body 500 further moves toward the second end portion 330, the cut piece 420 is pushed and moved toward the second end portion 330 and is largely separated from the base piece 430. Then, the arc discharge between the cut piece 420 and the base piece 430 is physically separated and disappears. Therefore, the state where the base pieces 430 on both sides of the cut portion 400 are energized via the cut piece 420 by the arc discharge is broken, and an overcurrent can be prevented from flowing through the electric circuit.

In addition, as illustrated in FIG. 12, when the cut piece 420 is largely separated from the base piece 430 and the energized state of the cut portion 400 is broken, the current I1(fault current) flowing through the electric circuit is induced in the fuse function portion 700, so that it is possible to prevent the arc discharge between the cut piece 420 and the base piece 430 that are separated from being continuously generated. Note that, as illustrated in FIGS. 10 to 11, the arc discharge generated immediately after the cut piece 420 is separated from the base piece 430 has little energy and disappears immediately because a part of the current I1 is induced in the fuse function portion 700. Therefore, even if the arc discharge is instantaneously generated immediately after the cut piece 420 is separated from the base piece 430, the other parts of the electric circuit breaker 600 are not affected, and there is no problem in safety.

As illustrated in FIG. 12, the fusion portion 740 of the fuse function portion 700 is quickly fused by the current I1 induced in the fuse function portion 700, and the current flowing through the electric circuit is quickly broken. Furthermore, after the fusion portion 740 is fused, an arc is generated between the terminals 750 of the fuse function portion 700 by the voltage applied to the base pieces 430 on both sides connected to the electric circuit, but the arc is quickly and effectively extinguished by the arc-extinguishing material 730 in the fuse function portion 700.

As described above, when the electric circuit breaker 600 breaks a relatively high current (fault current) flowing through the electric circuit, as illustrated in FIGS. 10 to 12, in a state where the base pieces 430 on both sides of the cut portion 400 are energized by arc discharge via the cut piece 420, the cut portion 400 is connected to the fuse function portion 700 via the pair of electrode 540 and electrode 550, and thereafter, as illustrated in FIG. 12, along with the movement of the moving body 500, the cut piece 420 is largely separated from the base piece 430 to extinguish the arc discharge in a manner that the arc discharge does not continue any more, and a state where the base pieces 430 on both sides of the cut portion 400 are energized via the cut piece 420 is broken. That is, before the state where the cut portion 400 is energized is completely broken and the arc discharge is continuously generated between the base pieces 430 on both sides, the state where the cut portion 400 and the fuse function portion 700 are connected is secured, so that the arc due to a relatively high fault current can be reliably induced in the fuse function portion 700 and extinguished in the fuse function portion 700. As a result, it is possible to prevent the electric circuit breaker 600 from being damaged by the arc between the base pieces 430 due to the fault current being continuously generated in the housing 300, and to safely break the electric circuit.

Note that, as illustrated in FIG. 12, when the moving body 500 further moves toward the second end portion 330, the cut piece 420 pushed out by the moving body 500 abuts on the abutment base 112, and the moving body 500 stops. Since the insulator 560 is disposed between the base piece 430 and the cut piece 420, between the electrode 540 and the cut piece 420, and between the electrode 550 and the cut piece 420, even if a voltage is inadvertently applied between the base pieces 430, it is possible to prevent an arc from being generated between the cut piece 420 and the base piece 430 and the base pieces 430 on both sides from being energized. Furthermore, as illustrated in FIGS. 10 to 12, after the pair of electrodes 540 and 550 come into contact with a part of the cut portion 400, the electrodes 540 and 550 move toward the second end portion 330 and always maintain a state of being in contact with a part of the cut portion 400, so that the state where the cut portion 400 is connected to the fuse function portion 700 is also always maintained.

As described above, according to the electric circuit breaker 600 of the present invention, in a case where the overcurrent belonging to the relatively low current range flows through the electric circuit, as illustrated in FIGS. 8 and 9, the cut portion 400 and the fuse function portion 700 are not connected, and the cut piece 420 between the base pieces 430 on both sides of the cut portion 400 is cut, and the state where the base pieces 430 on both sides are energized is immediately broken, so that the overcurrent is prevented from flowing through the electric circuit. Therefore, it is possible to solve the problem that, as in a conventional case, the current belonging to the relatively low current range cannot be broken because the fusion portion 740 of the fuse function portion 700 is not fused or the overcurrent flowing through the electric circuit cannot be broken immediately because it takes a relatively long time to break the current. On the other hand, in a case where the overcurrent belonging to the relatively high current range flows through the electric circuit, as illustrated in FIGS. 10 to 12, the cut portion 400 and the fuse function portion 700 are connected, and the cut piece 420 between the base pieces 430 on both sides of the cut portion 400 is cut, and the state where the base pieces 430 on both sides are energized is immediately and safely broken, so that the overcurrent is prevented from flowing through the electric circuit. As described above, the electric circuit breaker 600 of the present invention quickly breaks current in a wide current range up to a relatively low current as well as a relatively high current.

Second Embodiment

Next, an electric circuit breaker 600A according to a second embodiment of the present invention will be described with reference to FIGS. 13 to 16. In addition, since the configuration of the electric circuit breaker 600A according to the second embodiment is basically the same as the configuration of the electric circuit breaker 600 according to the first embodiment except for the configuration of a regulating unit 800A, the description of the same configuration will be omitted. Note that FIG. 13(*a*) is an overall perspective view of a lower housing 100A, FIG. 13(*b*) is a plan view of the lower housing 100A, and FIG. 13(*c*) is a cross-sectional view taken along line G-G.

The regulating unit 800A formed of an insulator such as a synthetic resin is attached to the lower housing 100A. The regulating unit 800A includes a housing portion 820A in which a regulating body 810A is slidably housed, and a second power source 830A for moving the regulating body 810A. The regulating body 810A has a substantially rectangular parallelepiped shape, includes a terminal portion 812A and a distal end portion 811A, and includes a space 813A in which a part of an abutment base 112A to be described later can be housed. In addition, the lower housing 100A includes a through-hole 150A that allows a lower housing portion 110A in the lower housing and the housing portion 820A of the regulating unit 800A to communicate with each other, and the through-hole 150A is formed in a manner that the regulating body 810A of the regulating unit 800A can be inserted therethrough. As described in detail later, power such as air pressure generated from the second power source 830A housed in the housing portion 820A is transmitted to the regulating body 810A in the housing portion 820A, and the moving regulating body 810A is inserted through the through-hole 150A and moved to the lower housing portion 110A of the lower housing 100A. Note that the regulating unit 800A is attached to the lower housing 100A, but is not limited thereto, and can be attached to any place as long as it is a part of the housing 300.

Figure 14:
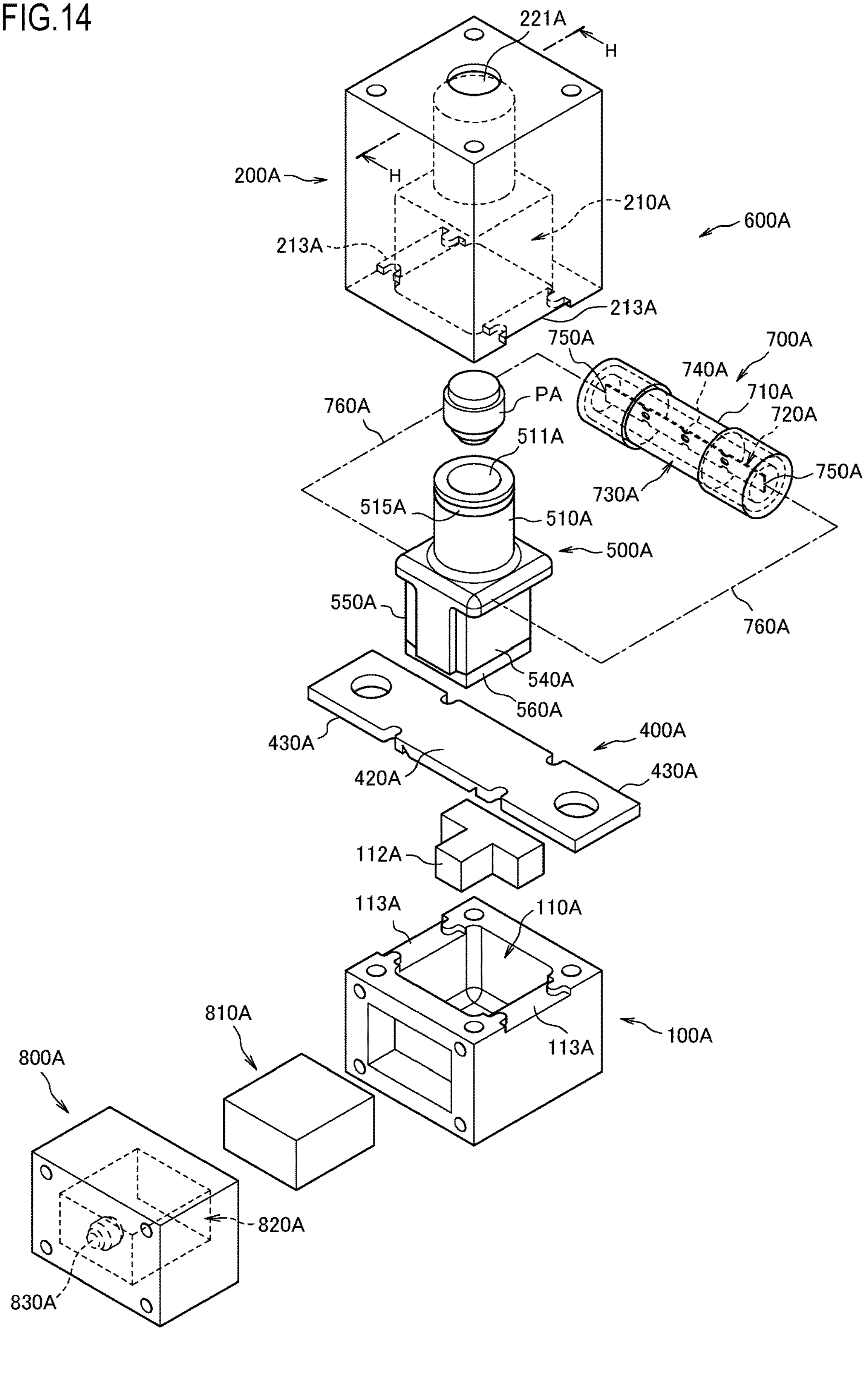
FIG. 14 is an exploded perspective view of the electric circuit breaker according to the second embodiment of the present invention.

Next, a method of assembling the electric circuit breaker 600A of the present invention will be described with reference to FIG. 14. Note that FIG. 14 is an exploded perspective view of the electric circuit breaker 600A.

When the electric circuit breaker 600A is assembled, first, the abutment base 112A with a substantially T shape formed of an insulator is fixed to the bottom of the lower housing portion 110A of the lower housing 100A. Next, a cut portion 400A is disposed in a manner that a cut piece 420A traverses the lower housing portion 110A of the lower housing 100A.

Next, an upper housing 200A is fitted from above the lower housing 100A in a manner that the side of a body 510A of a moving body 500A is inserted into an upper housing portion 210A of the upper housing 200A. Then, a housing 300A including the lower housing 100A and the upper housing 200A is assembled in a state where the cut portion 400A and the moving body 500A are housed therein. Furthermore, a first power source PA is attached to a power source storage portion 221A of the upper housing 200A, and a part of the first power source PA is housed in a recessed portion 511A of the moving body 500A.

In addition, the regulating unit 800A is attached to the lower housing 100A. A part of the regulating body 810A is configured to be movable into the lower housing portion 110A of the lower housing 100A by the second power source 830A. When it is detected that an abnormal current flows through the electric circuit and an abnormality signal is input from an external device to the second power source 830A, for example, the gunpowder in the second power source 830A is exploded, and the regulating body 810A is instantaneously pushed out and moved in the housing portion 820A by the air pressure due to the explosion.

The electric circuit breaker 600A also includes a fuse function portion 700A. Terminals 750A on both sides of a fuse element 720A are electrically connected to paired electrodes 540A and 550A by connection members 760A such as electric wires. Note that the fuse function portion 700A can be attached to any place in the housing 300A.

Figure 15:
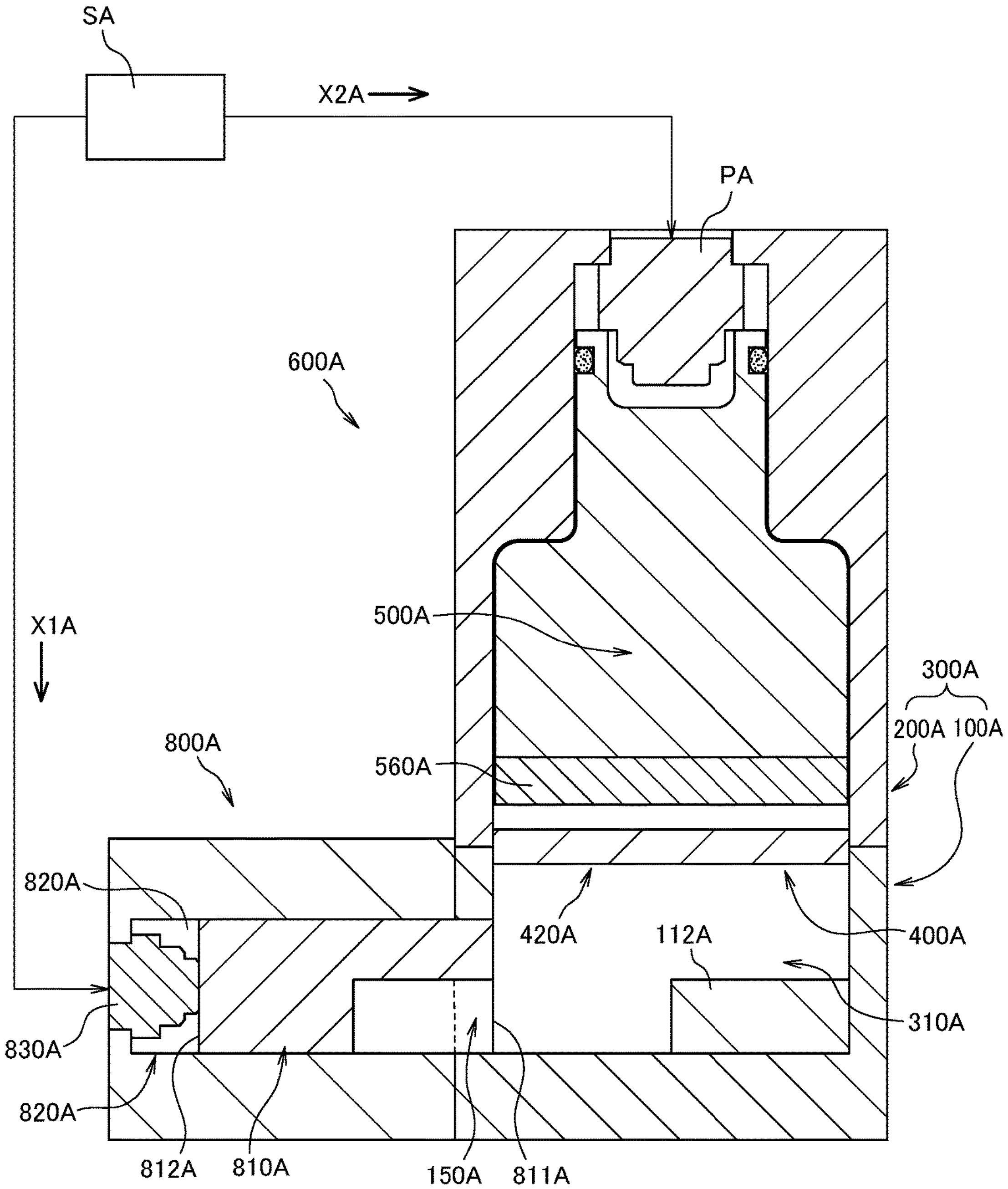
FIG. 15 is a cross-sectional view taken along line H-H in a state where the electric circuit breaker illustrated in FIG. 14 is assembled.

Next, an internal structure of the electric circuit breaker 600A according to the second embodiment of the present invention will be described with reference to FIG. 15. FIG. 15 is a cross-sectional view taken along line H-H in a state where the electric circuit breaker 600A illustrated in FIG. 14 is assembled.

The assembled and completed electric circuit breaker 600A is attached in an electric circuit to be protected and used. Specifically, a base piece 430A of the cut portion 400A is connected to a part of the electric circuit, and the cut portion 400A constitutes a part of the electric circuit. An insulator 560A provided at the lower end of the moving body 500A extends along the cut piece 420A and is disposed away from the cut piece 420A. In a normal state, since the base piece 430A and the cut piece 420A of the cut portion 400A are not cut and are physically and electrically connected, a current flows through the electric circuit via the base piece 430A and the cut piece 420A of the cut portion 400A. In addition, the side of the distal end portion 811A of the regulating body 810A of the regulating unit 800A is inserted into the through-hole 150A of the housing 300A but does not project to the housing portion 310A. Therefore, in the normal state, a part of the regulating body 810A of the regulating unit 800A does not project to the housing portion 310A, and the regulating unit 800A does not regulate the movement of the moving body 500A.

Furthermore, as illustrated in FIG. 15, a device SA that detects an abnormal current in the electric circuit is connected to the electric circuit to be protected. When determining that the abnormal current belongs to a relatively low current range lower than a predetermined value, the device SA inputs an abnormality signal X1A to the second power source 830A. Thereafter, after a predetermined time has elapsed, the device SA inputs an abnormality signal X2A to the first power source PA. As described later, the predetermined time is a time until the regulating body 810A projects into the housing portion 310A of the housing 300A by the second power source 830A and the regulating unit 800A is brought to a state capable of regulating the movement of the moving body 500A. On the other hand, when determining that the detected abnormal current does not belong to the relatively low current range lower than the predetermined value and belongs to a relatively high current range higher than the predetermined value, the device SA inputs the abnormality signal X2A only to the first power source PA without inputting the abnormality signal XIA to the second power source 830A.

Figure 16:
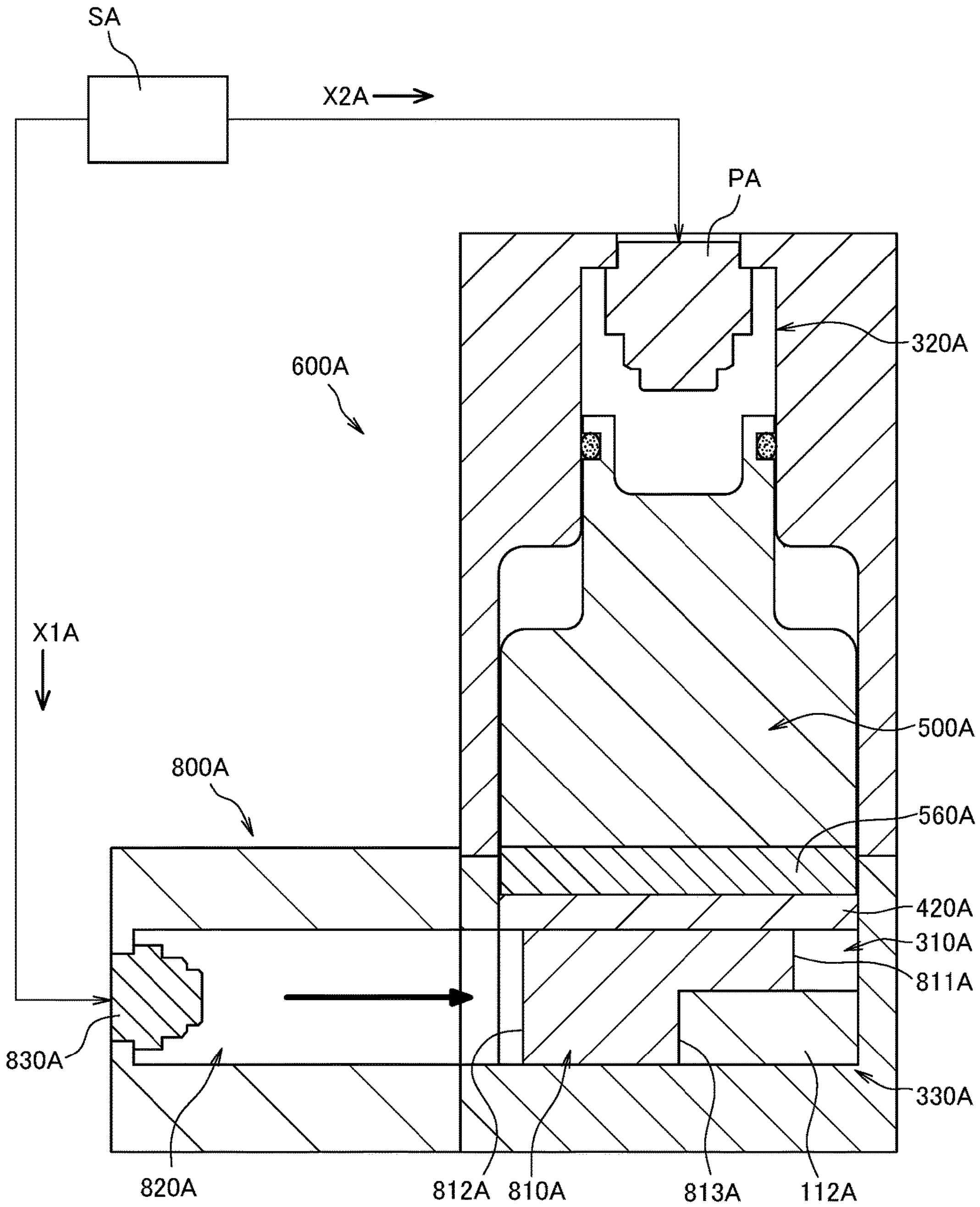
FIG. 16 is a cross-sectional view illustrating a state where a moving body has moved from the state illustrated in FIG. 15.
Figure 17A:
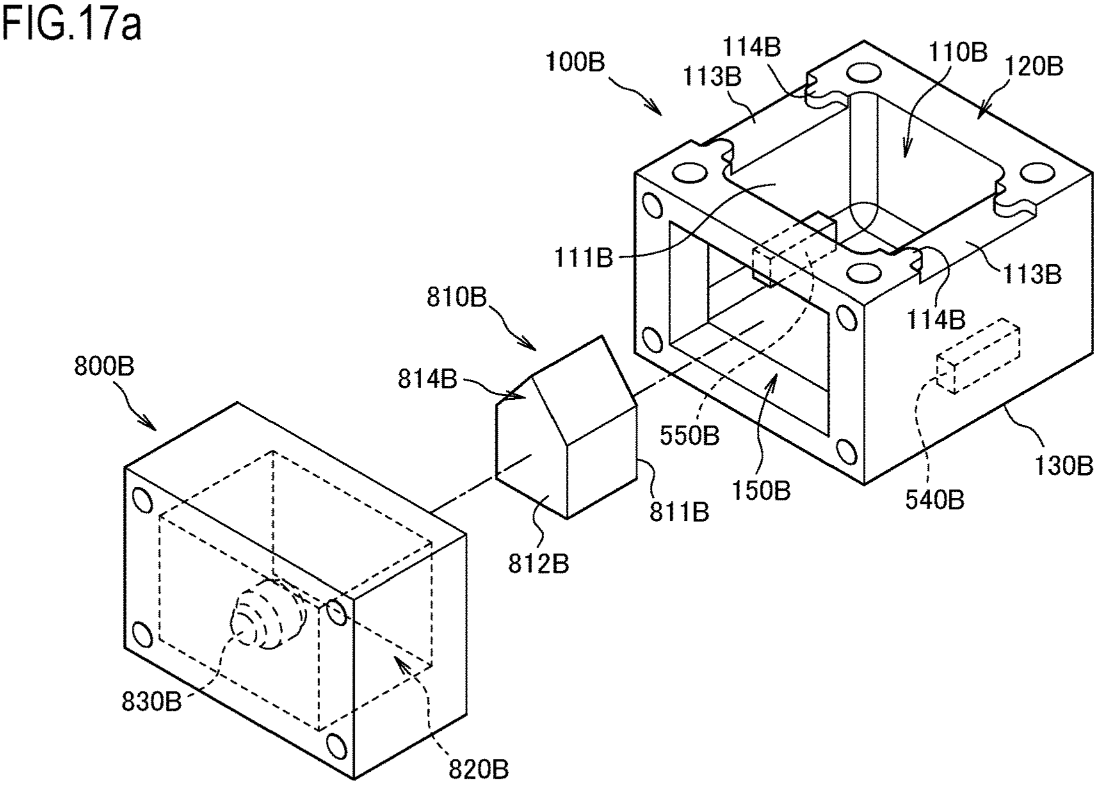
FIG. 17(*a*) is an overall perspective view of a lower housing of an electric circuit breaker according to a third embodiment of the present invention, FIG. 17(*b*) is a plan view of the lower housing, and FIG. 17(*c*) is a cross-sectional view taken along line I-I.
Figure 17B:
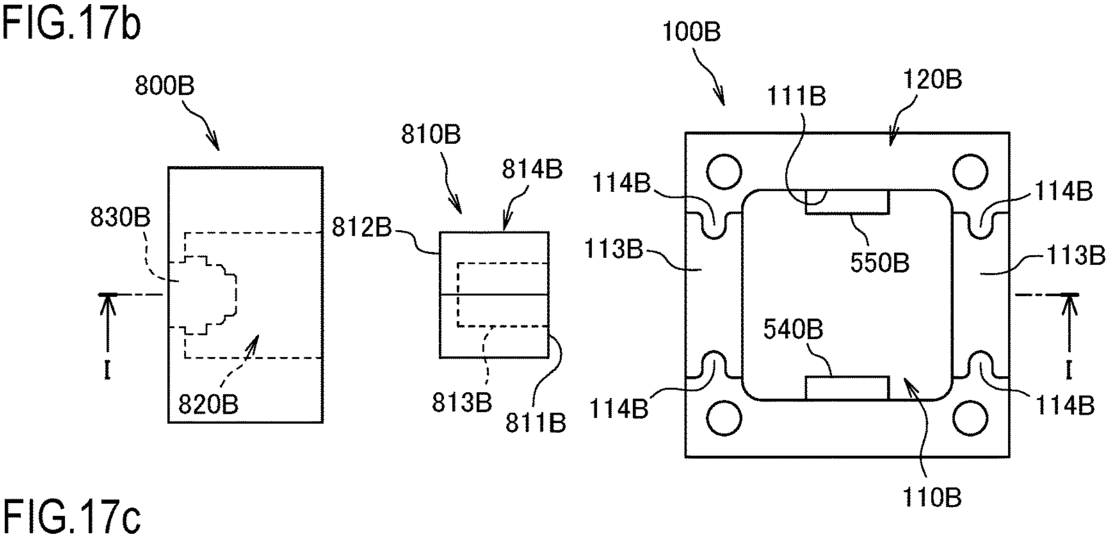
Figure 17C:
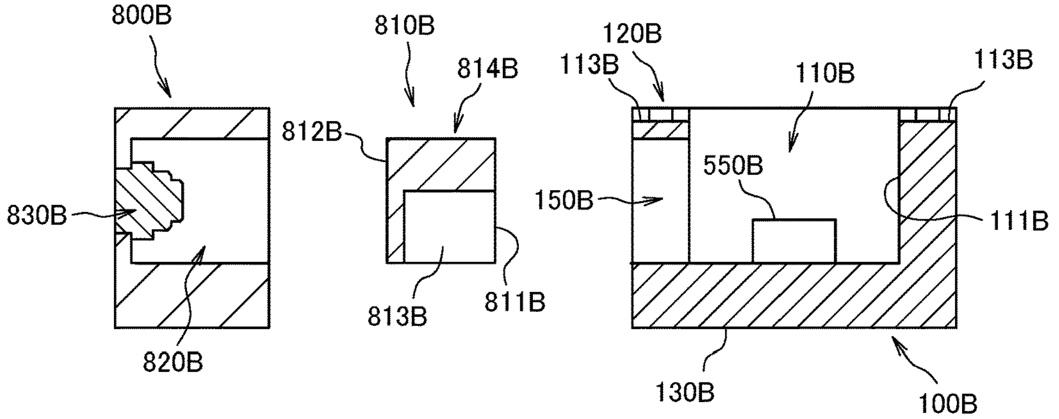

Next, a state where the electric circuit breaker 600A breaks an electric circuit in a case where an overcurrent belonging to a relatively low current range lower than a predetermined value flows through the electric circuit will be described with reference to FIG. 16. Note that FIG. 16 is a cross-sectional view illustrating a state where the moving body 500A has moved from the state illustrated in FIG. 15.

First, assuming that, when detecting an abnormal current in the electric circuit, the device SA determines that the abnormal current belongs to a relatively low current range lower than a predetermined value (for example, 1000 to 2000 A [amps]). Next, the device SA inputs the abnormality signal X1A to the second power source 830A. As a result, the gunpowder in the second power source 830A explodes, and the air pressure due to the explosion is transmitted to the terminal portion 812A of the regulating body 810A. Then, the regulating body 810A is forcefully blown toward the housing portion 310A of the housing 300A by the air pressure and moves in the housing portion 820A. The regulating body 810A then projects into the housing portion 310A of the housing 300A and is located under the moving body 500. At this time, since the abutment base 112A disposed in the housing portion 310A is housed in the space 813A of the regulating body 810A, it does not interfere with the movement of the regulating body 810A.

Thereafter, the device SA inputs the abnormality signal X2A to the first power source PA. As a result, the gunpowder in the first power source PA explodes, and the moving body 500A is forcefully blown from the first end portion 320A toward the second end portion 330A by the air pressure due to the explosion, and instantaneously moves toward the second end portion 330A in the housing portion 310A.

Then, the cut piece 420A is strongly pushed downward by the insulator 560A of the moving body 500A, and the cut piece 420A is cut in the vicinity of the coupling portion between the cut piece 420A and the base piece 430A and physically separated from the base piece 430A. Therefore, the state where the base pieces 430A on both sides are energized is immediately broken, and an overcurrent can be prevented from flowing through the electric circuit. Note that, since the abnormal current belongs to the relatively low current range lower than the predetermined value, the arc discharge is not generated even if the distance between the cut piece 420A and the base piece 430A that are separated is short, and it is possible to more reliably prevent the arc discharge from being generated by the insulator 560A interposed between the base pieces 430A.

In addition, since the lower end side of the moving body 500A abuts on the regulating body 810A projecting into the housing portion 310A so as to sandwich the separated cut piece 420A with the regulating body, the moving body 500A cannot further move toward the second end portion 330A. In this state, similarly to the electric circuit breaker 600 according to the first embodiment illustrated in FIG. 8, since the electrode is not in contact with the base piece 430A, the current flowing through the base piece 430A does not flow through the electrode in the fuse function portion 700A. That is, the regulating body 810A regulates the movement of the moving body 500A in a manner that a part of the cut portion 400A and the electrode do not come into contact with each other in order to make the cut portion 400A and the fuse function portion 700A unconnected. Note that the regulating body 810A of the regulating unit 800A abuts on the moving body 500A so as to be located under the moving body 500A, and regulates the movement of the moving body 500A. Therefore, the regulating body 810A of the regulating unit 800A can receive the lower side of the moving body 500A in a firm and stable state, and the structure of the regulating body 810A of the regulating unit 800A is also simplified.

Next, the case where an overcurrent belonging to a relatively high current range higher than a predetermined value flows through the electric circuit will be described. When detecting an abnormal current in the electric circuit, the device SA determines that the abnormal current does not belong to a relatively low current range lower than a predetermined value but belongs to a relatively high current range higher than the predetermined value. Next, the device SA inputs the abnormality signal X2A only to the first power source PA without inputting the abnormality signal X1A to the second power source 830A. Note that, since the device SA does not input the abnormality signal X1A to the second power source 830A, the regulating unit 800A is not operated, and the regulating body 810A does not project into the housing portion 310A of the housing 300A, and thus the movement of the moving body 500A is not regulated by the regulating unit 800A.

Then, the gunpowder in the first power source P explodes by the abnormality signal X2A, and the moving body 500A instantaneously moves toward the second end portion 330A in the housing portion 310A. The subsequent operation of the electric circuit breaker 600A to break the electric circuit is similar to the operation mode of the electric circuit breaker 600 according to the first embodiment illustrated in FIGS. 10 to 12. As a result, it is possible to prevent the electric circuit breaker 600A from being damaged by the arc between the base pieces 430A due to a fault current being continuously generated in the housing 300A, and to safely break the electric circuit.

Third Embodiment

Next, an electric circuit breaker 600B according to a third embodiment of the present invention will be described with reference to FIGS. 17 to 25. In addition, since the configuration of the electric circuit breaker 600B according to the third embodiment is basically the same as the configuration of the electric circuit breaker 600 according to the first embodiment except that the arrangement of an electrode 540B and an electrode 550B, and a conductor 570B is provided, the description of the same configuration will be omitted. Note that FIG. 17(*a*) is an overall perspective view of a lower housing 100B, FIG. 17(*b*) is a plan view of the lower housing 100B, and FIG. 17(*c*) is a cross-sectional view taken along line I-I.

A regulating unit 800B formed of an insulator such as a synthetic resin is attached to the lower housing 100B. The regulating unit 800B includes a housing portion 820B in which a regulating body 810B is slidably housed, and a second power source 830B for moving the regulating body 810B. The regulating body 810B has a substantially rectangular parallelepiped shape with a sharp upper end 814B, includes a terminal portion 812B and a distal end portion 811B, and includes a substantially rectangular parallelepiped space 813B in which a part of an abutment base 112B to be described later can be housed. In addition, the lower housing 100B includes a through-hole 150B that allows a lower housing portion 110B in the lower housing and the housing portion 820B of the regulating unit 800B to communicate with each other, and the through-hole 150B is formed in a manner that the regulating body 810B of the regulating unit 800B can be inserted therethrough. As described in detail later, power such as air pressure generated from the second power source 830B housed in the housing portion 820B is transmitted to the regulating body 810B in the housing portion 820B to move the regulating body 810B toward the lower housing portion 110B of the lower housing 100B. Then, the regulating body 810B, which has moved, passes through the through-hole 150B and moves into the lower housing portion 110B of the lower housing 100B. Note that the regulating unit 800B is attached to the lower housing 100B, but is not limited thereto, and can be attached to any place as long as it is a part of the housing 300B.

Figure 18:
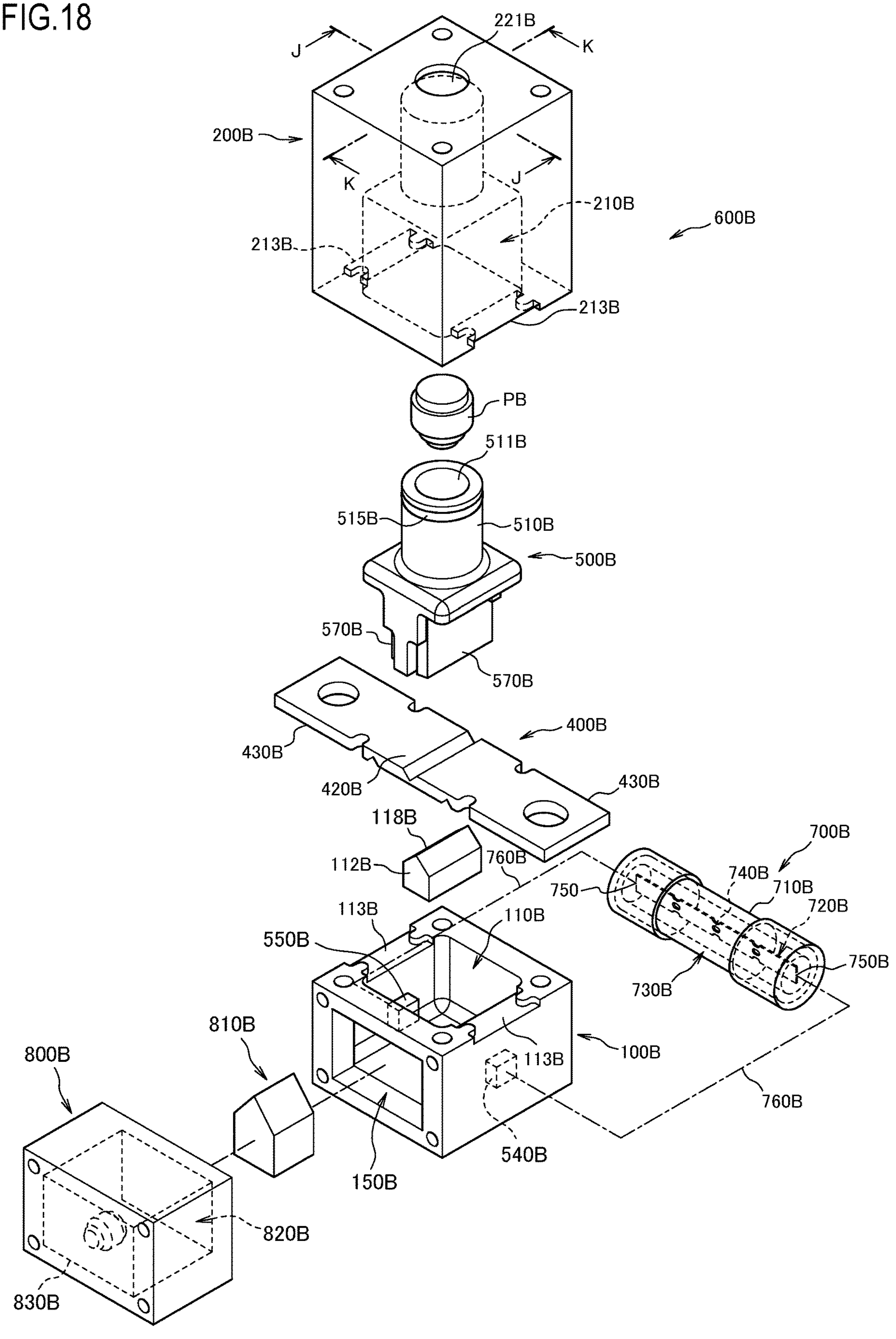
FIG. 18 is an exploded perspective view of the electric circuit breaker according to the third embodiment of the present invention.

Next, a method of assembling the electric circuit breaker 600B of the present invention will be described with reference to FIG. 18. Note that FIG. 18 is an exploded perspective view of the electric circuit breaker 600B.

When the electric circuit breaker 600B is assembled, first, the substantially rectangular parallelepiped abutment base

112B with a sharp distal end 118B formed of an insulator is fixed to the bottom of the lower housing portion 110B of the lower housing 100B. Next, a cut portion 400B is disposed in a manner that a cut piece 420B traverses the lower housing portion 110B of the lower housing 100B.

Next, an upper housing 200B is fitted from above the lower housing 100B in a manner that the side of a body 510B of a moving body 500B is inserted into an upper housing portion 210B of the upper housing 200B. Then, a housing 300B including the lower housing 100B and the upper housing 200B is assembled in a state where the cut portion 400B and the moving body 500B are housed therein. Furthermore, a first power source PB is attached to a power source storage portion 221B of the upper housing 200B, and a part of the first power source PB is housed in a recessed portion 511B of the moving body 500B.

In addition, the regulating unit 800B is attached to the lower housing 100B. A part of the regulating body 810B is configured to be movable into the lower housing portion 110B of the lower housing 100B by the second power source 830B. When it is detected that an abnormal current flows through the electric circuit and an abnormality signal is input from an external device to the second power source 830B, for example, the gunpowder in the second power source 830B is exploded, and the regulating body 810B is instantaneously pushed out and moved in the housing portion 820B by the air pressure due to the explosion.

The electric circuit breaker 600B also includes a fuse function portion 700B. Terminals 750B on both sides of a fuse element 720B are electrically connected to paired electrodes 540B and 550B arranged in the lower housing portion 110B of the lower housing 100B by connection members 760B such as electric wires. Note that the fuse function portion 700B can be attached to any place in the housing 300B.

Figure 19:
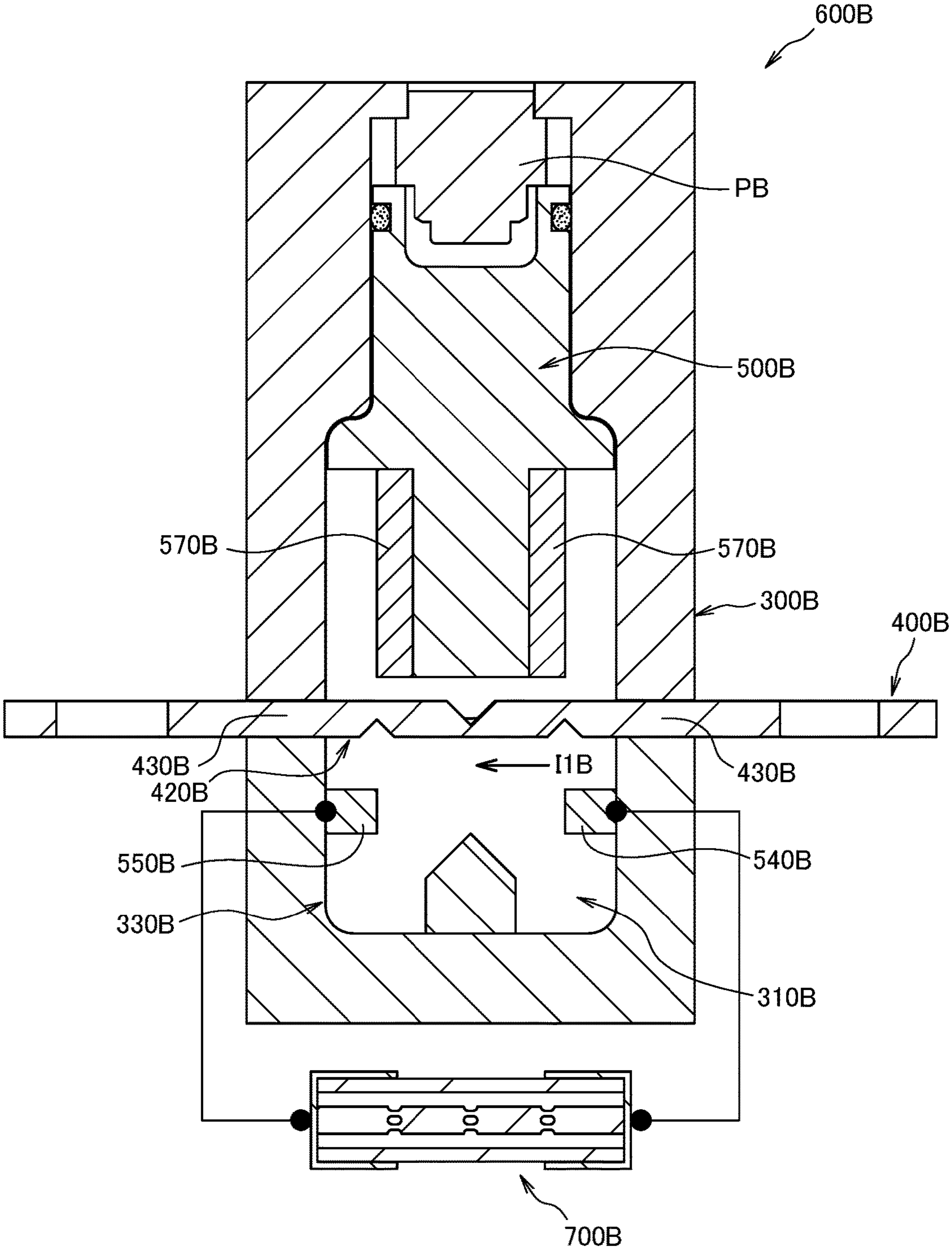
FIG. 19 is a cross-sectional view taken along line J-J in a state where the electric circuit breaker illustrated in FIG. 18 is assembled.

Next, an internal structure of the electric circuit breaker 600B according to the third embodiment of the present invention will be described with reference to FIGS. 19 and 20. Note that FIG. 19 is a cross-sectional view taken along line J-J in a state where the electric circuit breaker 600B illustrated in FIG. 18 is assembled, and FIG. 20 is a cross-sectional view taken along line K-K in a state where the electric circuit breaker 600B illustrated in FIG. 18 is assembled.

The assembled and completed electric circuit breaker 600B is attached in an electric circuit to be protected and used. Specifically, a base piece 430B of the cut portion 400B is connected to a part of the electric circuit, and the cut portion 400B constitutes a part of the electric circuit. Furthermore, the electrode 540B and the electrode 550B are arranged on the side of a second end portion 330B in the housing portion 310B of the housing 300B, and are located on the opposite side of the moving body 500B with the cut piece 420B interposed therebetween. In addition, the fuse function portion 700B is fixed at an arbitrary position of the housing 300B. Furthermore, a pair of conductors 570B formed of metal such as copper is provided on the distal end side of the moving body 500B so as to face the cut pieces 420B. Note that, in a normal state, since the base piece 430B and the cut piece 420B of the cut portion 400B are not cut and are physically and electrically connected, a current I1B flows through the electric circuit via the base piece 430B and the cut piece 420B of the cut portion 400B. Note that the paired electrodes 540B and 550B are arranged below the cut piece 420B away from the cut piece 420B. Therefore, since the paired electrodes 540B and 550B are not physically and electrically connected to the cut portion 400B, the current flowing through the electric circuit does not flow in the fuse function portion 700B via the electrodes 540B and 550B. In addition, the conductors 570B on both sides are physically separated from each other and are not electrically connected to each other. Moreover, the conductor 570B is disposed above the cut piece 420B away from the cut piece 420B.

Figure 20:
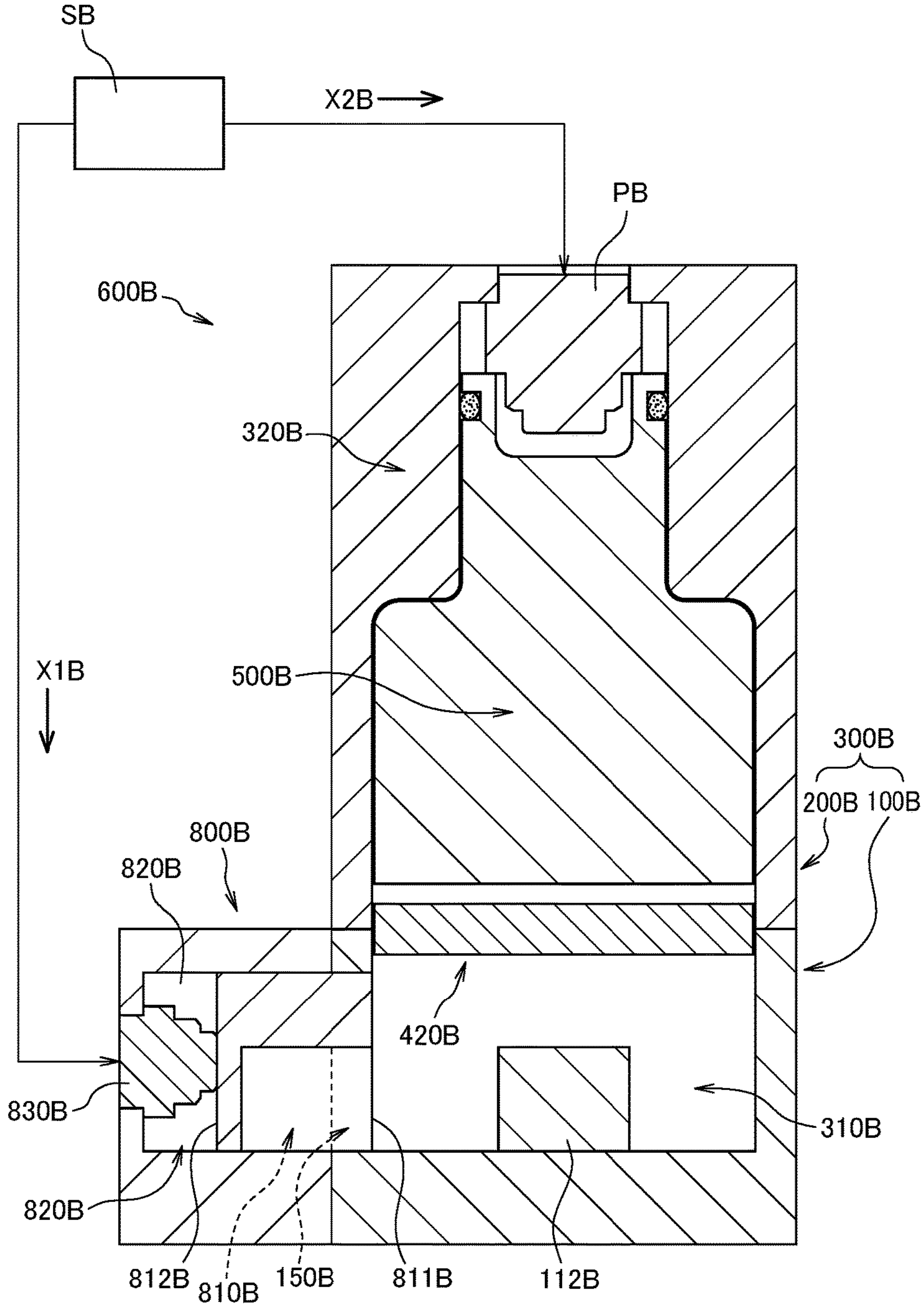
FIG. 20 is a cross-sectional view taken along line K-K in a state where the electric circuit breaker illustrated in FIG. 18 is assembled.

In addition, as illustrated in FIG. 20, the side of the distal end portion 811B of the regulating body 810B of the regulating unit 800B is inserted into the through-hole 150B of the housing 300B but does not project to the housing portion 310B. Therefore, in the normal state, a part of the regulating body 810B of the regulating unit 800B does not project to the housing portion 310B, and the regulating unit 800B does not regulate the movement of the moving body 500B.

Furthermore, as illustrated in FIG. 20, a device SB that detects an abnormal current in the electric circuit is connected to the electric circuit to be protected. When determining that the abnormal current belongs to a relatively low current range lower than a predetermined value, the device SB inputs an abnormality signal X1B to the second power source 830B. Thereafter, after a predetermined time has elapsed, the device SB inputs an abnormality signal X2B to the first power source PB. Note that, as described later, the predetermined time is a time until the regulating body 810B projects into the housing portion 310B of the housing 300B by the second power source 830B. On the other hand, when determining that the detected abnormal current does not belong to the relatively low current range lower than the predetermined value and belongs to a relatively high current range higher than the predetermined value, the device SB inputs the abnormality signal X2B only to the first power source PB without inputting the abnormality signal X1B to the second power source 830B.

Next, a state where the electric circuit breaker 600B breaks an electric circuit in a case where an overcurrent belonging to a relatively low current range lower than a predetermined value flows through the electric circuit will be described with reference to FIGS. 21 and 22. Note that FIG. 21 is a cross-sectional view illustrating a state where the moving body 500B has moved from the state illustrated in FIG. 19, and FIG. 22 is a cross-sectional view illustrating a state where the moving body 500B has moved from the state illustrated in FIG. 20.

First, when detecting an abnormal current in the electric circuit, the device SB determines that the abnormal current belongs to a relatively low current range lower than a predetermined value (for example, 1000 to 2000 A [amps]). Next, the device SB inputs the abnormality signal X1B to the second power source 830B. As a result, the gunpowder in the second power source 830B explodes, and the air pressure due to the explosion is transmitted to the terminal portion 812B of the regulating body 810B. Then, the regulating body 810B is forcefully blown toward the housing portion 310B of the housing 300B by the air pressure and moves in the housing portion 820B. The regulating body 810B then projects into the housing portion 310B of the housing 300B and is located under the moving body 500B. At this time, since the abutment base 112B disposed in the housing portion 310B is housed in the space 813B of the regulating body 810B, it does not interfere with the movement of the regulating body 810B. A height L1 of the regulating body 810B is higher than a height L2 of the abutment base 112B. Therefore, as described later, by the moving body 500B abutting on the regulating body 810B with a high height, the amount of movement by which the moving body 500B can move downward toward the second end portion 330B can be further regulated.

Thereafter, the device SB inputs the abnormality signal X2B to the first power source PB. As a result, the gunpowder in the first power source PB explodes, and the moving body 500B is forcefully blown from the first end portion 320B toward the second end portion 330B by the air pressure due to the explosion, and instantaneously moves toward the second end portion 330B in the housing portion 310B.

Figure 21:
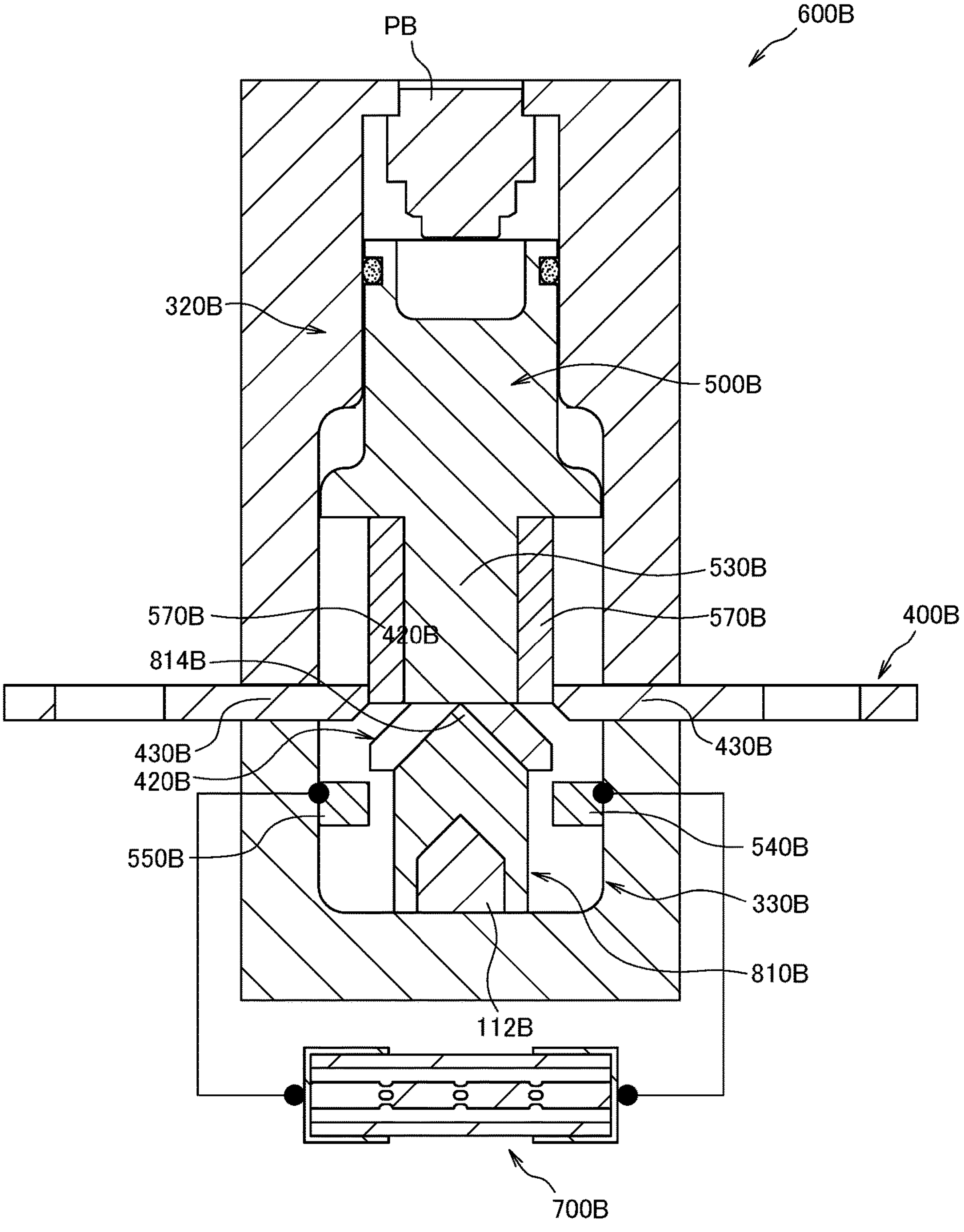
FIG. 21 is a cross-sectional view illustrating a state where a moving body has moved from the state illustrated in FIG. 19.
Figure 22:
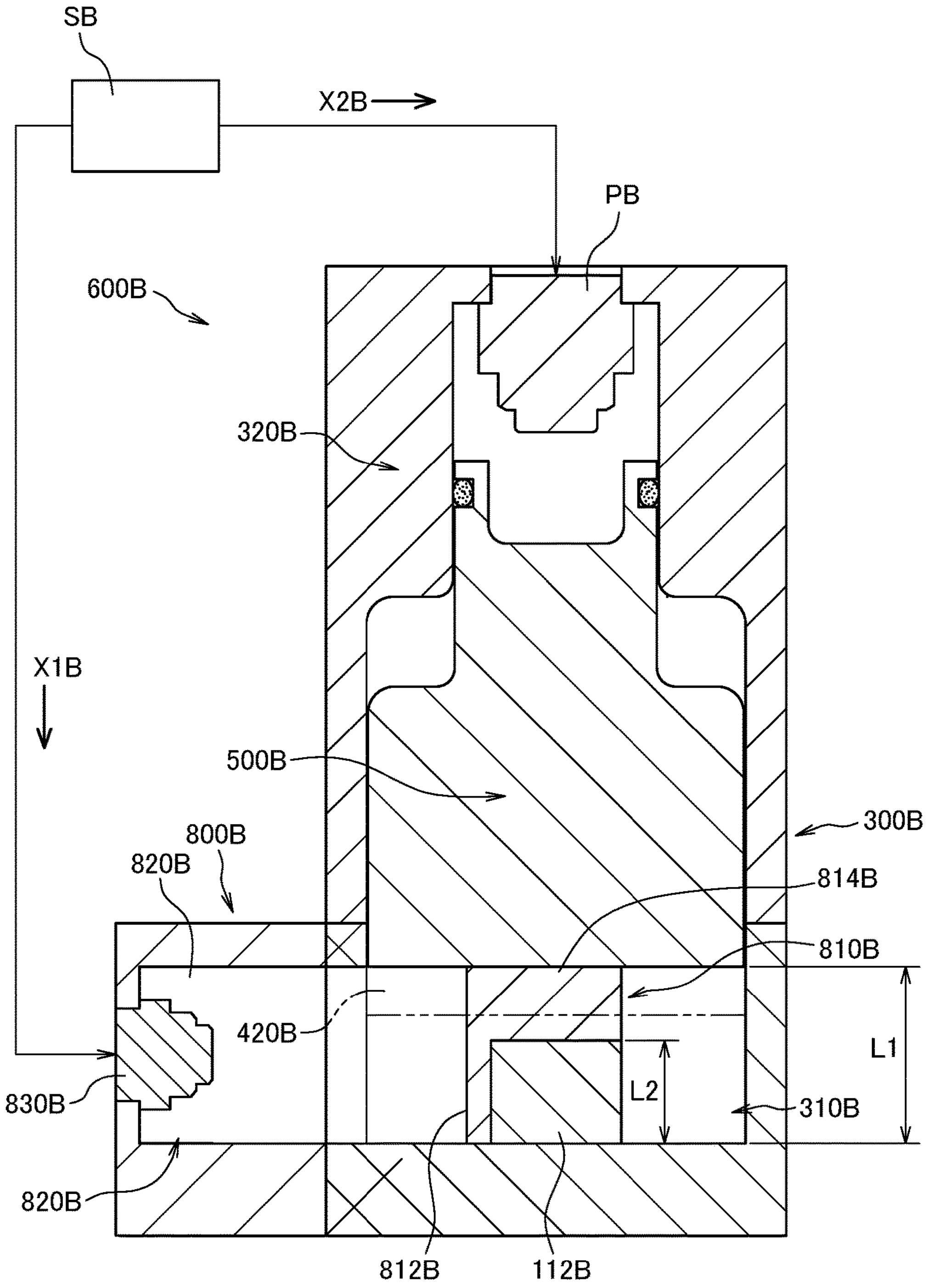
FIG. 22 is a cross-sectional view illustrating a state where the moving body has moved from the state illustrated in FIG. 20.

As illustrated in FIGS. 21 and 22, the cut piece 420B is then strongly pushed downward by the moving body 500B. Then, the cut piece 420B is bent in a substantially L shape by the sharp upper end 814B of the regulating body 810B and cut in the vicinity of the coupling portion between the cut piece 420B and the base piece 430B to be physically separated from the base piece 430B. Therefore, the state where the base pieces 430B on both sides are energized is immediately broken, and an overcurrent can be prevented from flowing through the electric circuit. Note that, since the abnormal current belongs to the relatively low current range lower than the predetermined value, the arc is not generated through the cut piece 420B even if the distance between the cut piece 420B and the base piece 430B that are separated is short.

In addition, since a projection 530B of the moving body 500B abuts on the upper end 814B of the regulating body 810B projecting into the housing portion 310B, the moving body 500B cannot further move toward the second end portion 330B. Then, the conductors 570B of the moving body 500B are not in contact with the electrode 540B and the electrode 550B, respectively. Note that the cut piece 420B, which has been cut, is also not in contact with the electrodes 540B and the electrode 550B.

Therefore, since the electrode 540B and the electrode 550B are not electrically connected to the individual base pieces 430 via the conductors 570B, the current flowing through the base piece 430B does not flow through the electrode and the conductor 570B in the fuse function portion 700B. That is, the regulating body 810B regulates the movement of the moving body 500B in a manner that a part of the cut portion 400 and the electrode do not come into contact with each other in order to make the cut portion 400B and the fuse function portion 700B unconnected.

Figure 23:
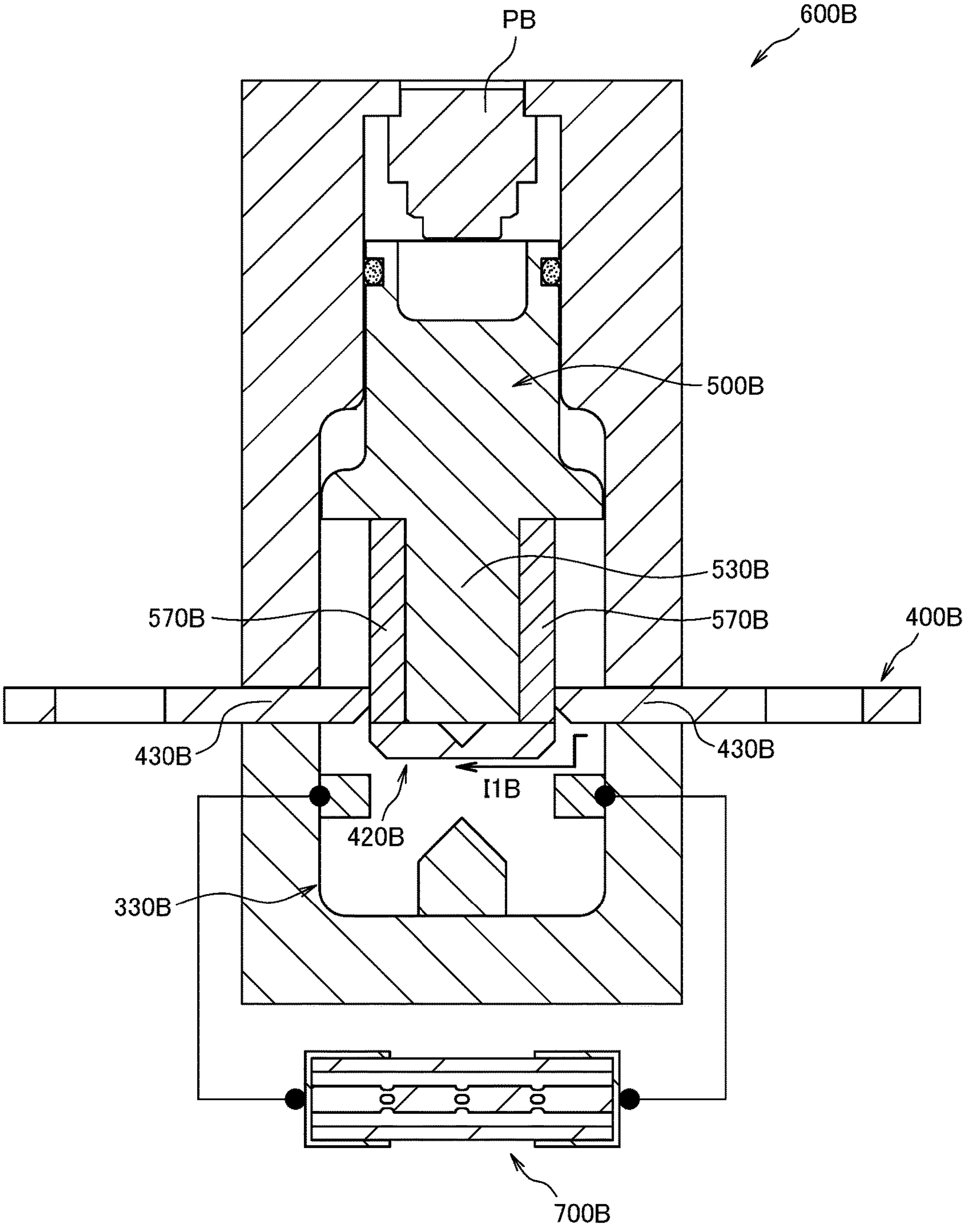
FIG. 23 is a cross-sectional view illustrating a state where the moving body has moved from the state illustrated in FIG. 19.

Next, a state where the electric circuit breaker 600B breaks an electric circuit in a case where an overcurrent belonging to a relatively high current range higher than a predetermined value flows through the electric circuit will be described with reference to FIGS. 23 to 25. Note that FIGS. 23 to 25 are cross-sectional views illustrating a state where the moving body 500B has moved from the state illustrated in FIG. 19.

First, when detecting an abnormal current in the electric circuit, the device SB determines that the abnormal current does not belong to a relatively low current range lower than a predetermined value but belongs to a relatively high current range higher than the predetermined value. Next, the device SB inputs the abnormality signal X2B only to the first power source PB without inputting the abnormality signal X1B to the second power source 830B.

As a result, the gunpowder in the first power source PB explodes, and the moving body 500B instantaneously moves toward the second end portion 330B in the housing portion 310B. Then, the paired conductors 570B arranged on the lower end side of the moving body 500B come into contact with the cut piece 420B of the cut portion 400B. Then, as illustrated in FIG. 23, when the moving body 500B further moves toward the second end portion 330B, the cut piece 420B is strongly pushed downward by the conductor 570B and the projection 530B of the moving body 500B, and the cut piece 420B is cut in the vicinity of the coupling portion between the cut piece 420B and the base piece 430B and physically separated from the base piece 430B. Note that, since the conductor 570B is in contact with the cut piece 420B and the base piece 430B, the cut piece 420B is physically separated from the base piece 430B, but the conductor 570B keeps the base pieces 430B on both sides of the cut portion 400B energized via the cut piece 420B.

Figure 24:
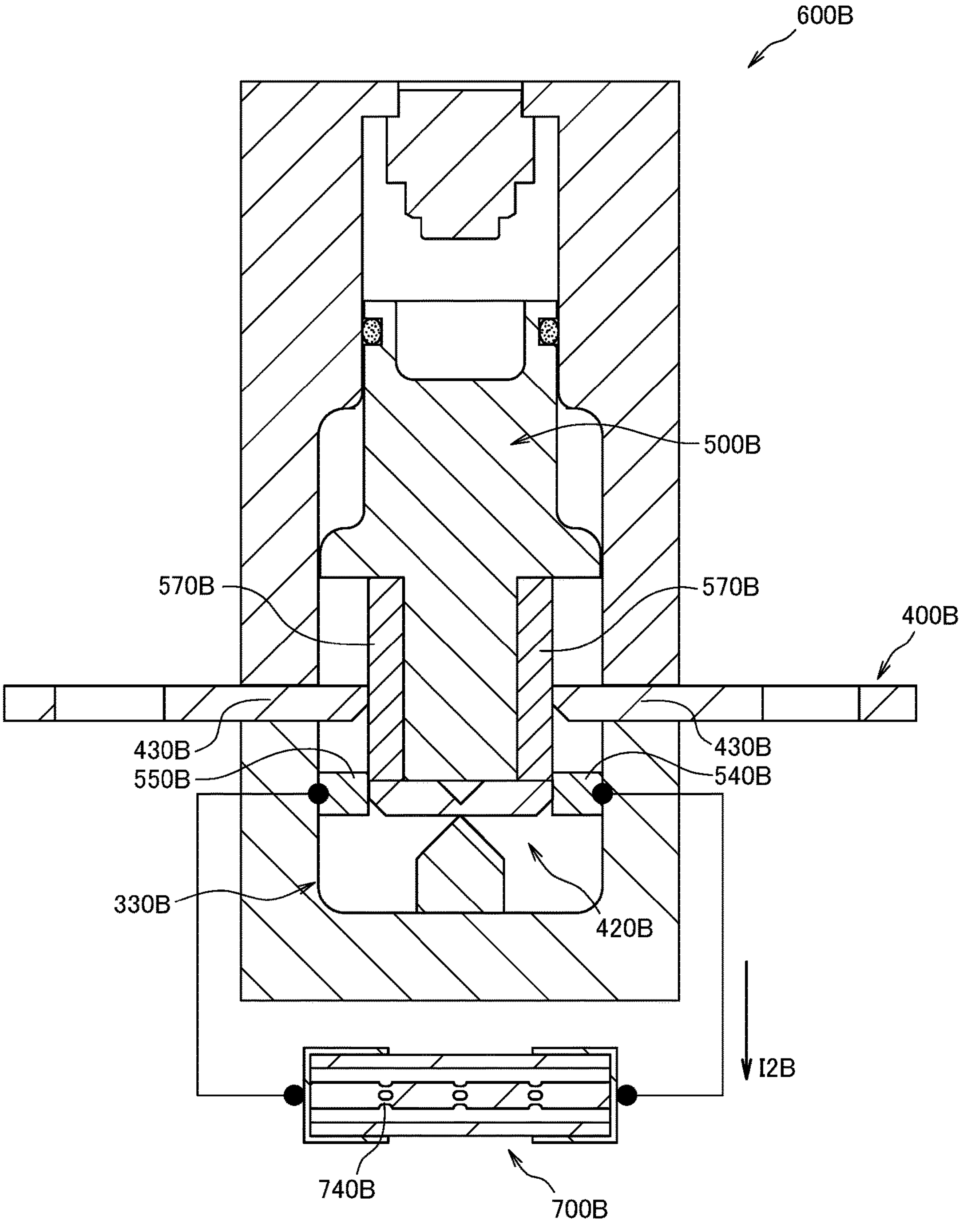
FIG. 24 is a cross-sectional view illustrating a state where the moving body has moved from the state illustrated in FIG. 19.
Figure 25:
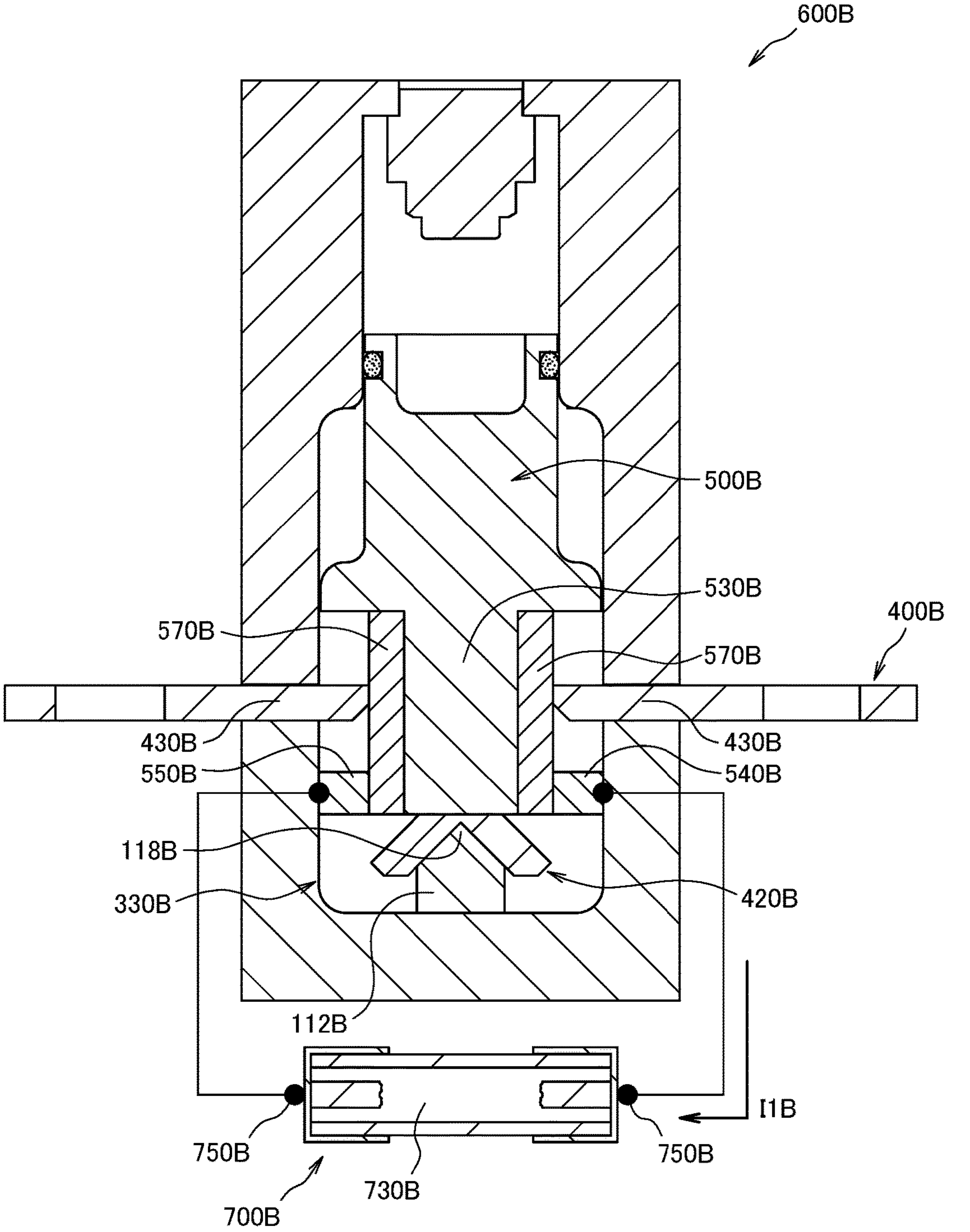
FIG. 25 is a cross-sectional view illustrating a state where the moving body has moved from the state illustrated in FIG. 19.

When the moving body 500B further moves toward the second end portion 330B, as illustrated in FIG. 24, the conductors 570B on both sides come into contact with the electrode 540B and the electrode 550B, respectively. The conductor 570B is also in contact with the base piece 430B. Therefore, the fuse function portion 700B is in a state of being energized with a part of the cut portion 400B via the conductor 570B and the pair of electrodes (540B, 550B), and a part I2B of the current flowing through the electric circuit flows in the fuse function portion 700B. Furthermore, in the state illustrated in FIG. 24, since the cut piece 420B is in contact with the conductor 570B, the cut piece is electrically connected to the base piece 430B via the conductor 570B. That is, in a state where the base pieces 430B on both sides of the cut portion 400B are energized via the cut piece 420B, a part of the cut portion 400B is connected to the fuse function portion 700B.

Next, as illustrated in FIG. 25, when the moving body 500B further moves toward the second end portion 330B, the cut piece 420B is strongly pushed downward by the projection 530B and the conductor 570B of the moving body 500B, and the cut piece 420B is bent in a substantially L shape by the triangular distal end 118B of the abutment base 112B. Therefore, the cut piece 420B and the conductor 570B are separated from each other, and the cut piece 420B and the conductor 570B are not physically and electrically connected to each other. That is, the state where the base pieces 430B on both sides of the cut portion 400B are energized via the cut piece 420B is broken, and an overcurrent can be prevented from flowing through the electric circuit.

In addition, as illustrated in FIGS. 24 to 25, after the paired electrodes 540B and 550B come into contact with a part of the cut portion 400B via the conductor 570B and the cut portion 400B is connected to the fuse function portion 700B, the cut piece 420B as a part of the cut portion 400B is bent and the state where the base pieces 430B on both sides of the cut portion 400B are energized via the cut piece 420B is broken. Therefore, when the energized state of the cut portion 400B is broken, a current I1B (fault current) flowing through the base piece 430B is induced in the fuse function portion 700B. Therefore, it is possible to prevent the arc due to the fault current from being generated between the cut piece 420B and the base piece 430B that are divided.

As illustrated in FIG. 25, a fusion portion 740B of the fuse function portion 700B is quickly fused by the current I1B induced in the fuse function portion 700B, and the current flowing through the electric circuit is quickly broken. Furthermore, after the fusion portion 740B is fused, an arc is generated between the terminals 750B of the fuse function portion 700B by the voltage applied to the base pieces 430B on both sides connected to the electric circuit, but the arc is quickly and effectively extinguished by an arc-extinguishing material 730B in the fuse function portion 700B. Note that, as illustrated in FIGS. 24 to 25, after the pair of conductors 570B comes into contact with a part of the cut portion 400B and the pair of electrodes (540B, 550B), the conductor 570B moves toward the second end portion 330B and always maintain a state of being in contact with a part of the cut portion 400B and the pair of electrodes (540B, 550B), so that the state where the cut portion 400B is connected to the fuse function portion 700B is also always maintained.

As described above, in the electric circuit breaker 600B, a relatively high current (fault current) flowing through the electric circuit when the electric circuit is broken is induced in the fuse function portion 700B, and the arc generated by the induced current can be effectively and quickly extinguished in the fuse function portion 700B. In addition, before the state where the cut portion 400B is energized is broken and an arc is generated between the base pieces 430B on both sides, the state where the cut portion 400B and the fuse function portion 700B are connected is secured, so that the arc due to a relatively high fault current can be reliably induced in the fuse function portion 700B and extinguished in the fuse function portion 700B. As a result, it is possible to prevent the electric circuit breaker 600B from being damaged by the arc generated between the base pieces 430B in the housing 300B, and to safely break the electric circuit.

Furthermore, by providing the pair of electrodes (540B, 550B) and the fuse function portion 700B not on the side of the moving body 500B but on the side of the housing 300B, it is possible to easily maintain a state where the connectivity between the pair of electrodes (540B, 550B) and the fuse function portion 700B is stably and reliably kept without being affected by the movement of the moving body 500B. Therefore, the connection configuration (connection member or the like) between the pair of electrodes (540B, 550B) and the fuse function portion 700B can be simplified without considering the movement of the moving body 500B.

As described above, according to the electric circuit breaker 600B of the present invention, in a case where the overcurrent belonging to the relatively low current range flows through the electric circuit, as illustrated in FIGS. 21 and 22, under a state where the cut portion 400B and the fuse function portion 700B are not connected, the cut piece 420B between the base pieces 430B on both sides of the cut portion 400B is cut and the state where the base pieces 430B on both sides are energized is immediately broken, so that the overcurrent is prevented from flowing through the electric circuit. Therefore, it is possible to solve the problem that, as in a conventional case, the current belonging to the relatively low current range cannot be broken because the fusion portion 740B of the fuse function portion 700B is not fused or the overcurrent flowing through the electric circuit cannot be broken immediately because it takes a relatively long time to break the current. On the other hand, in a case where the overcurrent belonging to the relatively high current range flows through the electric circuit, as illustrated in FIGS. 23 to 25, under a state where the cut portion 400B and the fuse function portion 700B are connected, the cut piece 420B between the base pieces 430B on both sides of the cut portion 400B is cut and the state where the base pieces 430B on both sides are energized is immediately and safely broken, so that the overcurrent is prevented from flowing through the electric circuit. As described above, the electric circuit breaker 600B of the present invention quickly breaks current in a wide current range up to a relatively low current as well as a relatively high current.

Fourth Embodiment

Next, an electric circuit breaker 600C according to a fourth embodiment of the present invention will be described with reference to FIGS. 26 and 27. In addition, since the configuration of the electric circuit breaker 600C according to the fourth embodiment is basically the same as the configuration of the electric circuit breaker 600 according to the first embodiment except that the regulating unit 800 is not provided, and a circuit 900C and a breaker 970C is provided, the description of the same configuration will be omitted. Note that FIG. 26 is an overall perspective view illustrating the electric circuit breaker 600C in an exploded manner, FIG. 27(*a*) is a cross-sectional view taken along line S-S of FIG. 26, and FIG. 27(*b*) is a cross-sectional view taken along line L-L of FIG. 26.

Figure 26:
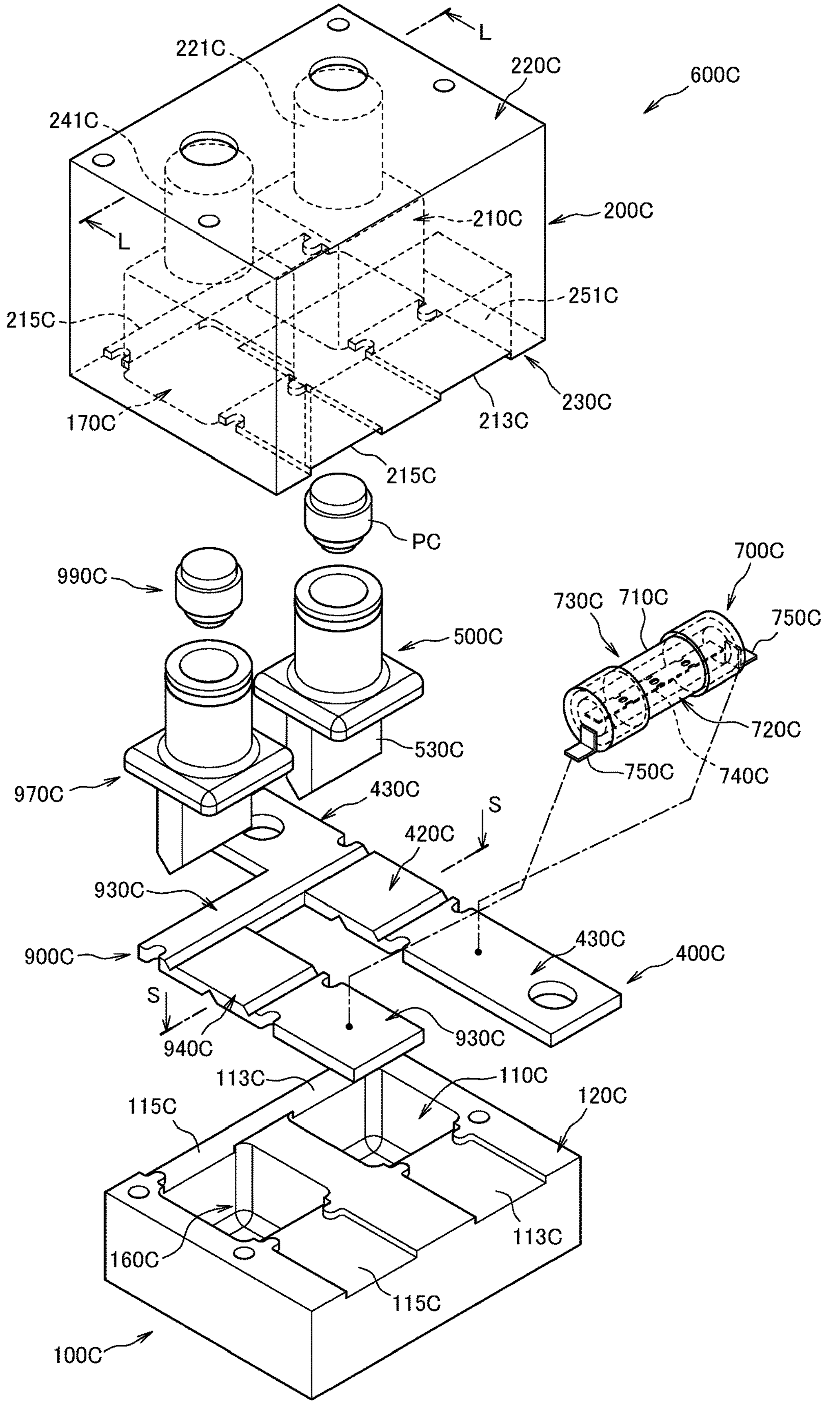
FIG. 26 is an overall perspective view of an electric circuit breaker according to a fourth embodiment of the present invention in an exploded manner.
Figure 27A:
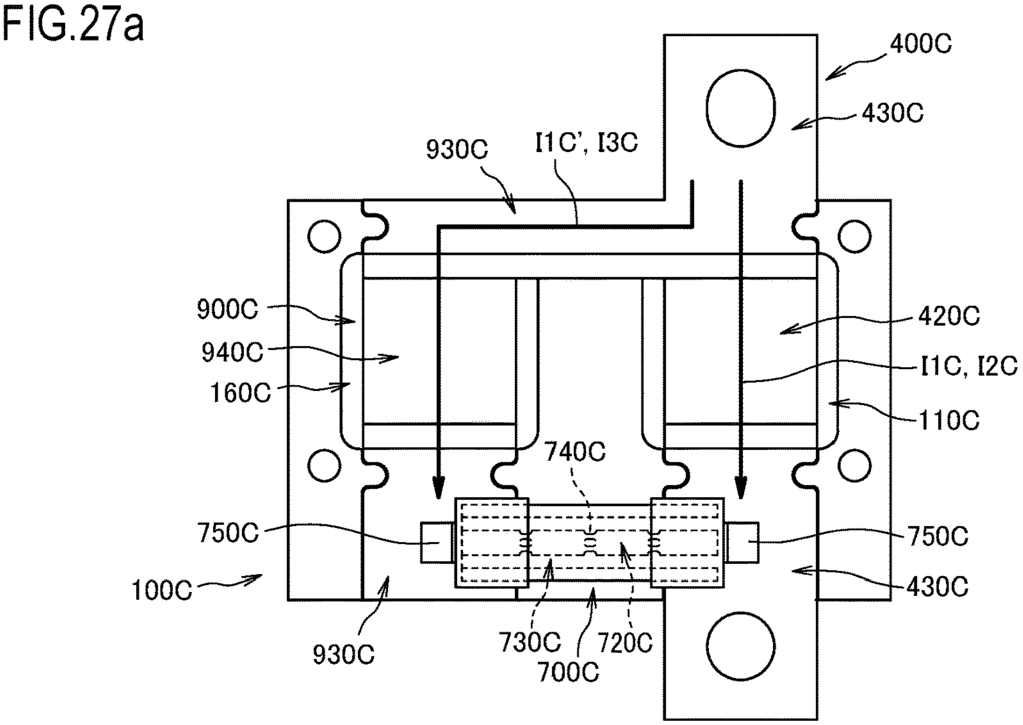
FIG. 27(*a*) is a cross-sectional view of FIG. 26 taken along line S-S, and FIG. 27(*b*) is a cross-sectional view of FIG. 26 taken along line L-L.
Figure 27B:
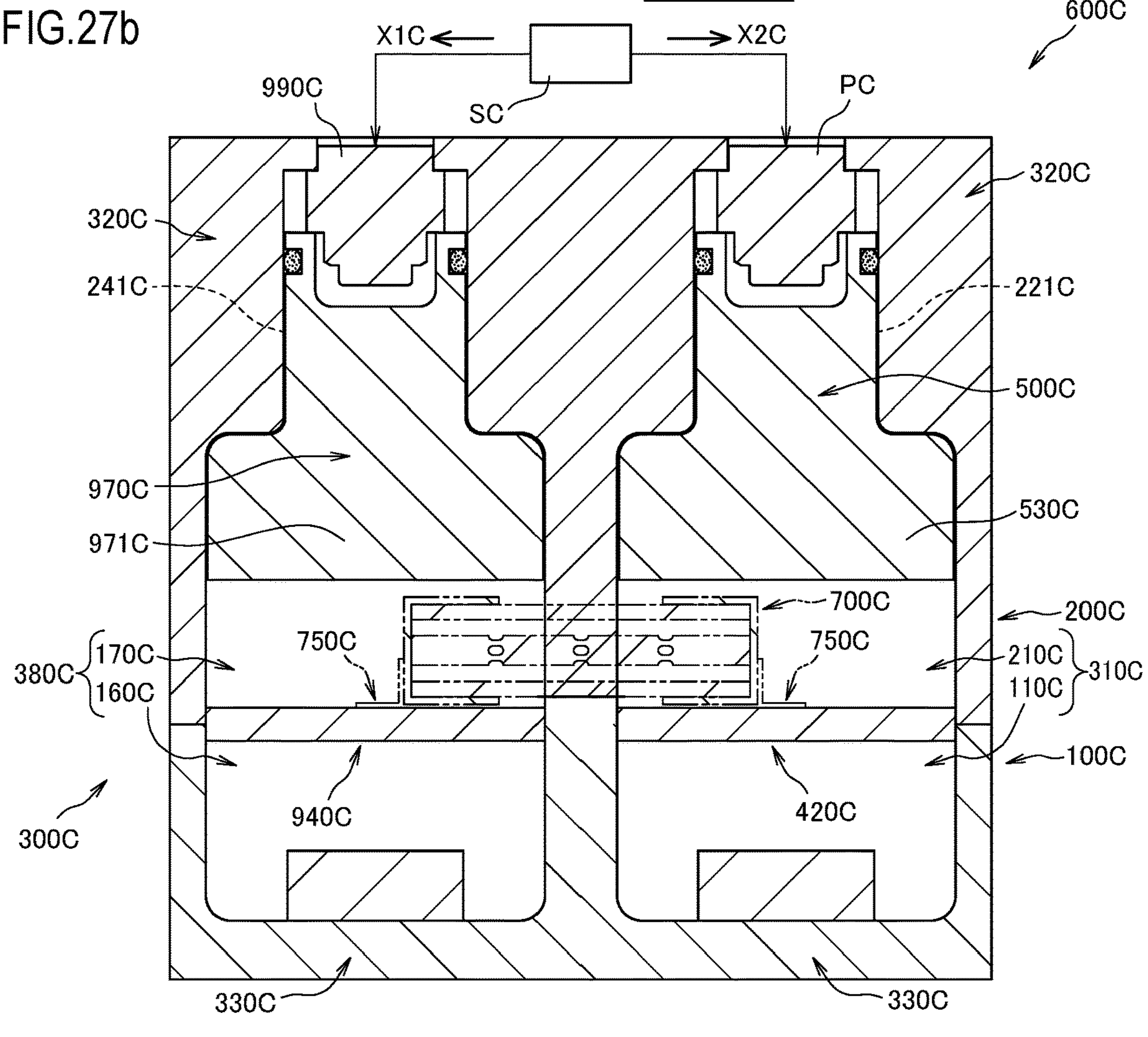

As illustrated in FIGS. 26 and 27, a lower housing 100C is a substantially quadrangular prism formed of an insulator such as a synthetic resin, and includes a hollow lower housing portion 110C therein. The lower housing portion 110C is configured to house a moving body 500C. In addition, the lower housing 100C includes a hollow lower housing portion 160C so as to be adjacent to the lower housing portion 110C. The lower housing portion 160C is configured to house the breaker 970C.

Furthermore, placement portions 113C recessed based on the shape of a base piece 430C are provided in a part of an upper surface 120C of the lower housing 100C so that the base piece 430C of a cut portion 400C can be placed. The placement portions 113C are arranged on both sides of the lower housing portion 110C so as to face each other, and support the cut portion 400C extending linearly on both sides.

In addition, the circuit 900C is connected in parallel with the cut portion 400C. The entire circuit 900C is a metal conductor such as copper in order to be electrically connected to the cut portion 400C via a fuse function portion 700C. The circuit 900C includes a base piece 930C directly coupled to one base piece 430C of the cut portion 400C and a base piece 930C coupled to the other base piece 430C of the cut portion 400C via the fuse function portion 700C. Moreover, the circuit includes a cut piece 940C positioned between the base pieces 930C. Furthermore, placement portions 115C recessed based on the shape of the base piece 930C are provided in a part of the upper surface 120C of the lower housing 100C so that the base piece 930C of the circuit 900C can be placed. The placement portions 115C are arranged on both sides of the lower housing portion 160C so as to face each other, and support the circuit 900C extending linearly on both sides.

Furthermore, an upper housing 200C is a substantially quadrangular prism formed of an insulator such as a synthetic resin, and forms a pair with the lower housing 100C to constitute a housing 300C. The upper housing includes a hollow upper housing portion 210C therein, and the upper housing portion 210C is configured to house the moving body 500C. In addition, the upper housing 200C also includes a hollow upper housing portion 170C so as to be adjacent to the upper housing portion 210C. The upper housing portion 170C is configured to house the breaker 970C.

Furthermore, insertion portions 213C recessed based on the shape of the base piece 430C are provided in a part of a lower surface 230C of the upper housing 200C so that the base piece 430C of the cut portion 400C can be placed. The insertion portions 213C are arranged on both sides of the upper housing portion 210C so as to face each other, and are arranged at positions corresponding to the placement portions 113C of the lower housing 100C. Furthermore, insertion portions 215C recessed based on the shape of the base piece 930C are provided in a part of the lower surface 230C of the upper housing 200C so that the base piece 930C of the circuit 900C can be placed. The insertion portions 215C are arranged on both sides of the upper housing portion 170C so as to face each other, and support the circuit 900C extending linearly on both sides.

Moreover, a power source storage portion 221C in which a first power source PC is housed is formed in a part of the side of an upper surface 220C of the upper housing 200C. The power source storage portion 221C communicates with the upper end side of the upper housing portion 210C. When it is detected that an abnormal current flows through the electric circuit, an abnormality signal is input from an external device to the first power source PC. Then, for example, the gunpowder in the first power source PC is exploded, and the moving body 500C is instantaneously pushed out and moved in a housing portion 310C including the upper housing portion 210C and the lower housing portion 110C by the air pressure due to the explosion. Note that the housing portion 310C extends from a first end portion 320C of the housing 300C to a second end portion 330C opposite to the first end portion 320C. Since the moving body 500C is disposed on the side of the first end portion 320C, the moving body can move toward the second end portion 330C in the housing portion 310C by the first power source PC provided on the side of the first end portion 320C.

Moreover, a power source storage portion 241C in which a second power source 990C is housed is formed in a part of the side of the upper surface 220C of the upper housing 200C. The power source storage portion 241C communicates with the upper end side of the upper housing portion 170C. When it is detected that an abnormal current flows through the electric circuit, an abnormality signal is input from an external device to the second power source 990C. Then, for example, the gunpowder in the second power source 990C is exploded, and the breaker 970C is instantaneously pushed out and moved in a housing portion 380C including the upper housing portion 170C and the lower housing portion 160C by the air pressure due to the explosion. Note that the housing portion 380C extends from the first end portion 320C of the housing 300C to the second end portion 330C opposite to the first end portion 320C. Since the breaker 970C is disposed on the side of the first end portion 320C, the breaker can move toward the second end portion 330C in the housing portion 380C by the second power source 990C provided on the side of the first end portion 320C.

The electric circuit breaker 600C also includes the fuse function portion 700C. The fuse function portion 700C includes a fuse element 720C made of a conductive metal such as copper or an alloy thereof in a hollow and insulating casing 710C, and the periphery of the fuse element 720C inside the casing 710C is filled with an arc-extinguishing material 730C. One terminal 750C of the fuse function portion 700C is connected to the base piece 430C of the cut portion 400C, and the other terminal 750C of the fuse function portion 700C is connected to the base piece 930C of the circuit 900C. Therefore, the fuse function portion 700C is electrically connected to the cut portion 400C via the circuit 900C. In addition, the fuse element 720C includes a fusion portion 740C between the terminals 750C, and the fusion portion 740C is a portion in which the width of the fuse element 720C is locally narrowed, and is configured to generate heat and fuse to break the current when the current to be broken by the electric circuit breaker flows. Note that the fuse function portion 700C is housed in a housing portion 251C of the upper housing 200C.

Further, as illustrated in FIG. 27, the electric circuit breaker 600C is attached in an electric circuit to be protected and used. Specifically, the base piece 430C of the cut portion 400C is connected to a part of the electric circuit, and the cut portion 400C constitutes a part of the electric circuit. In addition, a projection 530C of the moving body 500C extends along the cut piece 420C and is disposed away from the cut piece 420C. In a normal state, since the base piece 430C and the cut piece 420C of the cut portion 400C are not cut and are physically and electrically connected, a current I1C flows through the electric circuit via the base piece 430C and the cut piece 420C of the cut portion 400C.

In addition, in the normal state, a projection 971C of the breaker 970C extends along the cut piece 940C and is disposed away from the cut piece 940C. That is, the circuit 900C is neither disconnected nor broken by the breaker 970C. Note that the resistance value of the fuse function portion 700C is larger than the resistance value of the cut portion 400C. Since the current I1C flowing through the cut portion 400C and a current I1C' flowing through the fuse element 720C are proportional to the reciprocal of each resistance value, the magnitude of the current I1C' in the normal state is as small as about ten percent of the total current (current I1C+current I1C').

Furthermore, as illustrated in FIG. 27, a device SC that detects an abnormal current in the electric circuit is connected to the electric circuit to be protected. When detecting an abnormal current in the electric circuit by a built-in current sensor, an external current sensor connected to the electric circuit, or the like, the device SC determines whether or not the abnormal current belongs to a relatively low current range lower than a predetermined value (for example, 1000 to 2000 A [amps]). When determining that the abnormal current belongs to the relatively low current range lower than the predetermined value, the device SC inputs an abnormality signal X1C to the second power source 990C. Thereafter, after a predetermined time has elapsed, the device SC inputs an abnormality signal X2C to the first power source PC. Note that, as described later, the predetermined time is a time until the breaker 970C cuts the cut piece 940C of the circuit 900C by the second power source 9900. On the other hand, when determining that the detected abnormal current does not belong to the relatively low current range lower than the predetermined value and belongs to a relatively high current range higher than the predetermined value, the device SC inputs the abnormality signal X2C only to the first power source PC without inputting the abnormality signal X1C to the second power source 990C.

Note that, as described later, in a case where a relatively high current flows, the electric circuit breaker 600C can induce an arc generated when the electric circuit is broken in the fuse function portion 700C to effectively and quickly extinguish the arc. Therefore, an arc-extinguishing material for extinguishing the arc is not enclosed in the housing portion 310C (in particular, around the cut piece 420). Note that, basically, it is not necessary to enclose the arc-extinguishing material in the housing portion 310C, but the arc-extinguishing material may be enclosed in the housing portion 310C depending on the specification.

Next, a state where the electric circuit breaker 600C breaks an electric circuit in a case where an overcurrent belonging to a relatively low current range lower than a predetermined value flows through the electric circuit will be described with reference to FIG. 28. Note that FIG. 28(*a*) is a cross-sectional view illustrating a state where the breaker 970C has moved from the state illustrated in FIG.

Figure 28A:
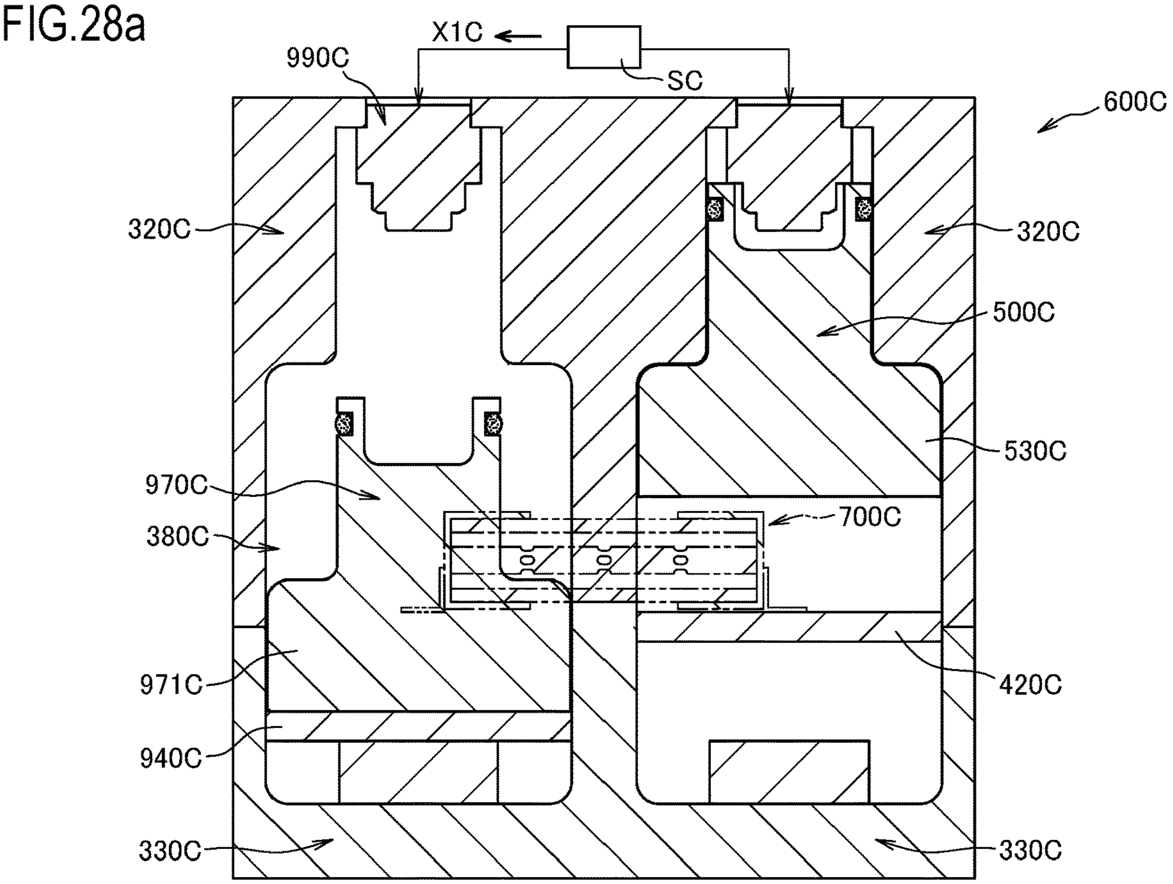
FIG. 28(*a*) is a cross-sectional view illustrating a state where a breaker has moved from the state illustrated in FIG. 27(*b*), and FIG. 28(*b*) is a cross-sectional view illustrating a state where a moving body has moved from the state illustrated in FIG. 28(*a*).
Figure 28B:
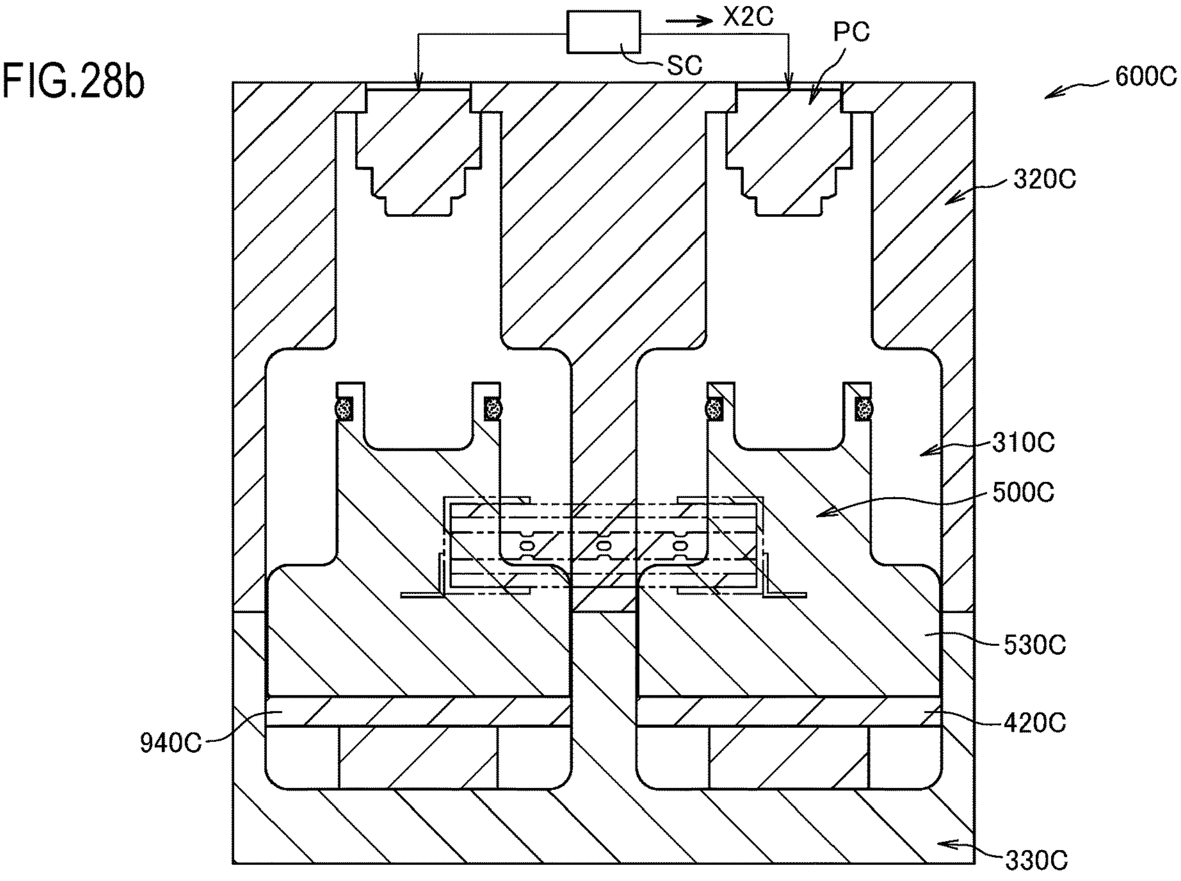

27(*b*), and FIG. 28(*b*) is a cross-sectional view illustrating a state where the moving body 500C has moved from the state illustrated in FIG. 28(*a*).

First, assuming that, when detecting an abnormal current in the electric circuit, the device SC determines that the abnormal current belongs to a relatively low current range lower than a predetermined value (for example, 1000 to 2000 A [amps]). Next, the device SC inputs the abnormality signal X1C to the second power source 990C. As a result, the gunpowder in the second power source 990C explodes, and the air pressure due to the explosion is transmitted to the breaker 970C. The breaker 970C is then forcefully blown from the first end portion 320C toward the second end portion 330C by the air pressure, and instantaneously moves toward the second end portion 330 in the housing portion 380C. Then, as illustrated in FIG. 28(*a*), the cut piece 940C of the circuit 900C is strongly pushed downward by the projection 971C of the breaker 970C, and the cut piece 940C is cut in the vicinity of the coupling portion between the cut piece 940C and the base piece 930C and physically separated from the base piece 930C. As described above, since the circuit 900C is broken by the breaker 970C, the state where the fuse function portion 700C is electrically connected to the cut portion 400C via the circuit 900C is changed to a state where the fuse function portion 700C is not electrically connected to the cut portion 400C. As a result, the abnormal current I2C (see FIG. 27(*a*)) flowing through the base piece 430C does not flow through the circuit 900C in the fuse function portion 700C but flows only through the cut portion 400C.

Note that when the current belonging to the relatively low current range flows in the fuse function portion 700C through the circuit 900C, the fusion portion 740C of the fuse function portion 700C is not fused by the current belonging to the relatively low current range and thus the current cannot be broken, or it takes a relatively long time to break the current, and the overcurrent flowing through the electric circuit cannot be broken immediately.

Thereafter, the device SC inputs the abnormality signal X2C to the first power source PC. As a result, the gunpowder in the first power source PC explodes, and the moving body 500C is forcefully blown from the first end portion 320C toward the second end portion 330C by the air pressure due to the explosion, and instantaneously moves toward the second end portion 330C in the housing portion 310C. Then, as illustrated in FIG. 28(*b*), the cut piece 420C is strongly pushed downward by the projection 530C of the moving body 500C, and the cut piece 420C is cut in the vicinity of the coupling portion between the cut piece 420C and the base piece 430C and physically separated from the base piece 430C. Therefore, the state where the base pieces 430C on both sides are energized is immediately broken, and the overcurrent I2C can be prevented from flowing through the electric circuit. Note that, since the abnormal current I2C belongs to the relatively low current range lower than the predetermined value, the arc discharge does not occur or the arc is immediately extinguished even if the distance between the cut piece 420C and the base piece 430C that are separated is short.

Figure 29:
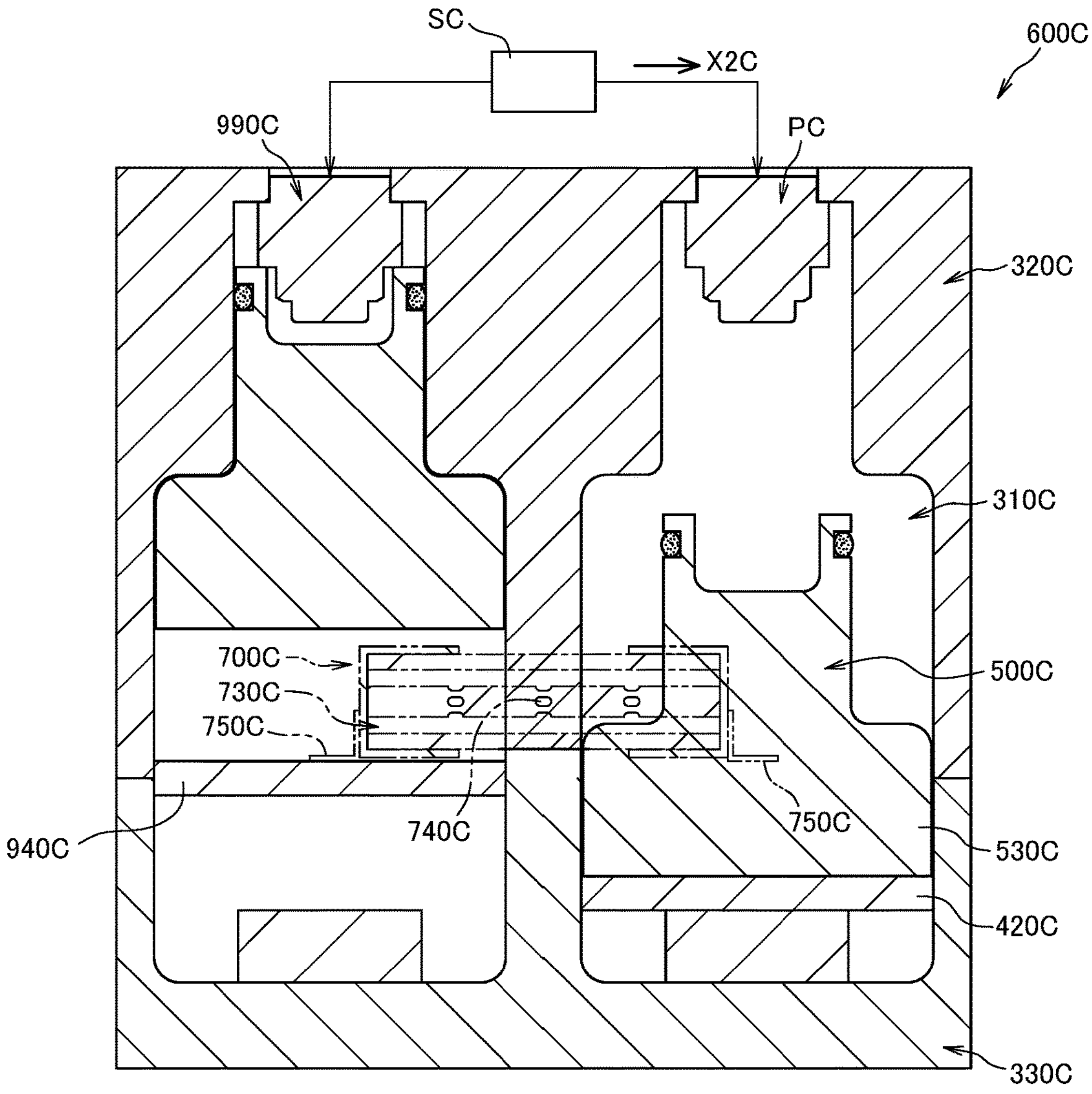
FIG. 29 is a cross-sectional view illustrating a state where the moving body has moved from the state illustrated in FIG. 27(*b*).

Next, a state where the electric circuit breaker 600C breaks an electric circuit in a case where an overcurrent belonging to a relatively high current range higher than a predetermined value flows through the electric circuit will be described with reference to FIG. 29. Note that FIG. 29 is a cross-sectional view illustrating a state where the moving body 500C has moved from the state illustrated in FIG. 27(*b*).

First, assuming that, when detecting an abnormal current in the electric circuit, the device SC determines that the abnormal current does not belong to a relatively low current range lower than a predetermined value but belongs to a relatively high current range higher than the predetermined value. Next, the device SC inputs the abnormality signal X2C only to the first power source PC without inputting the abnormality signal X1C to the second power source 990C.

As a result, the gunpowder in the first power source PC explodes, and the moving body 500C instantaneously moves toward the second end portion 330C in the housing portion 310C. Then, as illustrated in FIG. 29, the moving body 500C moves toward the second end portion 330C, the cut piece 420C is strongly pushed downward by the projection 530C of the moving body 500C, and the cut piece 420C is cut in the vicinity of the coupling portion between the cut piece 420C and the base piece 430C and physically separated from the base piece 430C. That is, the state where the base pieces 430C on both sides of the cut portion 400C are energized via the cut piece 420C is broken, and an overcurrent can be prevented from flowing through the electric circuit.

In addition, since the overcurrent belonging to the relatively high current range flows through the base pieces 430C on both sides connected to the electric circuit, an arc is possibly generated between the base piece 430C and the cut piece 420C immediately after cutting. However, as illustrated in FIGS. 27(*a*) and 29, since the cut piece 940C of the circuit 900C is not cut by the breaker 970C, the fuse function portion 700C is electrically connected to the cut portion 400C via the circuit 900C. Since the cut piece 420C of the cut portion 400C is cut while the fuse function portion 700C and the cut portion 400C remain electrically connected to each other, when the cut piece 420C is cut, a current I3C (fault current) flowing through the electric circuit is induced in the fuse function portion 700C via the circuit 900C (see FIG. 27(*a*)). Therefore, it is possible to prevent an arc from being generated between the base piece 430C and the cut piece 420C, which has been cut.

The current I3C induced in the fuse function portion 700C then causes the fusion portion 740C of the fuse function portion 700C to generate heat and fuse. Note that, when the cut piece 420C is cut by the moving body 500C to break the electric circuit, the current I3C is induced in the fuse function portion 700C to flow through the electric circuit. Therefore, strictly speaking, the electric circuit is not completely broken. However, since the rating of the fusion portion 740C of the fuse function portion 700C is reduced, the fusion portion 740C is immediately fused by the current I3C, and the electric circuit is immediately completely broken.

Furthermore, after the fusion portion 740C is fused, an arc is generated between the terminals 750C of the fuse function portion 700C by the voltage applied to the base pieces 430C on both sides connected to the electric circuit, but the arc is quickly and effectively extinguished by the arc-extinguishing material 730C in the fuse function portion 700C.

As described above, according to the electric circuit breaker 600C of the present invention, a relatively high current (fault current) flowing through the electric circuit when the electric circuit is broken is induced in the fuse function portion 700C, and the arc generated by the induced current can be effectively and quickly extinguished in the fuse function portion 700C. As a result, it is possible to prevent the electric circuit breaker 600C from being damaged by the arc generated between the base pieces 430C in the housing 300C, and to safely break the electric circuit.

As described above, according to the electric circuit breaker 600C of the present invention, in a case where the overcurrent belonging to the relatively low current range flows through the electric circuit, as illustrated in FIG. 28, under a state where the cut portion 400C and the fuse function portion 700C are not connected, the cut piece 420C between the base pieces 430C on both sides of the cut portion 400C is cut and the state where the base pieces 430C on both sides are energized is immediately broken, so that the overcurrent is prevented from flowing through the electric circuit. Therefore, it is possible to solve the problem that, as in a conventional case, the current belonging to the relatively low current range cannot be broken because the fusion portion 740C of the fuse function portion 700C is not fused or the overcurrent flowing through the electric circuit cannot be broken immediately because it takes a relatively long time to break the current. On the other hand, in a case where the overcurrent belonging to the relatively high current range flows through the electric circuit, as illustrated in FIG. 29, under a state where the cut portion 400C and the fuse function portion 700C are connected, the cut piece 420C between the base pieces 430C on both sides of the cut portion 400C is cut and the state where the base pieces 430C on both sides are energized is immediately and safely broken, so that the overcurrent is prevented from flowing through the electric circuit. As described above, the electric circuit breaker 600C of the present invention quickly breaks current in a wide current range up to a relatively low current as well as a relatively high current.

Fifth Embodiment

Next, an electric circuit breaker 600D according to a fifth embodiment of the present invention will be described with reference to FIGS. 30 and 31. In addition, since the configuration of the electric circuit breaker 600D according to the fifth embodiment is basically the same as the configuration of the electric circuit breaker 600 according to the first embodiment except that the regulating unit 800 is not provided, a circuit 900D and a breaker 970D are provided, and the configuration of a fuse function portion 700D, the description of the same configuration will be omitted. Note that FIG. 30 is an overall perspective view illustrating the electric circuit breaker 600D in an exploded manner, FIG. 31(*a*) is a cross-sectional view taken along line N-N of FIG. 30, and FIG. 31(*b*) is a cross-sectional view taken along line M-M of FIG. 30.

Figure 30:
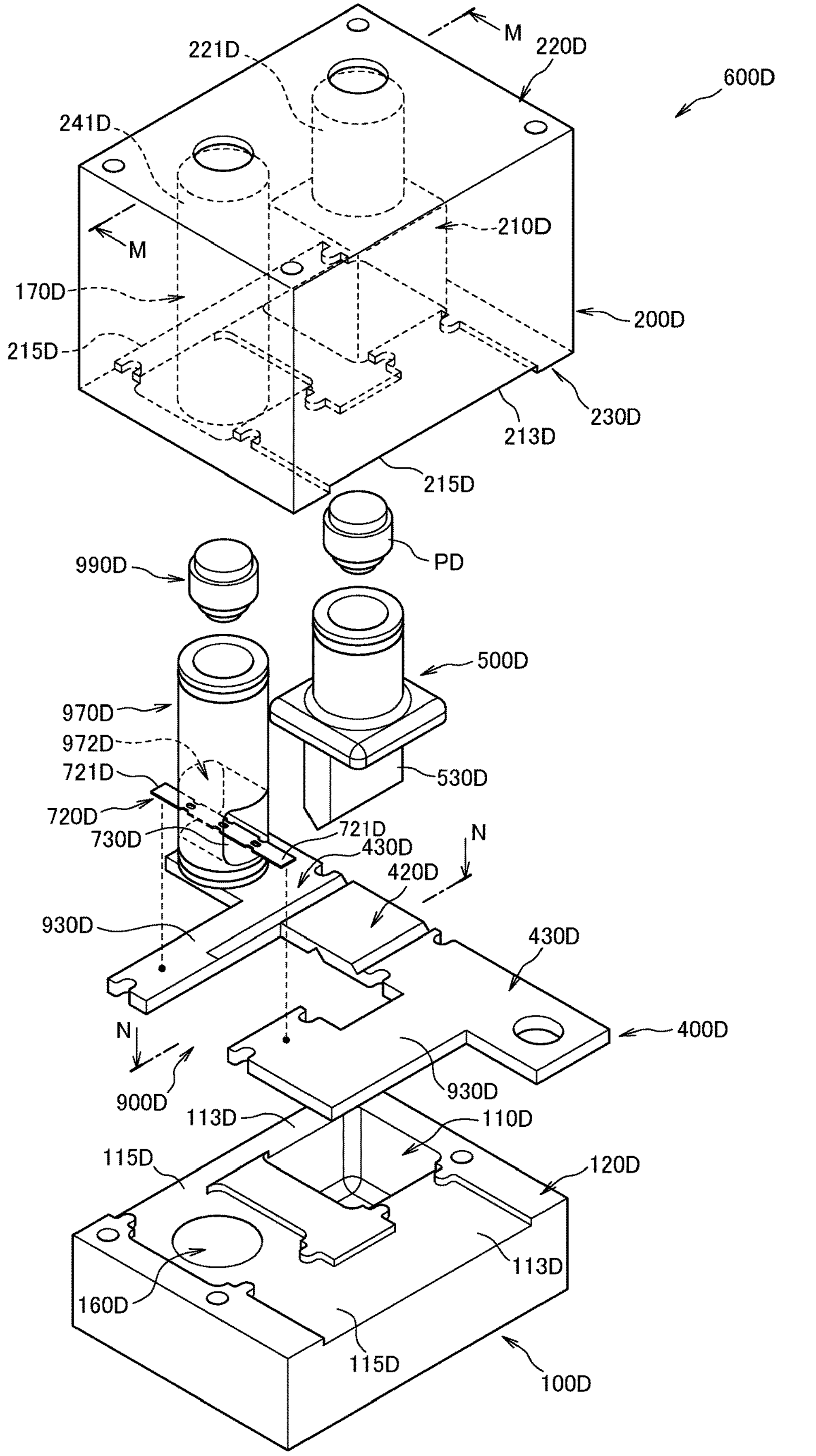
FIG. 30 is an overall perspective view of an electric circuit breaker according to a fifth embodiment of the present invention in an exploded manner.
Figure 31A:
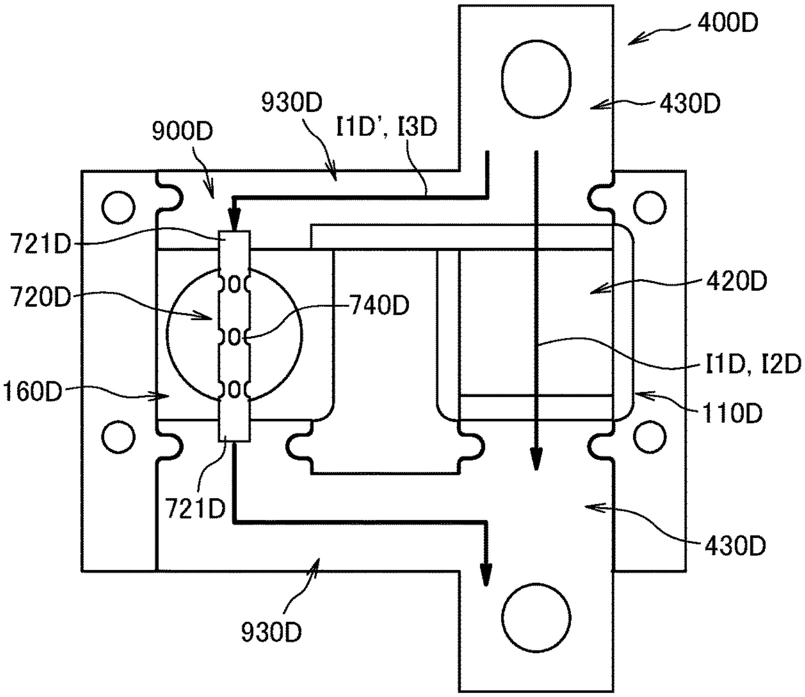
FIG. 31(*a*) is a cross-sectional view of FIG. 30 taken along line N-N, and FIG. 31(*b*) is a cross-sectional view of FIG. 30 taken along line M-M.
Figure 31B:
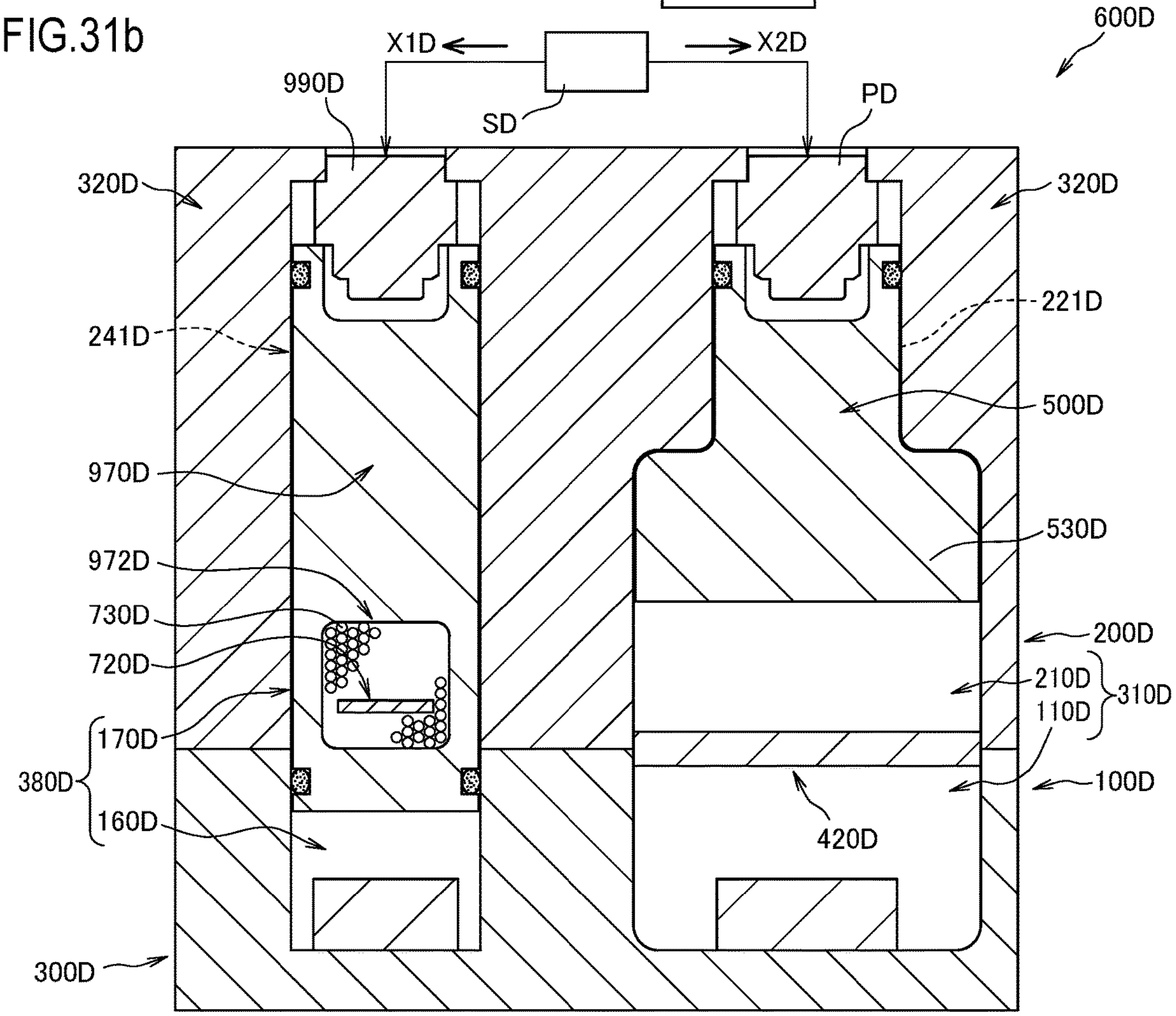

As illustrated in FIGS. 30 and 31, a lower housing 100D is a substantially quadrangular prism formed of an insulator such as a synthetic resin, and includes a hollow lower housing portion 110D therein. The lower housing portion 110D is configured to house a moving body 500D. In addition, the lower housing 100D includes a hollow lower housing portion 160D so as to be adjacent to the lower housing portion 110D. The lower housing portion 160D is configured to house the breaker 970D.

Furthermore, placement portions 113D recessed based on the shape of a base piece 430D are provided in a part of an upper surface 120D of the lower housing 100D so that the base piece 430D of a cut portion 400D can be placed. The placement portions 113D are arranged on both sides of the lower housing portion 110D so as to face each other, and support the cut portion 400D extending linearly on both sides.

In addition, the circuit 900D is connected in parallel with the cut portion 400D. The entire circuit 900D is a metal conductor such as copper in order to be electrically connected to the cut portion 400D via a fuse element 720D. The circuit 900D includes a base piece 930D directly coupled to one base piece 430D of the cut portion 400D and another base piece 930D directly coupled to the other base piece 430D of the cut portion 400D, and is coupled to the cut portion 400D via the fuse element 720D. More specifically, the linearly extending fuse element 720D is inserted in a housing portion 972D penetrating the breaker 970D in a front-rear direction, and end portions 721D on both sides of the fuse element 720D projecting outward from the housing portion 972D are individually coupled to the base pieces 930D. The fuse element 720D constitutes a part of the circuit 900D and also constitutes a part of a fuse function portion to be described later. Furthermore, placement portions 115D recessed based on the shape of the base piece 930D are provided in a part of the upper surface 120D of the lower housing 100D so that the base piece 930D of the circuit 900D can be placed. The placement portions 115D are arranged on both sides of the lower housing portion 160D so as to face each other, and support the circuit 900D extending linearly on both sides.

Furthermore, an upper housing 200D is a substantially quadrangular prism formed of an insulator such as a synthetic resin, and forms a pair with the lower housing 100D to constitute a housing 300D. The upper housing includes a hollow upper housing portion 210D therein, and the upper housing portion 210D is configured to house the moving body 500D. In addition, the upper housing 200D includes a hollow upper housing portion 170D so as to be adjacent to the upper housing portion 210D. The upper housing portion 170D is configured to house the breaker 970D.

Furthermore, insertion portions 213D recessed based on the shape of the base piece 430D are provided in a part of a lower surface 230D of the upper housing 200D so that the base piece 430D of the cut portion 400D can be inserted. The insertion portions 213D are arranged on both sides of the upper housing portion 210D so as to face each other, and are arranged at positions corresponding to the placement portions 113D of the lower housing 100D. Furthermore, insertion portions 215D recessed based on the shape of the base piece 930D are provided in a part of the lower surface 230D of the upper housing 200D so that the base piece 930D of the circuit 900D can be placed. The insertion portions 215D are arranged on both sides of the upper housing portion 170D so as to face each other, and support the circuit 900D extending linearly on both sides.

Moreover, a power source storage portion 221D in which a first power source PD is housed is formed in a part of the side of an upper surface 220D of the upper housing 200D. The power source storage portion 221D communicates with the upper end side of the upper housing portion 210D. When it is detected that an abnormal current flows through the electric circuit, an abnormality signal is input from an external device to the first power source PD. Then, for example, the gunpowder in the first power source PD is exploded, and the moving body 500D is instantaneously pushed out and moved in a housing portion 310D including the upper housing portion 210D and the lower housing portion 110D by the air pressure due to the explosion. Note that the housing portion 310D extends from a first end portion 320D of the housing 300D to a second end portion 330D opposite to the first end portion 320D. Since the moving body 500D is disposed on the side of the first end portion 320D, the moving body can move toward the second end portion 330D in the housing portion 310D by the first power source PD provided on the side of the first end portion 320D.

Moreover, a power source storage portion 241D in which a second power source 990D is housed is formed in a part of the side of the upper surface 220D of the upper housing 200D. When it is detected that an abnormal current flows through the electric circuit, an abnormality signal is input from an external device to the second power source 990D. Then, for example, the gunpowder in the second power source 990D is exploded, and the breaker 970D is instantaneously pushed out and moved in a housing portion 380D including the upper housing portion 170D and the lower housing portion 160D by the air pressure due to the explosion. Note that the housing portion 380D extends from the first end portion 320D of the housing 300D to the second end portion 330D opposite to the first end portion 320D. Since the breaker 970D is disposed on the side of the first end portion 320D, the breaker can move toward the second end portion 330D in the housing portion 380D by the second power source 990D provided on the side of the first end portion 320D.

The electric circuit breaker 600D also includes the fuse element 720D. The periphery of the fuse element 720D is filled with a granular arc-extinguishing material 730D. In addition, one end portion 721D of the fuse element 720D is connected to the base piece 930D directly coupled to the base piece 430D of the cut portion 400D, and the other end portion 721D of the fuse element 720D is connected to another base piece 930D of the circuit 900D. Therefore, the fuse element 720D is electrically connected in parallel with the cut portion 400D via the circuit 900D. In addition, the fuse element 720D includes a fusion portion 740D between both ends, and the fusion portion 740D is a portion in which the width of the fuse element 720D is locally narrowed, and is configured to generate heat and fuse to break the current when the current to be broken by the electric circuit breaker flows. Note that the fuse element 720D is housed in the housing portion 972D of the breaker 970D. The housing portion 972D is filled with the arc-extinguishing material 730D so as to surround the fuse element 720D. The fuse function portion of the electric circuit breaker 600D is different from the fuse function portion 700C illustrated in FIG. 26, which is configured as a fuse in which the arc-extinguishing material 730C and the fuse element 720C are enclosed in the casing 710C, in that the fuse function portion includes the fuse element 720D including the fusion portion 740D and the arc-extinguishing material 730D filled in the housing portion 972D of the breaker 970D.

Further, as illustrated in FIG. 31, the electric circuit breaker 600D is attached in an electric circuit to be protected and used. Specifically, the base piece 430D of the cut portion 400D is connected to a part of the electric circuit, and the cut portion 400D constitutes a part of the electric circuit. In addition, a projection 530D of the moving body 500D extends along the cut piece 420D and is disposed away from the cut piece 420D. In a normal state, since the base piece 430D and the cut piece 420D of the cut portion 400D are not cut and are physically and electrically connected, a current I1D flows through the electric circuit via the base piece 430D and the cut piece 420D of the cut portion 400D.

In addition, in the normal state, the housing portion 972D of the breaker 970D is filled with the arc-extinguishing material 730D so as to surround the fuse element 720D, and the fuse element 720D connects the two base pieces 930D. That is, the circuit 900D is neither disconnected nor broken by the breaker 970D. Note that the resistance value of the fuse element 720D is larger than the resistance value of the cut portion 400D. Since the current I1D flowing through the cut portion 400D and a current I1D' flowing through the fuse element 720D are proportional to the reciprocal of each resistance value, the magnitude of the current I1D' in the normal state is as small as about ten percent of the total current (current I1D+current I1D').

Furthermore, as illustrated in FIG. 31, a device SD that detects an abnormal current in the electric circuit is connected to the electric circuit to be protected. When detecting an abnormal current in the electric circuit by a built-in current sensor, an external current sensor connected to the electric circuit, or the like, the device SD determines whether or not the abnormal current belongs to a relatively low current range lower than a predetermined value (for example, 1000 to 2000 A [amps]). When determining that the abnormal current belongs to the relatively low current range lower than the predetermined value, the device SD inputs an abnormality signal X1D to the second power source 990D. Thereafter, after a predetermined time has elapsed, the device SD inputs an abnormality signal X2D to the first power source PD. Note that, as described later, the predetermined time is a time until the breaker 970D cuts the fuse element 720D of the circuit 900D by the second power source 990D. On the other hand, when determining that the detected abnormal current does not belong to the relatively low current range lower than the predetermined value and belongs to a relatively high current range higher than the predetermined value, the device SD inputs the abnormality signal X2D only to the first power source PD without inputting the abnormality signal X1D to the second power source 990D.

Note that, as described later, in a case where a relatively high current flows, the electric circuit breaker 600D can induce an arc generated when the electric circuit is broken in the fuse element 720D to effectively and quickly extinguish the arc. Therefore, an arc-extinguishing material for extinguishing the arc is not enclosed in the housing portion 310D (in particular, around the cut piece 420D). Note that, basically, it is not necessary to enclose the arc-extinguishing material in the housing portion 310D, but the arc-extinguishing material may be enclosed in the housing portion 310D depending on the specification.

Next, a state where the electric circuit breaker 600D breaks an electric circuit in a case where an overcurrent belonging to a relatively low current range lower than a predetermined value flows through the electric circuit will be described with reference to FIG. 32. Note that FIG. 32(*a*) is a cross-sectional view illustrating a state where the breaker 970D has moved from the state illustrated in FIG. 31(*b*), and FIG. 32(*b*) is a cross-sectional view illustrating a state where the moving body 500D has moved from the state illustrated in FIG. 32(*a*).

First, assuming that, when detecting an abnormal current in the electric circuit, the device SD determines that the abnormal current belongs to a relatively low current range lower than a predetermined value (for example, 1000 to 2000 A [amps]). Next, the device SD inputs the abnormality signal X1D to the second power source 990D. As a result, the gunpowder in the second power source 990D explodes, and the air pressure due to the explosion is transmitted to the breaker 970D. The breaker 970D is then forcefully blown from the first end portion 320D toward the second end portion 330D by the air pressure, and instantaneously moves toward the second end portion 330D in the housing portion 380D. Then, as illustrated in FIG. 32(*a*), the fuse element 720D of the circuit 900D is strongly pushed downward via the arc-extinguishing material 730D by the breaker 970D, and the fuse element 720D is cut and physically separated from the base piece 930D. As described above, since the circuit 900D is broken by the breaker 970D, it is changed to a state of not being electrically connected. As a result, an abnormal current I2D (see FIG. 31(*a*)) flowing through the base piece 430D does not flow through the circuit 900D but flows only through the cut portion 400D.

Note that when the current belonging to the relatively low current range flows in the fuse element 720D through the circuit 900D, the fuse element 720D is not fused by the current belonging to the relatively low current range and thus the current cannot be broken, or it takes a relatively long time to break the current, and the overcurrent flowing through the electric circuit cannot be broken immediately.

Thereafter, the device SD inputs the abnormality signal X2D to the first power source PD. As a result, the gunpowder in the first power source PD explodes, and the moving body 500D is forcefully blown from the first end portion 320D toward the second end portion 330D by the air pressure due to the explosion, and instantaneously moves toward the second end portion 330D in the housing portion 310D. Then, as illustrated in FIG. 32(*b*), the cut piece 420D is strongly pushed downward by the projection 530D of the moving body 500D, and the cut piece 420D is cut in the vicinity of the coupling portion between the cut piece 420D and the base piece 430D and physically separated from the base piece 430D. Therefore, the state where the base pieces 430D on both sides are energized is immediately broken, and the overcurrent I2D can be prevented from flowing through the electric circuit. Note that, since the abnormal current I2D belongs to the relatively low current range lower than the predetermined value, the arc discharge does not occur or the arc is immediately extinguished even if the distance between the cut piece 420D and the base piece 430D that are separated is short.

Figure 33:
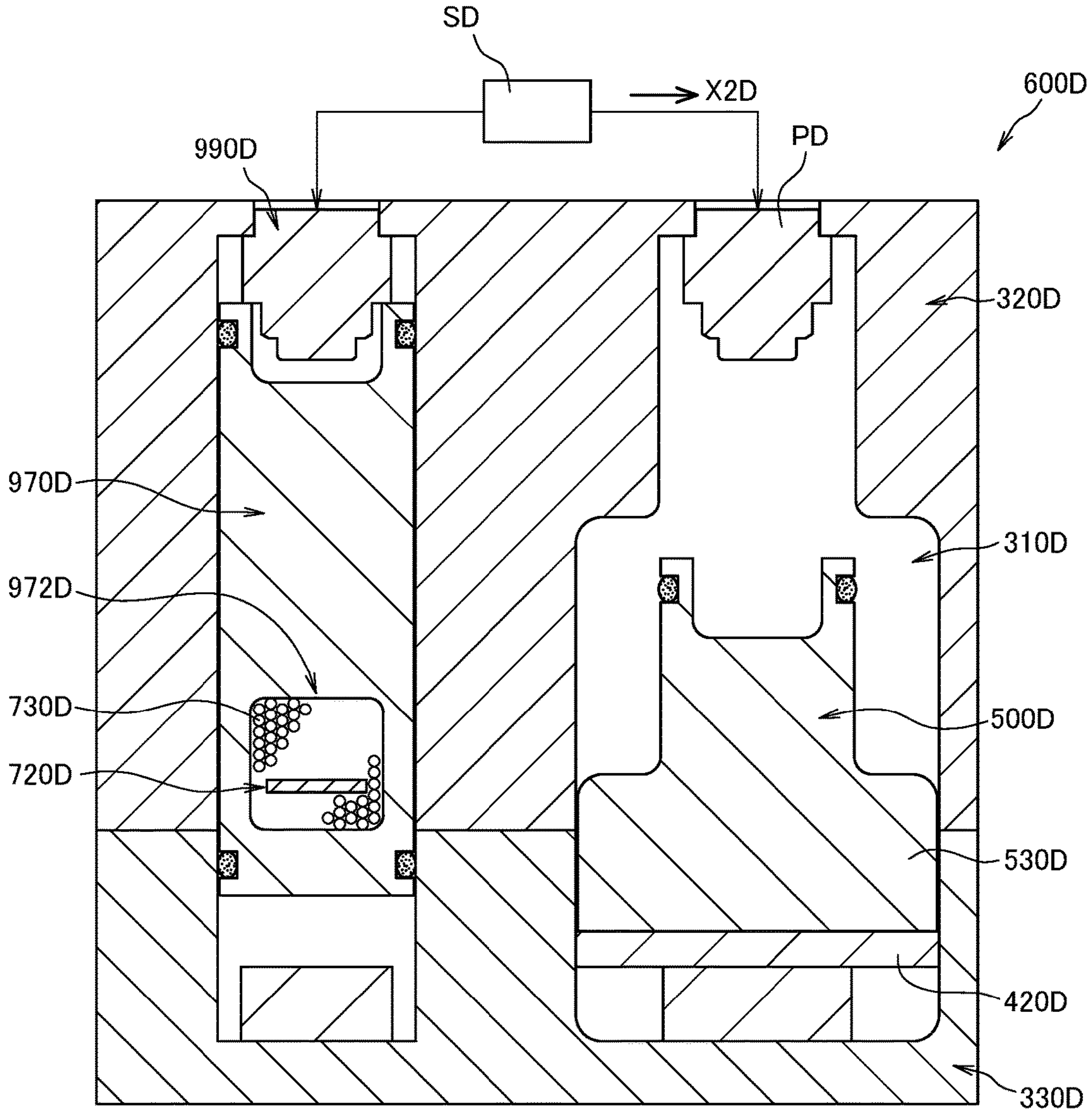
FIG. 33 is a cross-sectional view illustrating a state where the moving body has moved from the state illustrated in FIG. 31(*b*).

Next, a state where the electric circuit breaker 600D breaks an electric circuit in a case where an overcurrent belonging to a relatively high current range higher than a predetermined value flows through the electric circuit will be described with reference to FIG. 33. Note that FIG. 33 is a cross-sectional view illustrating a state where the moving body 500D has moved from the state illustrated in FIG. 31(*b*).

First, assuming that, when detecting an abnormal current in the electric circuit, the device SD determines that the abnormal current does not belong to a relatively low current range lower than a predetermined value but belongs to a relatively high current range higher than the predetermined value. Next, the device SD inputs the abnormality signal X2D only to the first power source PD without inputting the abnormality signal X1D to the second power source 990D.

As a result, the gunpowder in the first power source PD explodes, and the moving body 500D instantaneously moves toward the second end portion 330D in the housing portion 310D. Then, as illustrated in FIG. 33, the moving body 500D moves toward the second end portion 330D, the cut piece 420D is strongly pushed downward by the projection 530D of the moving body 500D, and the cut piece 420D is cut in the vicinity of the coupling portion between the cut piece 420D and the base piece 430D and physically separated from the base piece 430D. That is, the state where the base pieces 430D on both sides of the cut portion 400D are energized via the cut piece 420D is broken, and an overcurrent can be prevented from flowing through the electric circuit.

In addition, since the overcurrent belonging to the relatively high current range flows through the base pieces 430D on both sides connected to the electric circuit, an arc is possibly generated between the base piece 430D and the cut piece 420D immediately after cutting. However, as illustrated in FIGS. 31(*a*) and 33, since the fuse element 720D of the circuit 900D is not cut by the breaker 970D, the fuse element is electrically connected to the cut portion 400D. Since the cut piece 420D of the cut portion 400D is cut in this state, when the cut piece 420D is cut, a current I3D (fault current) flowing through the electric circuit is induced in the fuse element 720D via the circuit 900D (see FIG. 31(*a*)). Therefore, it is possible to prevent an arc from being generated between the base piece 430D and the cut piece 420D, which has been cut.

The current I3D induced in the fuse element 720D then causes the fusion portion 740D of the fuse element 720D to generate heat and fuse. Note that, when the cut piece 420D is cut by the moving body 500D to break the electric circuit, the current I3D is induced in the fuse element 720D to flow through the electric circuit. Therefore, strictly speaking, the electric circuit is not completely broken. However, since the rating of the fusion portion 740D of the fuse element 720D is reduced, the fusion portion 740D is immediately fused by the current I3D, and the electric circuit is immediately completely broken.

Furthermore, after the fusion portion 740D is fused, an arc is generated between the terminals 721D of the fuse element 720D by the voltage applied to the base pieces 430D on both sides connected to the electric circuit, but the arc is quickly and effectively extinguished by the arc-extinguishing material 730D in the housing portion 972D of the breaker 970D.

As described above, according to the electric circuit breaker 600D of the present invention, a relatively high current (fault current) flowing through the electric circuit when the electric circuit is broken is induced in the fuse element 720D of the fuse function portion, and the arc generated by the induced current can be effectively and quickly extinguished by the arc-extinguishing material 730D. As a result, it is possible to prevent the electric circuit breaker 600D from being damaged by the arc generated between the base pieces 430D in the housing 300D, and to safely break the electric circuit.

Figure 32A:
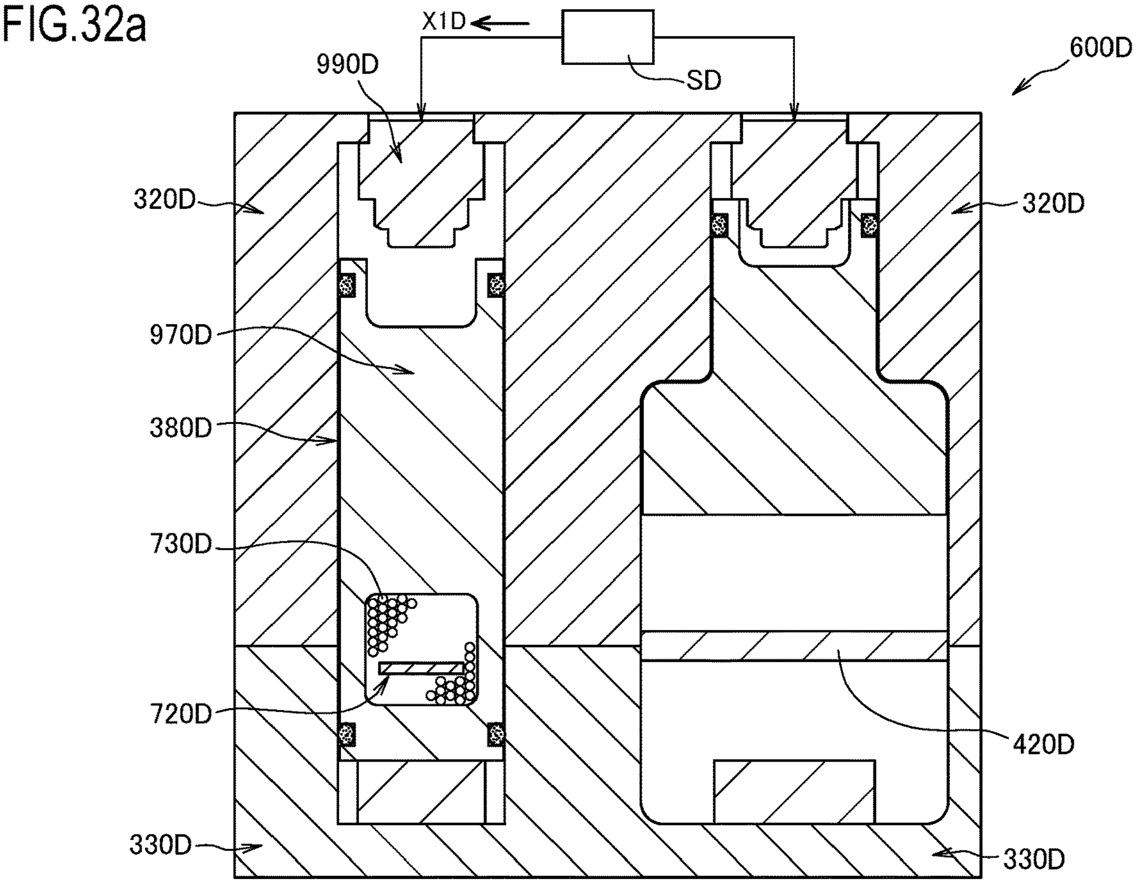
FIG. 32(*a*) is a cross-sectional view illustrating a state where a breaker has moved from the state illustrated in FIG. 31(*b*), and FIG. 32(*b*) is a cross-sectional view illustrating a state where a moving body has moved from the state illustrated in FIG. 32(*a*).
Figure 32B:
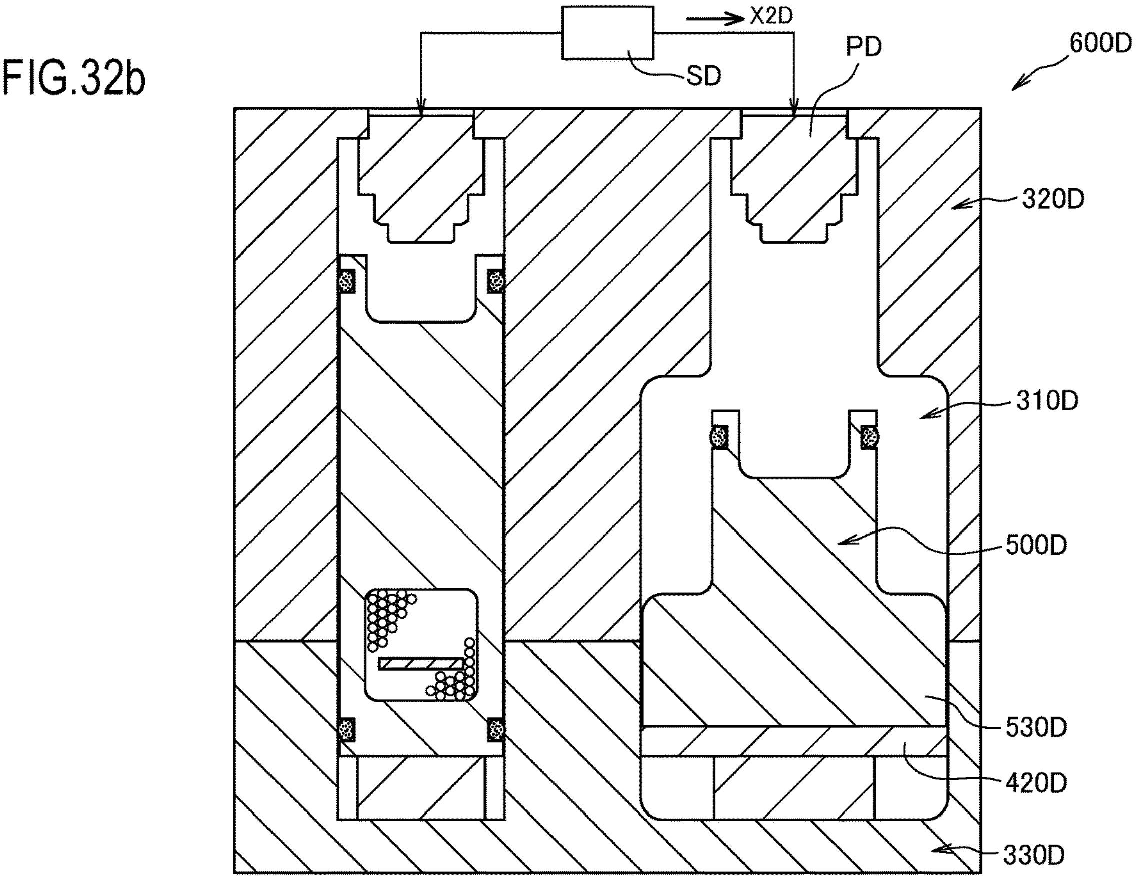

As described above, according to the electric circuit breaker 600D of the present invention, in a case where the overcurrent belonging to the relatively low current range flows through the electric circuit, as illustrated in FIG. 32, under a state where the cut portion 400D and the fuse element 720D are not connected, the cut piece 420D between the base pieces 430D on both sides of the cut portion 400D is cut and the state where the base pieces 430D on both sides are energized is immediately broken, so that the overcurrent is prevented from flowing through the electric circuit. Therefore, it is possible to solve the problem that, as in a conventional case, the current belonging to the relatively low current range cannot be broken because the fusion portion 740D of the fuse element 720D is not fused or the overcurrent flowing through the electric circuit cannot be broken immediately because it takes a relatively long time to break the current. On the other hand, in a case where the overcurrent belonging to the relatively high current range flows through the electric circuit, as illustrated in FIG. 33, under a state where the cut portion 400D and the fuse element 720D are connected, the cut piece 420D between the base pieces 430D on both sides of the cut portion 400D is cut and the state where the base pieces 430D on both sides are energized is immediately and safely broken, so that the overcurrent is prevented from flowing through the electric circuit. As described above, the electric circuit breaker 600D of the present invention quickly breaks current in a wide current range up to a relatively low current as well as a relatively high current.

In addition, the electric circuit breaker of the present invention is not limited to the above embodiments, and various modifications and combinations are possible within the scope of the claims and the scope of the embodiments, and these modifications and combinations are also included in the scope of rights.

The invention claimed is:

1. An electric circuit breaker that includes a housing, a cut portion that is disposed in the housing and constitutes a part of an electric circuit, a first power source that is disposed on a first end portion side of the housing, and a moving body that moves in the housing between the first end portion and a second end portion opposite to the first end portion, the electric circuit breaker comprising a fuse function portion that includes a fusion portion and an arc-extinguishing material, wherein the moving body is configured to cut a cut piece positioned between base pieces on two sides of the cut portion at a part of the moving body while moving from the first end portion toward the second end portion by the first power source, in a case where a current to be broken is low, the fuse function portion and the cut portion are not connected, the moving body is moved toward the second end portion by the first power source to cut the cut piece positioned between the base pieces on both sides of the cut portion to break a state where the base pieces on both sides of the cut portion are energized, and in a case where the current to be broken is high, the fuse function portion and the cut portion are put to the state of connection with each other, the moving body is moved toward the second end portion by the first power source to cut the cut piece positioned between the base pieces on both sides of the cut portion to break the state where the base pieces on both sides of the cut portion are energized; and further comprising paired electrodes individually connected to terminals on both sides of the fuse function portion, wherein in a case where a current to be broken is low, the moving body moves toward the second end portion to cut a cut piece positioned between base pieces on both sides of the cut portion so as to break a state where the base pieces on both sides of the cut portion are energized, and a regulating unit operated by a second power source regulates movement of the moving body so as not to connect a part of the cut portion and the electrode in order to make the cut portion and the fuse function portion unconnected, in a case where the current to be broken is high, the moving body moves toward the second end portion, and in a state where the base pieces on both sides of the cut portion are energized via the cut piece, a part of the cut portion and the electrode come into contact with each other to connect the cut portion and the fuse, and thereafter, the state where the base pieces on both sides of the cut portion are energized via the cut piece is broken along with the movement of the moving body.

2. The electric circuit breaker according to claim 1, wherein the moving body includes the electrode, a state where base pieces on both sides of the cut portion are energized via the cut piece is a state where the base piece and the cut piece physically cut and separated from the base piece are energized by arc discharge, and the energized state is broken by an insulator being interposed between the base piece and the cut piece along with movement of the moving body.

3. The electric circuit breaker according to claim 1, wherein the housing includes the electrode, a state where base pieces on both sides of the cut portion are energized via the cut piece is a state where the base piece and the cut piece physically cut and separated from the base piece are energized by a conductor included in the moving body, and in the energized state, the base piece of the cut portion and the electrode are connected via the conductor of the moving body, and the cut portion and the fuse are connected.

4. An electric circuit breaker that includes a housing, a cut portion that is disposed in the housing and constitutes a part of an electric circuit, a first power source that is disposed on a first end portion side of the housing, and a moving body that moves in the housing between the first end portion and a second end portion opposite to the first end portion, the electric circuit breaker comprising a fuse function portion that includes a fusion portion and an arc-extinguishing material, wherein the moving body is configured to cut a cut piece positioned between base pieces on two sides of the cut portion at a part of the moving body while moving from the first end portion toward the second end portion by the first power source, in a case where a current to be broken is low, the fuse function portion and the cut portion are not connected, the moving body is moved toward the second end portion by the first power source to cut the cut piece positioned between the base pieces on both sides of the cut portion to break a state where the base pieces on both sides of the cut portion are energized, and in a case where the current to be broken is high, the fuse function portion and the cut portion are put to the state of connection with each other, the moving body is moved toward the second end portion by the first power source to cut the cut piece positioned between the base pieces on both sides of the cut portion to break the state where the base pieces on both sides of the cut portion are energized; and further comprising a circuit connected to the cut portion via the fuse function portion, wherein in a case where a current to be broken is low, the circuit is broken by a breaker moved by a second power source to be in a state where the fuse function portion and the cut portion are not connected, and thereafter, the moving body is moved toward the second end portion by a first power source to cut a cut piece positioned between base pieces on both sides of the cut portion so as to break a state where the base pieces on both sides of the cut portion are energized, and in a case where the current to be broken is high, in a state where the circuit is not broken and the fuse function portion and the cut portion remain connected to each other, the moving body is moved toward the second end portion by the first power source to cut the cut piece positioned between the base pieces on both sides of the cut portion so as to break the state where the base pieces on both sides of the cut portion are energized.

5. The electric circuit breaker according to claim 4, wherein a fuse element of the fuse function portion constitutes a part of the circuit, further, the fuse element is surrounded by an arc-extinguishing material, and in a case where a current to be broken is low, the fuse element that is a part of the circuit is broken by a breaker moved by the second power source.

* * * * *